(12) United States Patent
Li et al.

(10) Patent No.: US 11,498,163 B2
(45) Date of Patent: Nov. 15, 2022

(54) WINDOW INSTALLATION SYSTEM AND METHOD FOR SPLIT-ARCHITECTURE AIR CONDITIONING UNIT

(71) Applicant: Treau, Inc., San Francisco, CA (US)

(72) Inventors: Grace Li, San Francisco, CA (US); Kipp Bradford, San Francisco, CA (US); Dean DiPietro, San Francisco, CA (US); Vincent Domenic Romanin, San Francisco, CA (US); Steve Gennrich, San Francisco, CA (US)

(73) Assignee: Treau, Inc., San Francisco, CA (US)

( * ) Notice: Subject to any disclaimer, the term of this patent is extended or adjusted under 35 U.S.C. 154(b) by 139 days.

(21) Appl. No.: 17/017,066

(22) Filed: Sep. 10, 2020

(65) Prior Publication Data
US 2021/0078118 A1    Mar. 18, 2021

Related U.S. Application Data

(60) Provisional application No. 62/900,000, filed on Sep. 13, 2019.

(51) Int. Cl.
*B23P 15/26* (2006.01)
*F24F 13/30* (2006.01)
*F25D 23/10* (2006.01)

(52) U.S. Cl.
CPC ............. *B23P 15/26* (2013.01); *F24F 13/30* (2013.01); *F25D 23/10* (2013.01); *Y10T 29/49359* (2015.01)

(58) Field of Classification Search
CPC .... F24F 1/027; F24F 1/029; F24F 1/03; F24F 1/031; F24F 1/06; F24F 1/0323; B23P 15/26; Y10T 29/49359
See application file for complete search history.

(56) References Cited

U.S. PATENT DOCUMENTS 2,320,436 A * 6/1943 Hull ........................ F24F 1/60
62/262
2,436,713 A * 2/1948 Clifford ................ F24F 13/32
62/262

(Continued)

FOREIGN PATENT DOCUMENTS

CA        2409963 A1    5/2003
EP        1779965 A2    5/2007
(Continued)

OTHER PUBLICATIONS

International Search Report and Written Opinion dated Nov. 26, 2020, Patent Application No. PCT/US2020/050199, 7 pages.

(Continued)

*Primary Examiner* — Jason L Vaughan
(74) *Attorney, Agent, or Firm* — Davis Wright Tremaine LLP

(57) ABSTRACT

A method of installing an air conditioning unit in an opening. The method includes securing a bracket to a sill of the opening between a first and second environment where the bracket has a pivot arm disposed and extending within the first environment. The method also includes positioning a first unit of the air conditioning unit on top of the bracket; moving the first unit on top of the bracket onto the pivot arm; and rotating the pivot arm and first unit downward so that the first unit is disposed in the first environment and extending downward below the sill of the opening.

20 Claims, 42 Drawing Sheets

(56) References Cited

U.S. PATENT DOCUMENTS

| | | | | |
|---|---|---|---|---|
| 2,895,699 | A | * | 7/1959 | Lidsky ............... F24F 1/04 |
| | | | | 211/134 |
| 3,176,474 | A | | 4/1965 | Abbott |
| 3,491,549 | A | * | 1/1970 | Oglesby ............ F24F 13/00 |
| | | | | 62/262 |
| 3,554,476 | A | * | 1/1971 | Gaylor, Jr. ......... F24F 13/32 |
| | | | | 248/291.1 |
| 4,393,662 | A | | 7/1983 | Dirth |
| 4,641,503 | A | | 2/1987 | Kobayashi |
| 4,809,516 | A | | 3/1989 | Jones |
| 5,027,614 | A | * | 7/1991 | Mori ................. F24F 13/32 |
| | | | | 62/262 |
| 5,167,131 | A | | 12/1992 | Karkhanis |
| 5,245,835 | A | | 9/1993 | Cohen et al. |
| 5,355,688 | A | | 10/1994 | Rafalovich et al. |
| 5,445,213 | A | | 8/1995 | Im |
| 5,467,812 | A | | 11/1995 | Dean et al. |
| 5,507,337 | A | | 4/1996 | Rafalovich et al. |
| 5,582,025 | A | * | 12/1996 | Dubin ............... F24F 13/32 |
| | | | | 62/262 |
| 5,682,752 | A | | 11/1997 | Dean |
| 6,138,987 | A | | 10/2000 | Lee |
| 6,286,316 | B1 | | 9/2001 | Waldrop et al. |
| 6,318,108 | B1 | | 11/2001 | Holstein et al. |
| 6,343,482 | B1 | | 2/2002 | Endo et al. |
| 6,389,834 | B1 | | 5/2002 | LeClear et al. |
| 6,482,332 | B1 | | 11/2002 | Malach |
| 6,525,505 | B2 | | 2/2003 | Bay et al. |
| 6,840,056 | B2 | | 1/2005 | Tanaka |
| 6,983,621 | B2 | | 1/2006 | Cur et al. |
| 7,121,105 | B1 | | 10/2006 | Elliot |
| 8,281,614 | B2 | | 10/2012 | Koo et al. |
| 9,303,895 | B1 | * | 4/2016 | Grant ................. F24F 13/32 |
| 10,012,450 | B2 | | 7/2018 | Riendeau |
| 10,401,043 | B2 | * | 9/2019 | Li .................... F24F 1/02 |
| 2002/0026800 | A1 | | 3/2002 | Kasai et al. |
| 2003/0110789 | A1 | | 6/2003 | Cur et al. |
| 2005/0092474 | A1 | | 5/2005 | Seidel |
| 2006/0107683 | A1 | | 5/2006 | Song et al. |
| 2006/0157225 | A1 | | 7/2006 | Martin et al. |
| 2008/0087031 | A1 | | 4/2008 | Park et al. |
| 2009/0071181 | A1 | | 3/2009 | Spanger |

FOREIGN PATENT DOCUMENTS

| | | | | |
|---|---|---|---|---|
| KR | 20010094180 A | | 10/2001 | |
| RU | 2100733 C1 | | 12/1997 | |
| WO | WO-2019114943 A1 | * | 6/2019 | ............ F24F 1/0003 |

OTHER PUBLICATIONS

International Search Report and Written Opinion dated Sep. 2, 2021, Patent Application No. PCT/US2021/039932, 7 pages.

* cited by examiner

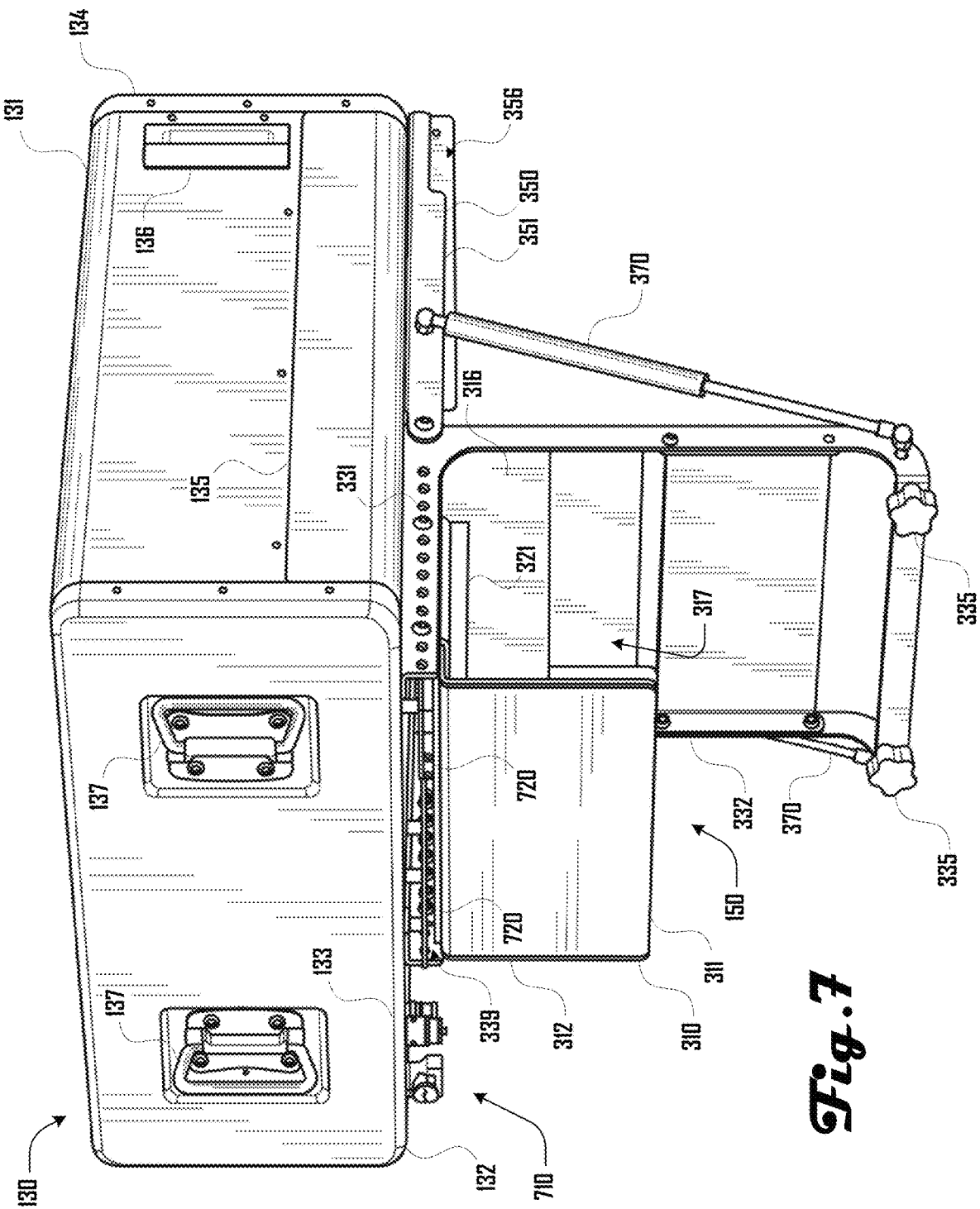

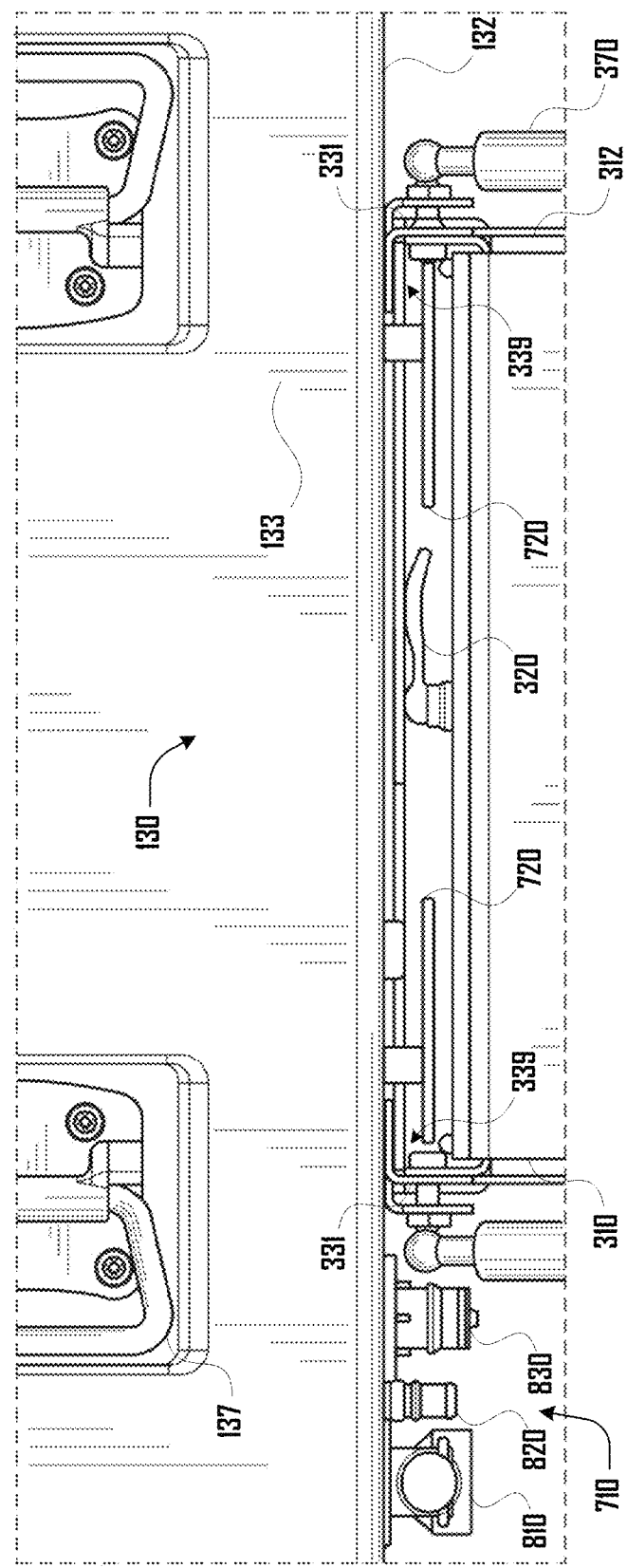

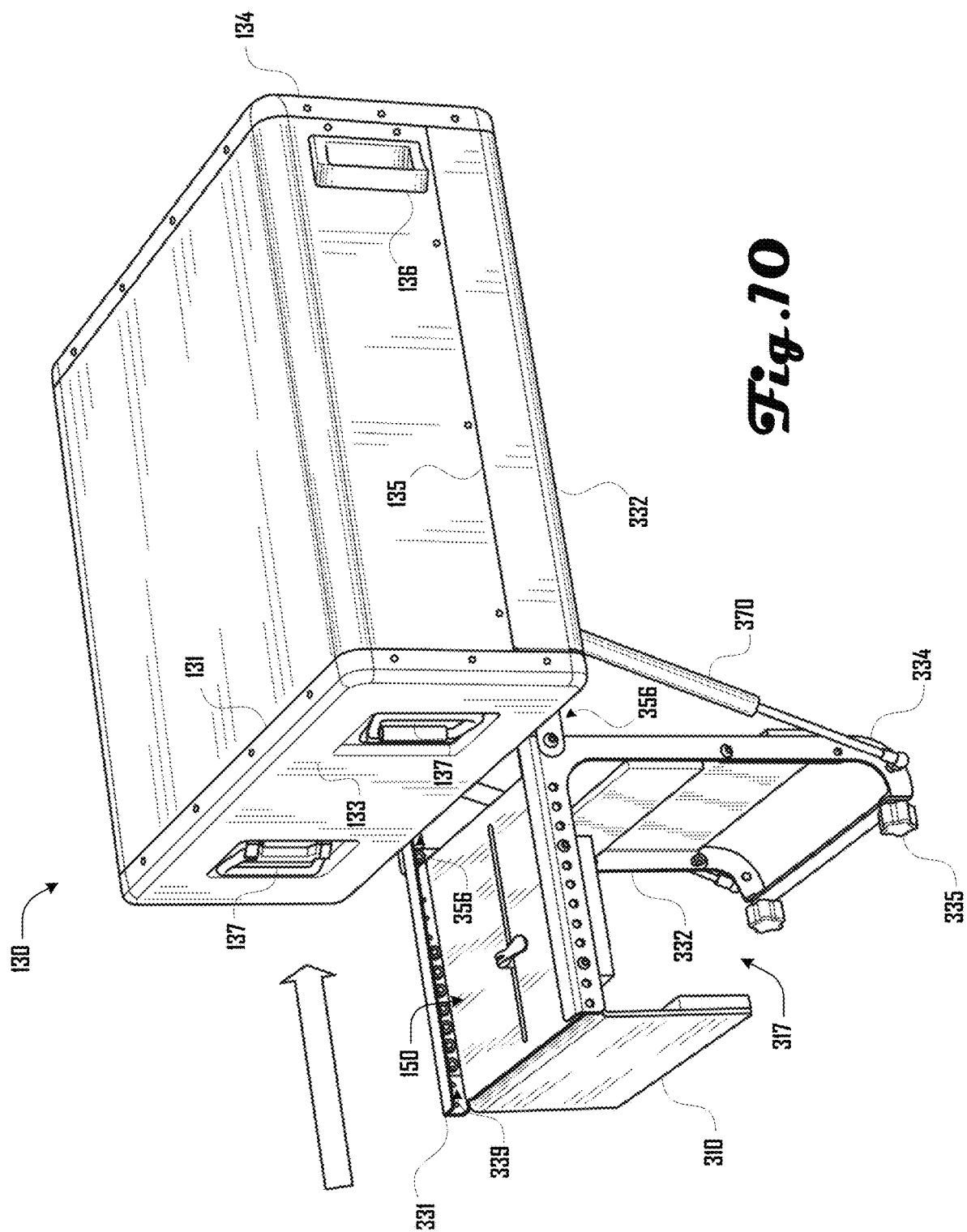

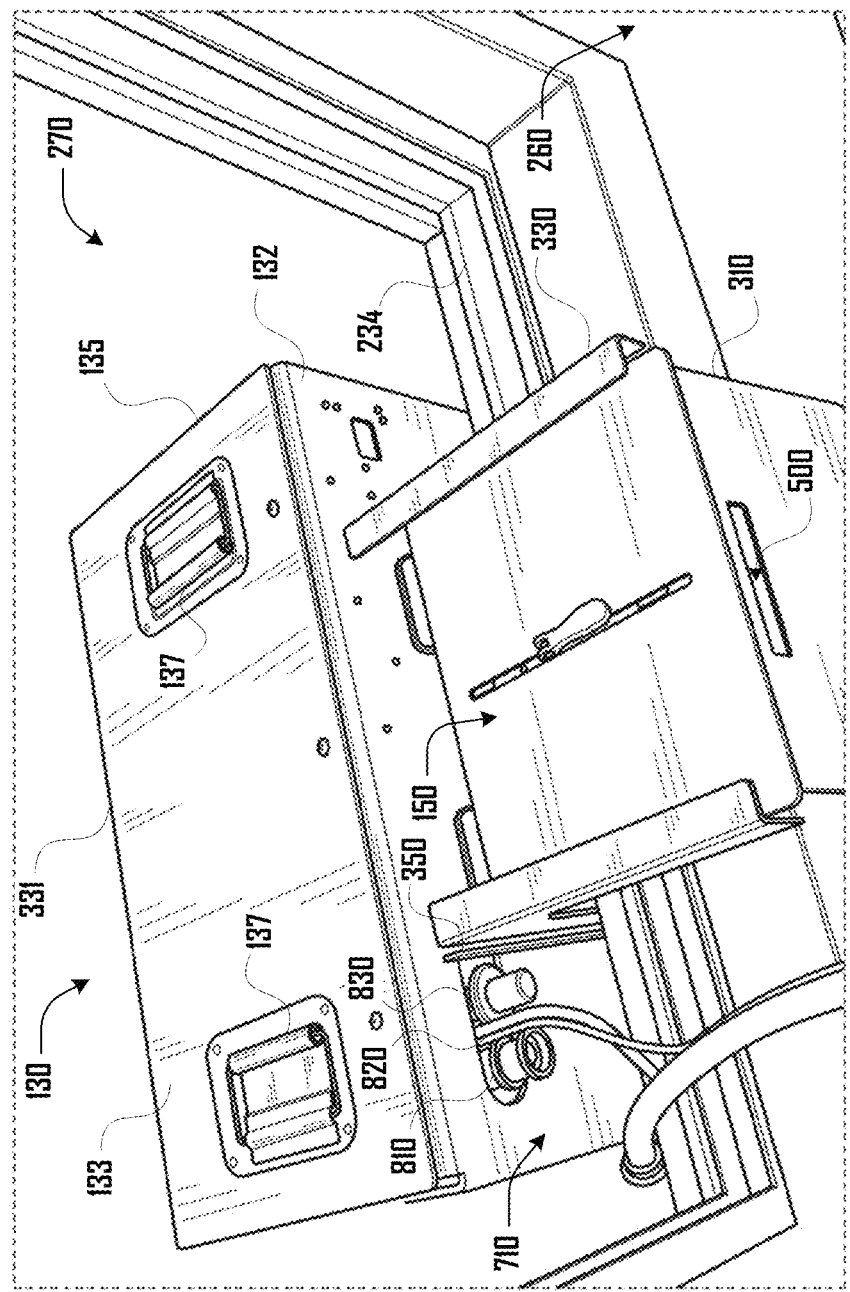

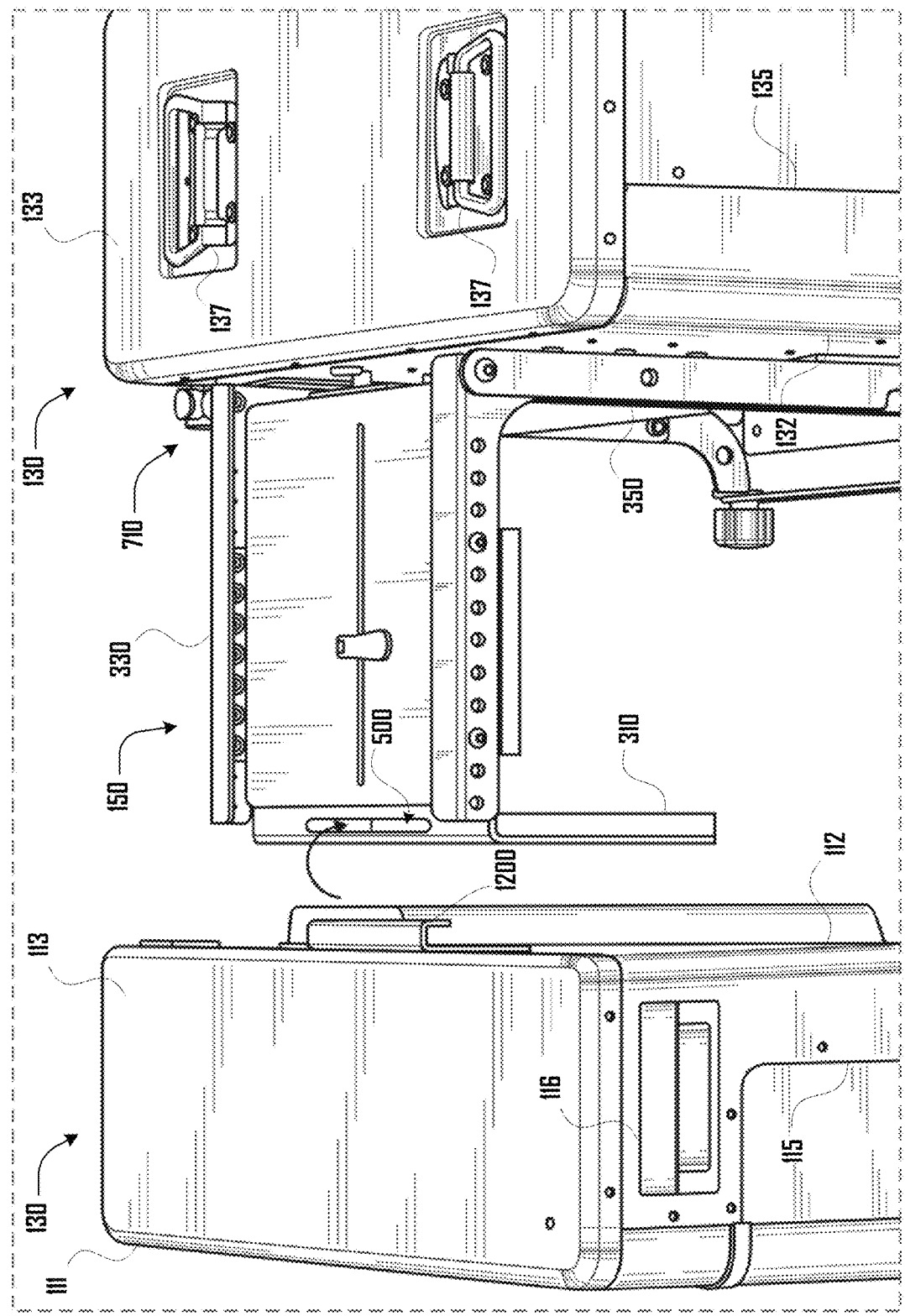

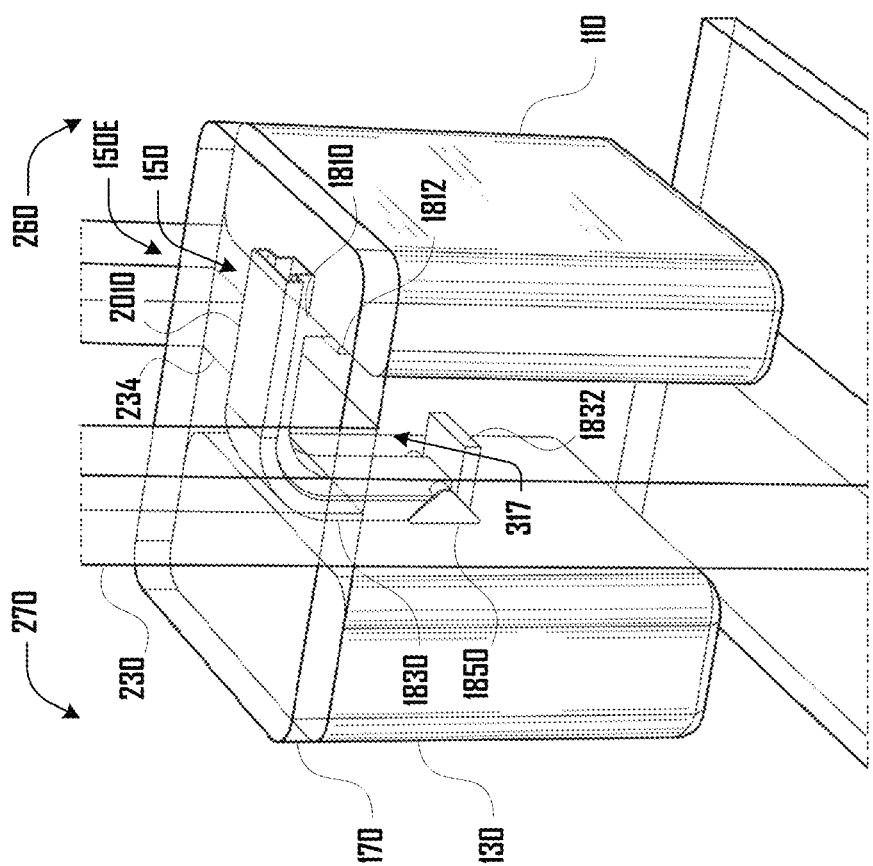

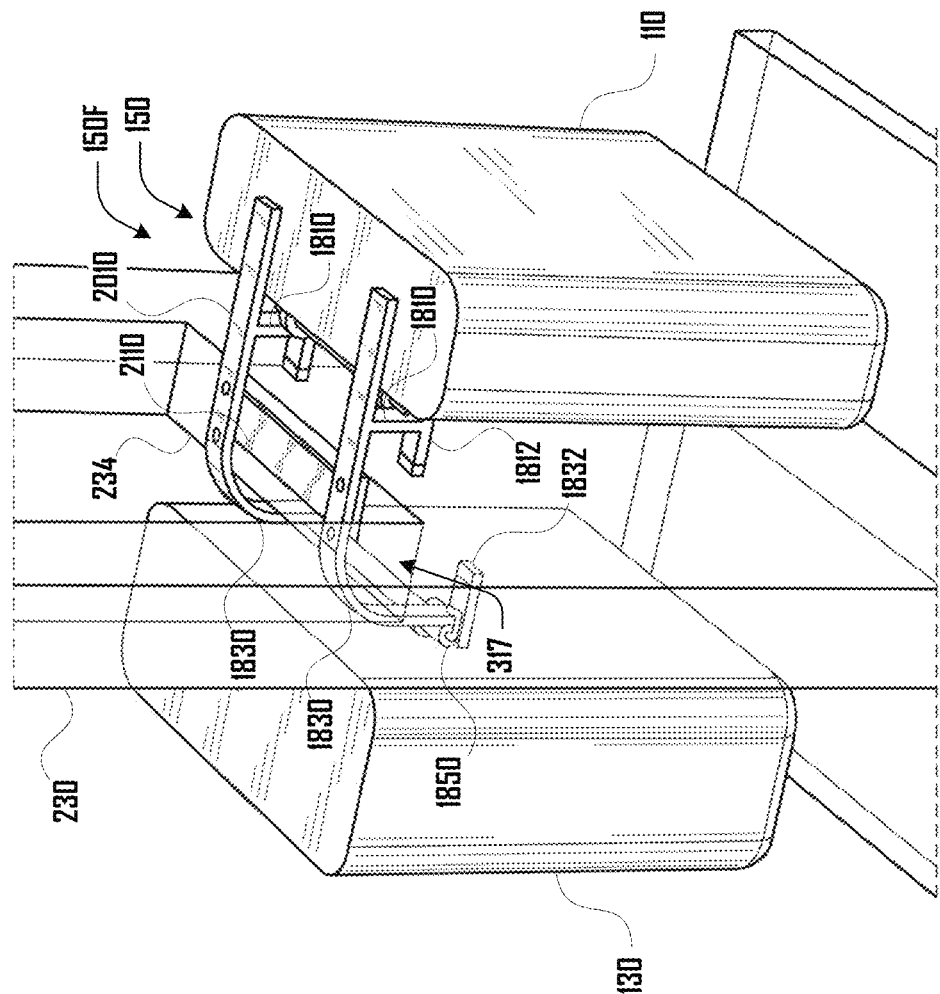

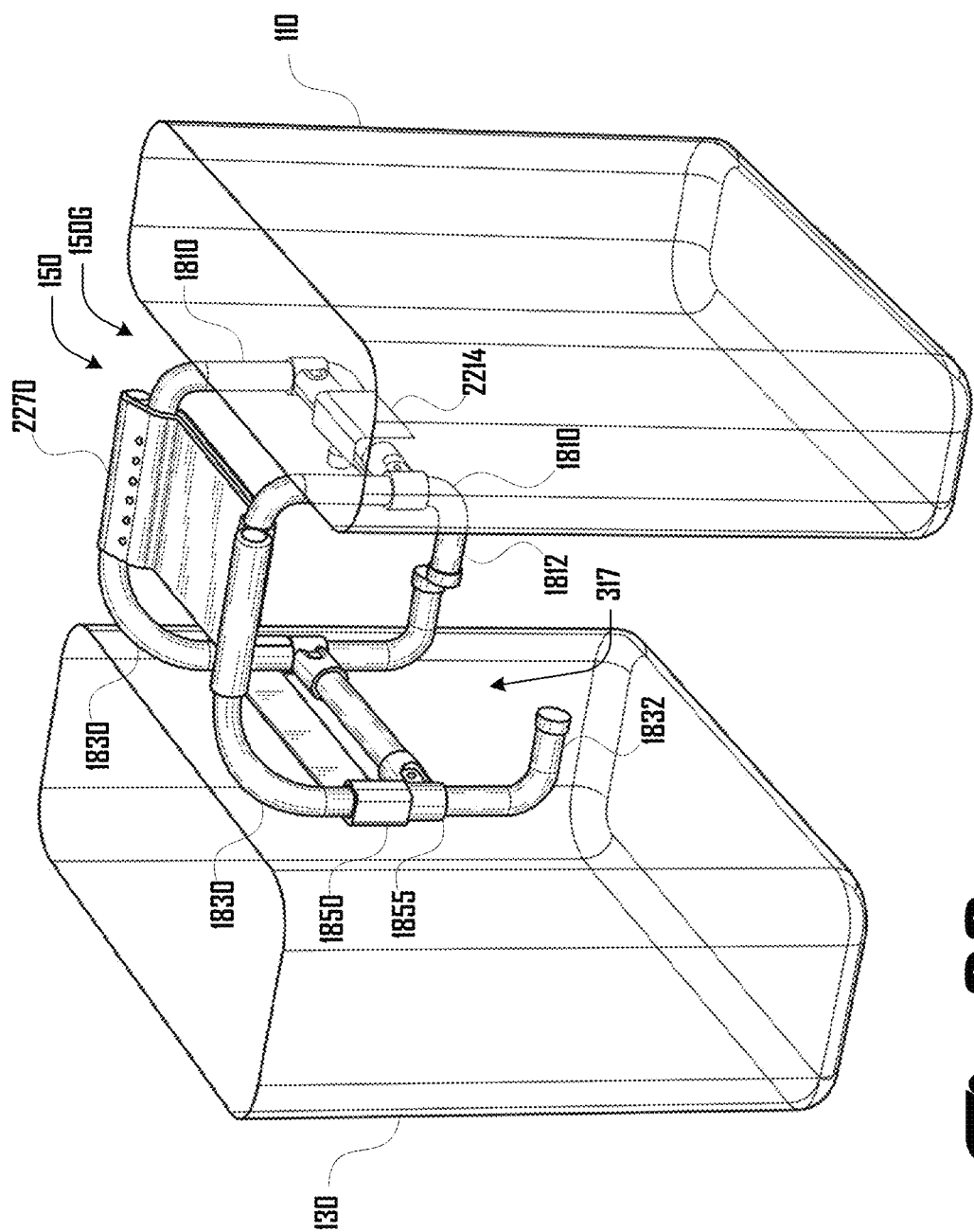

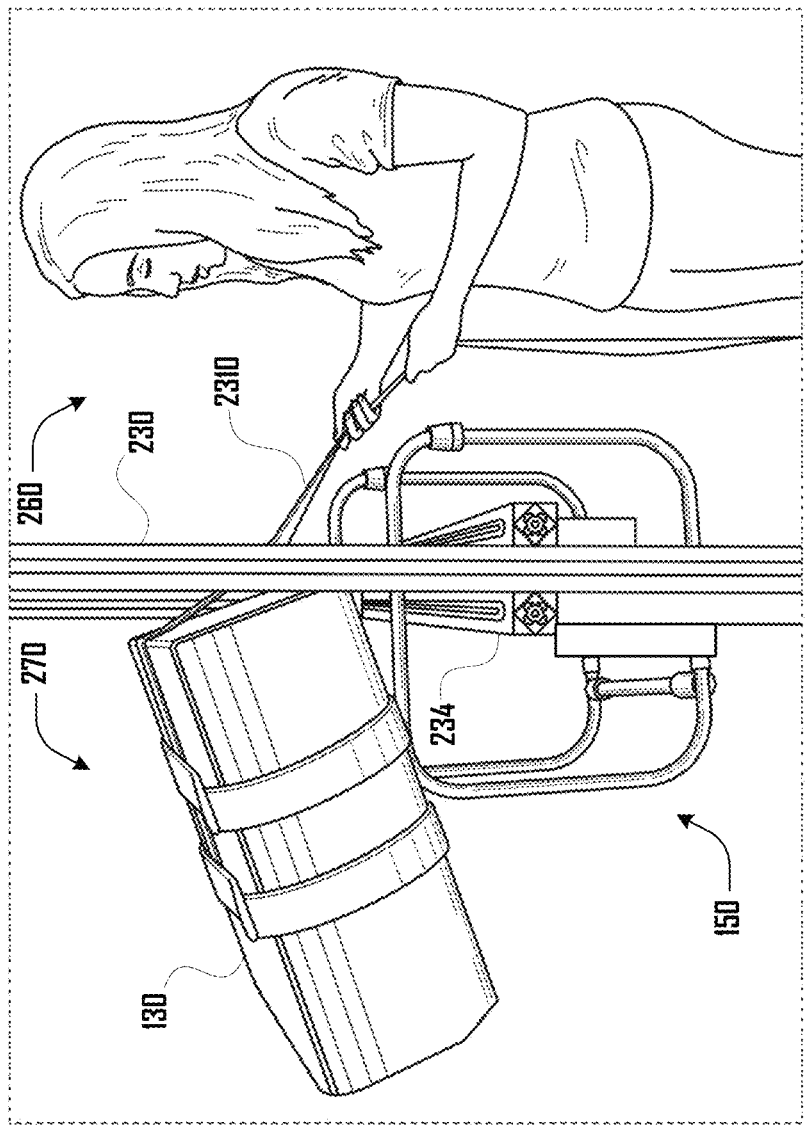

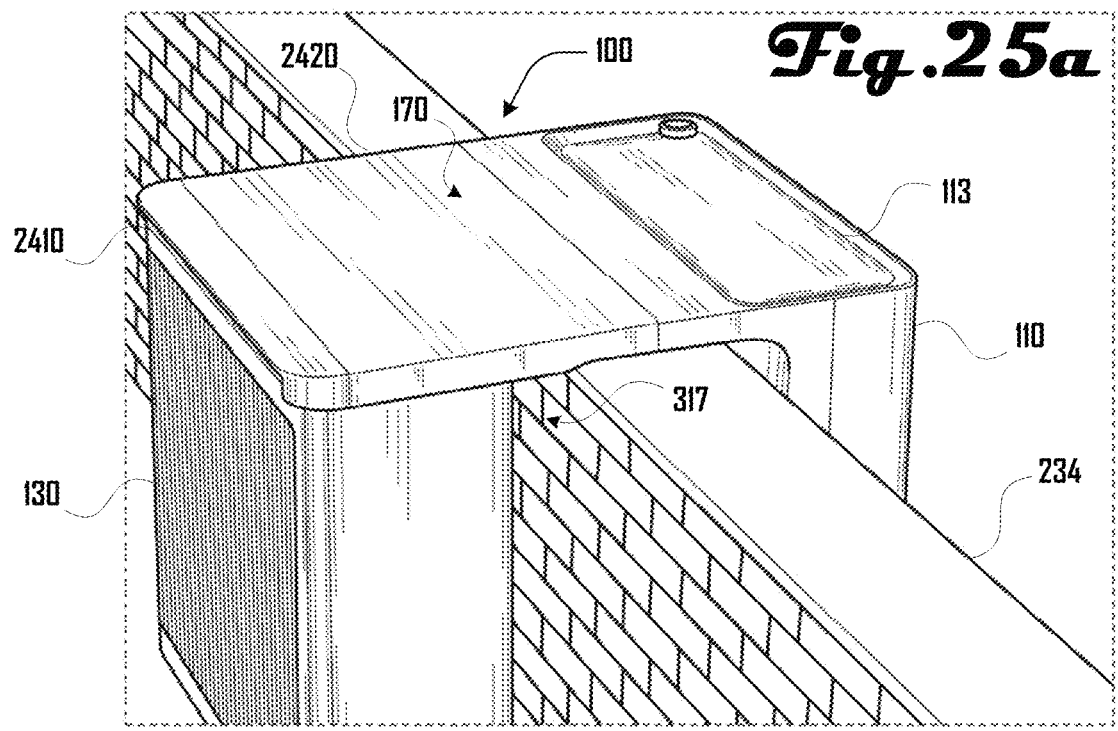
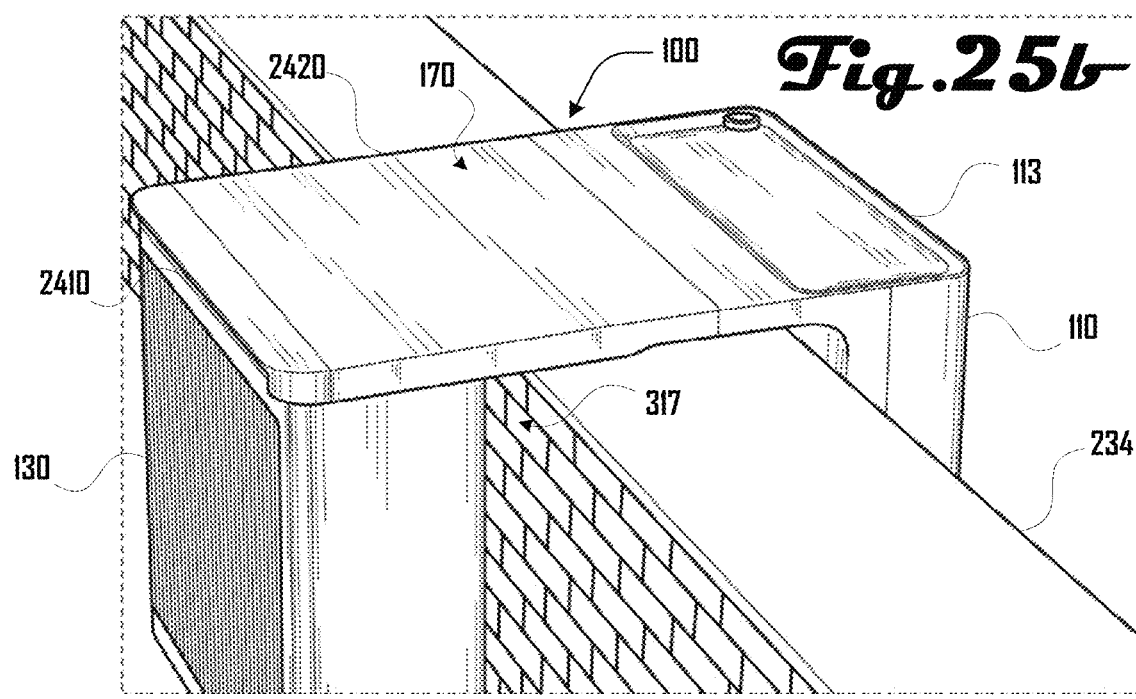

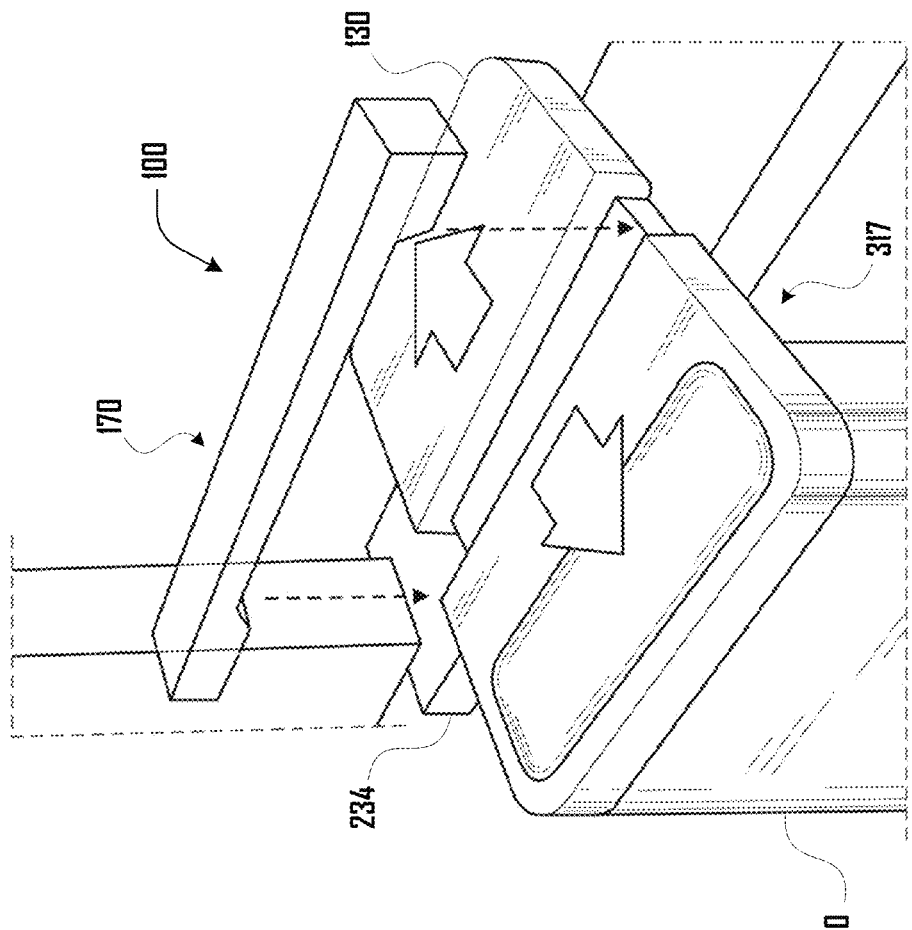
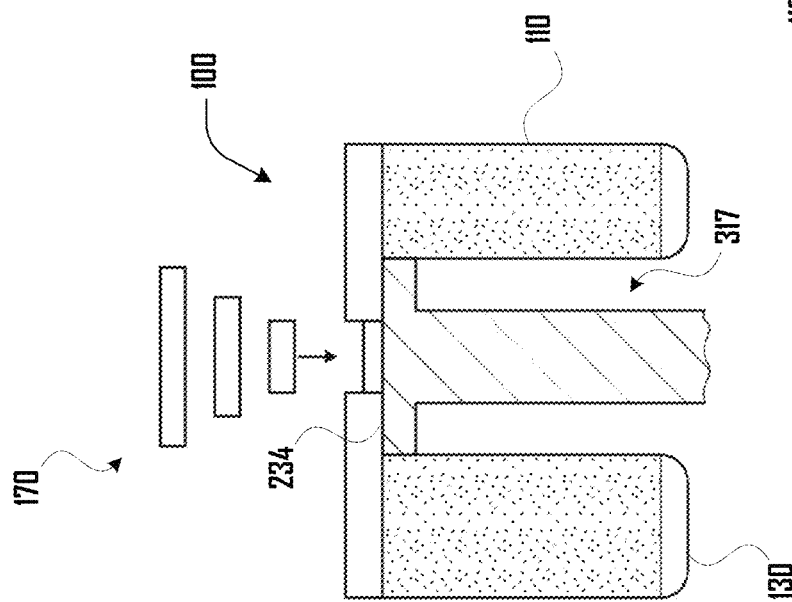

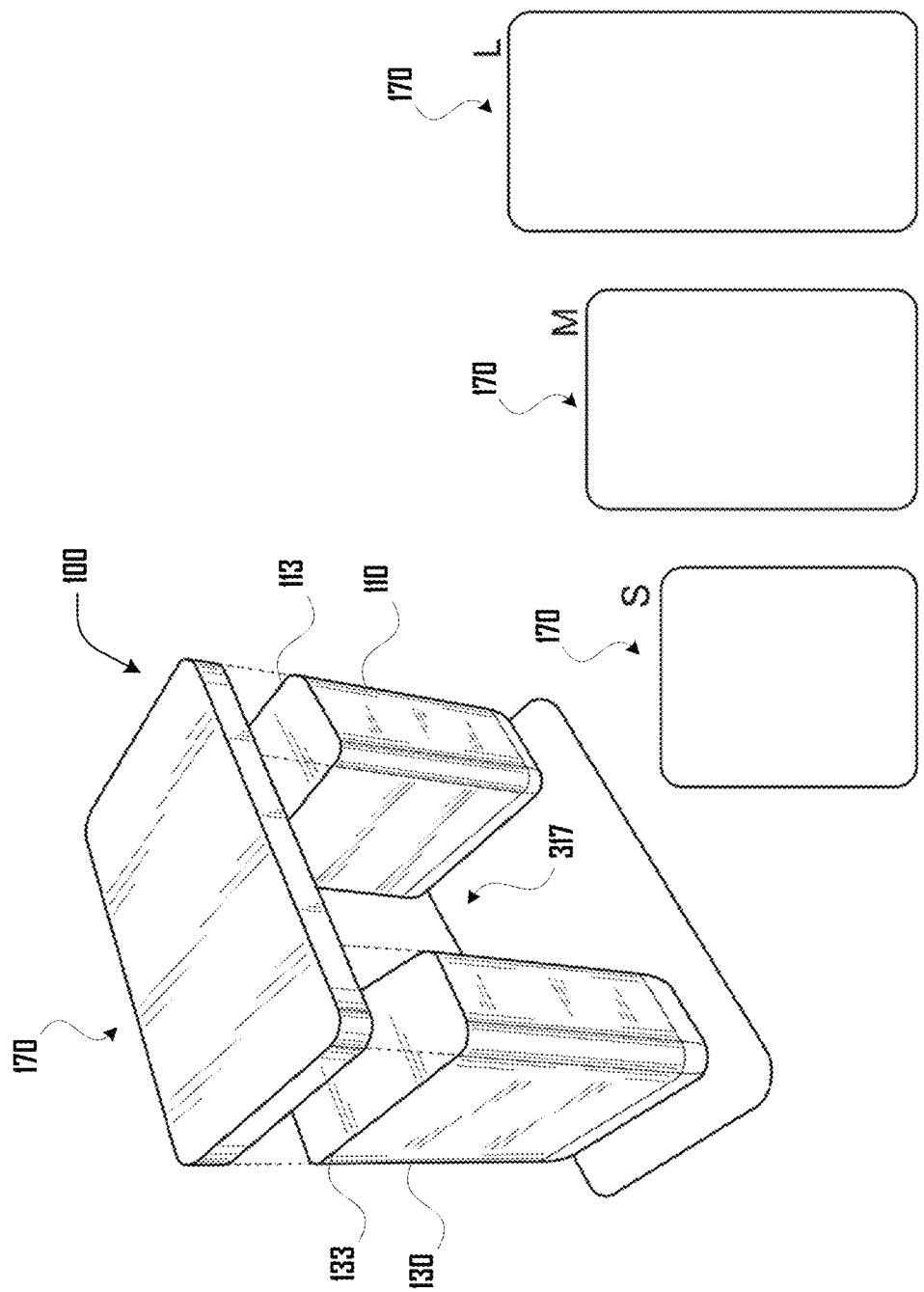

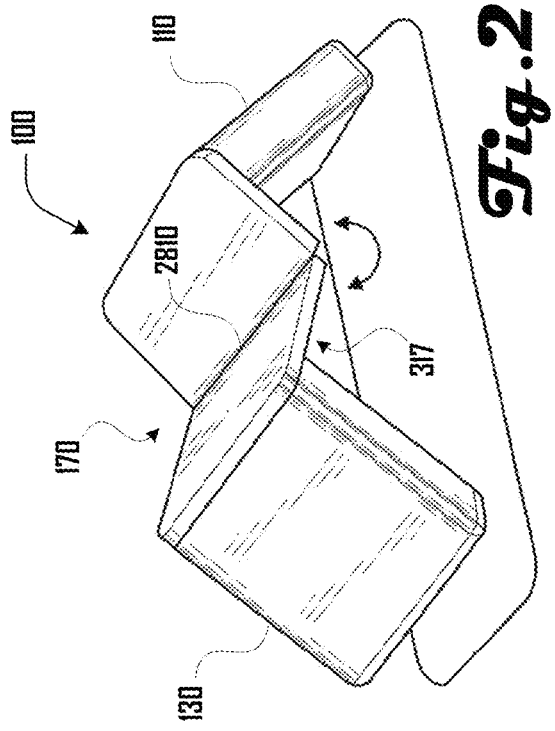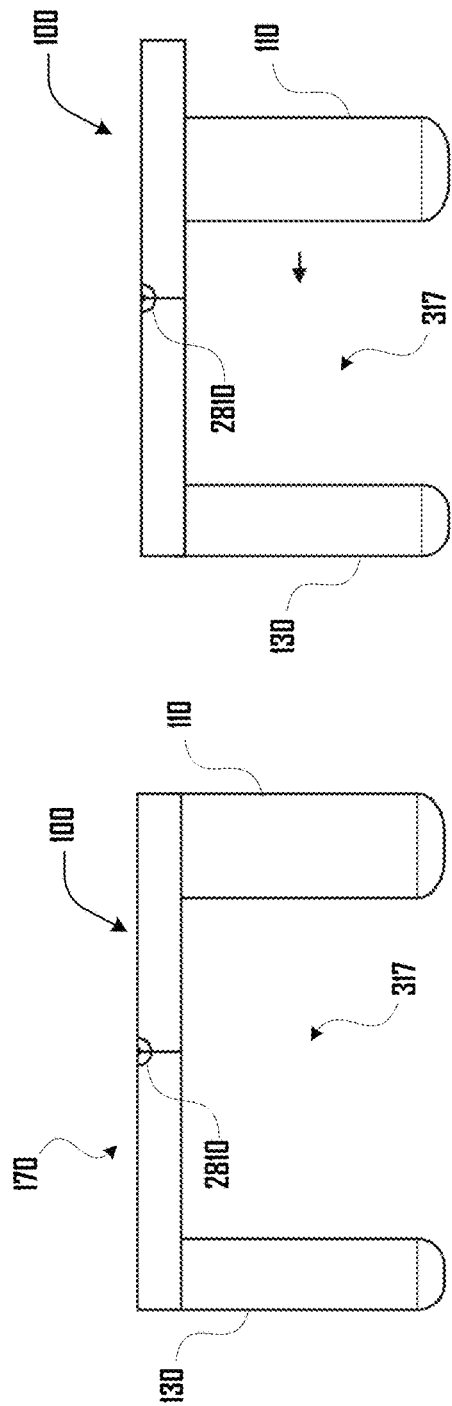

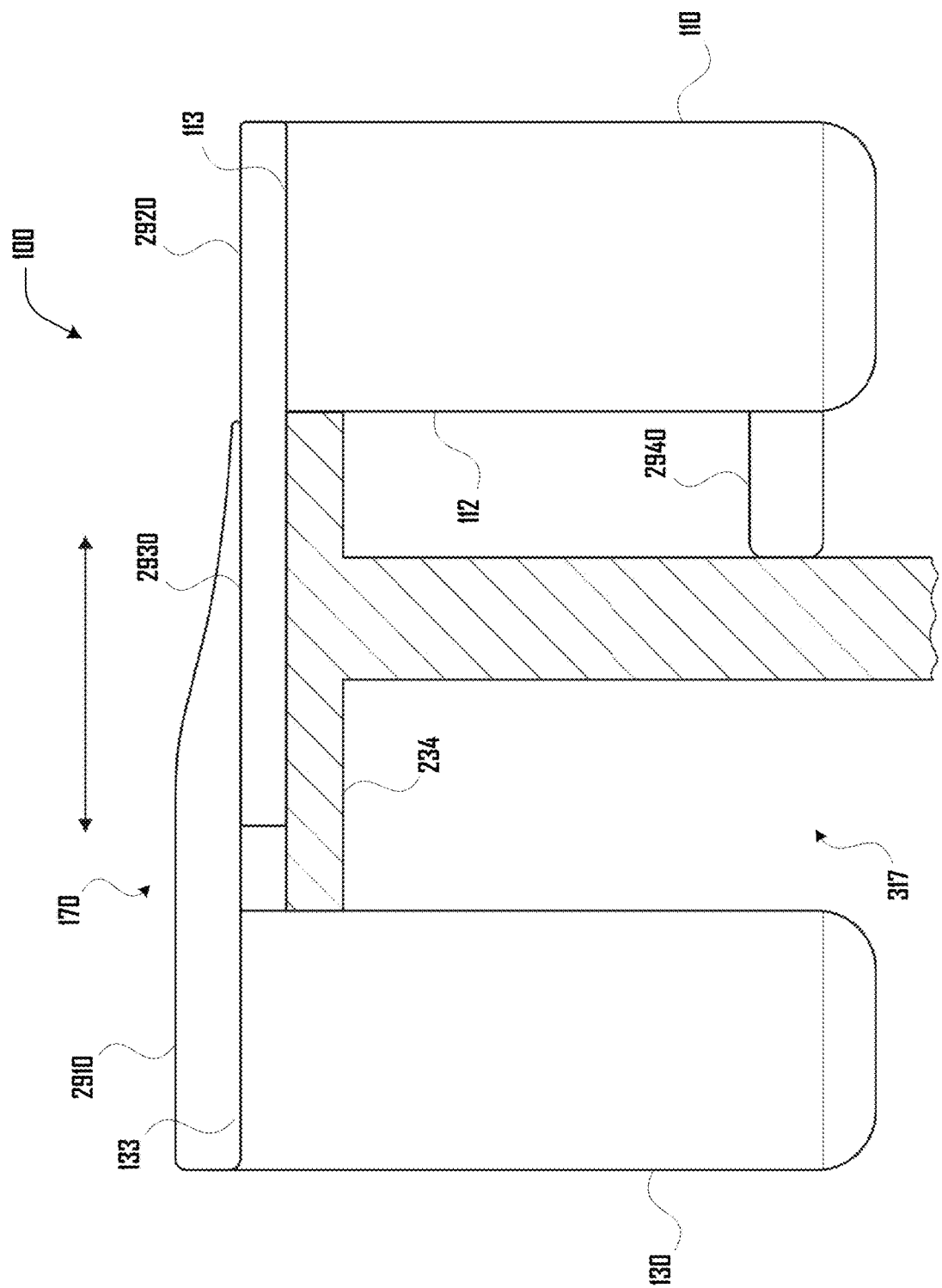

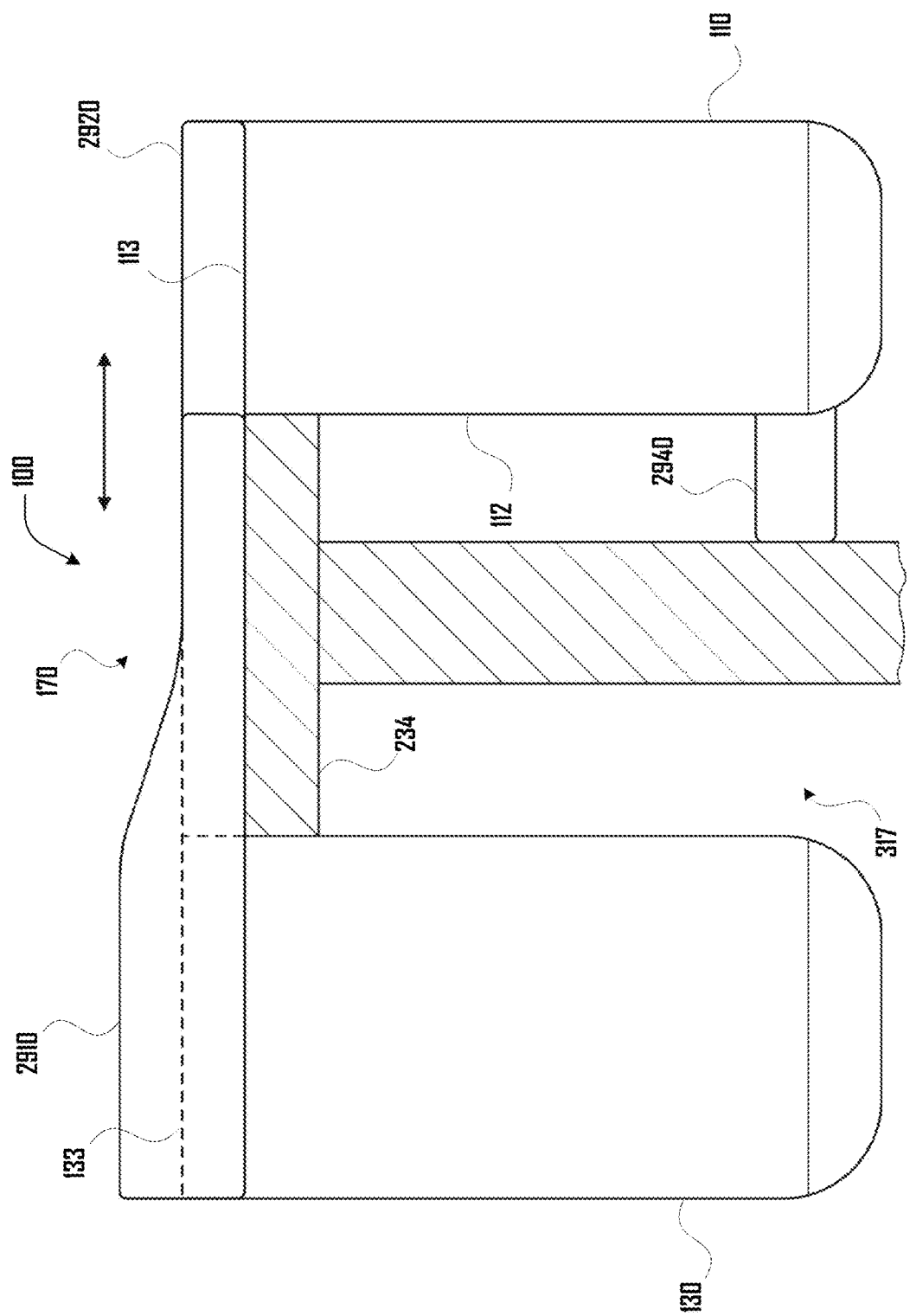

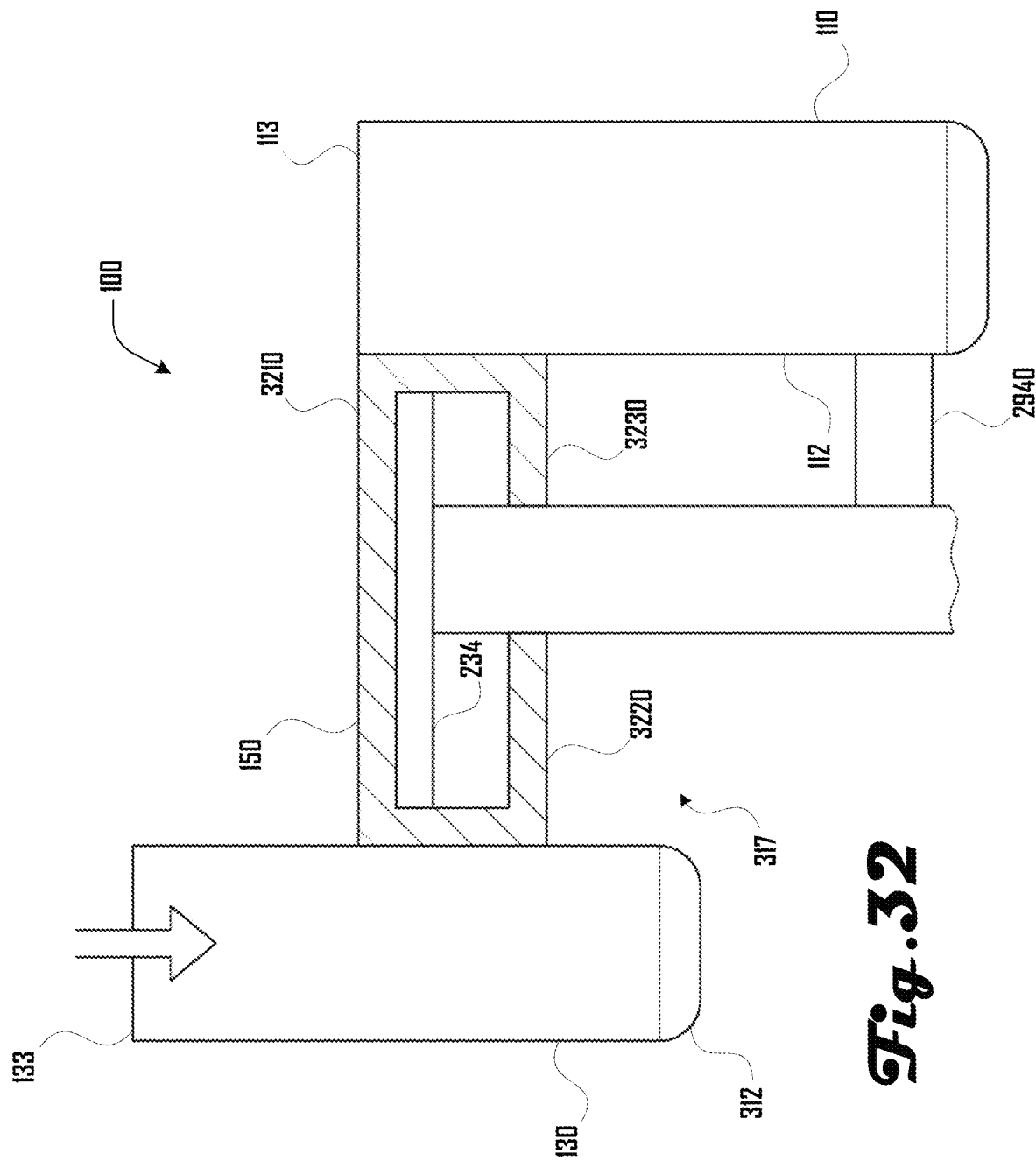

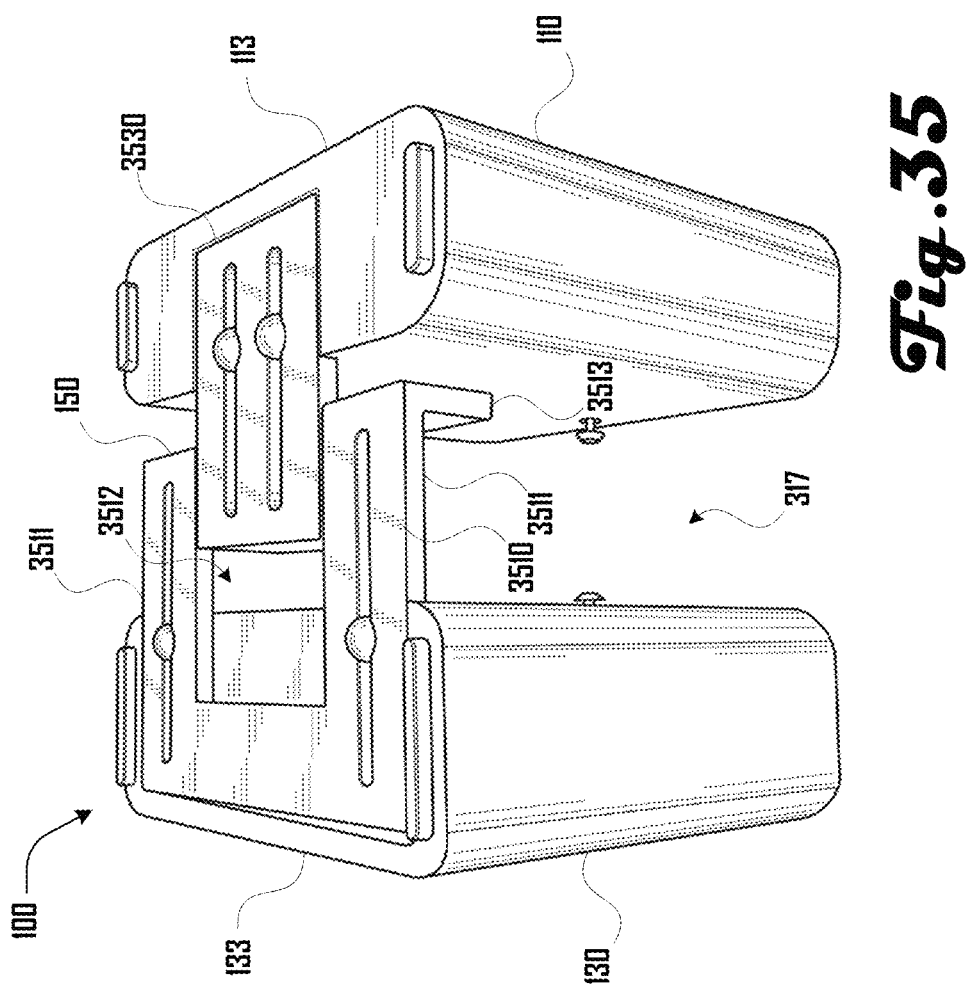

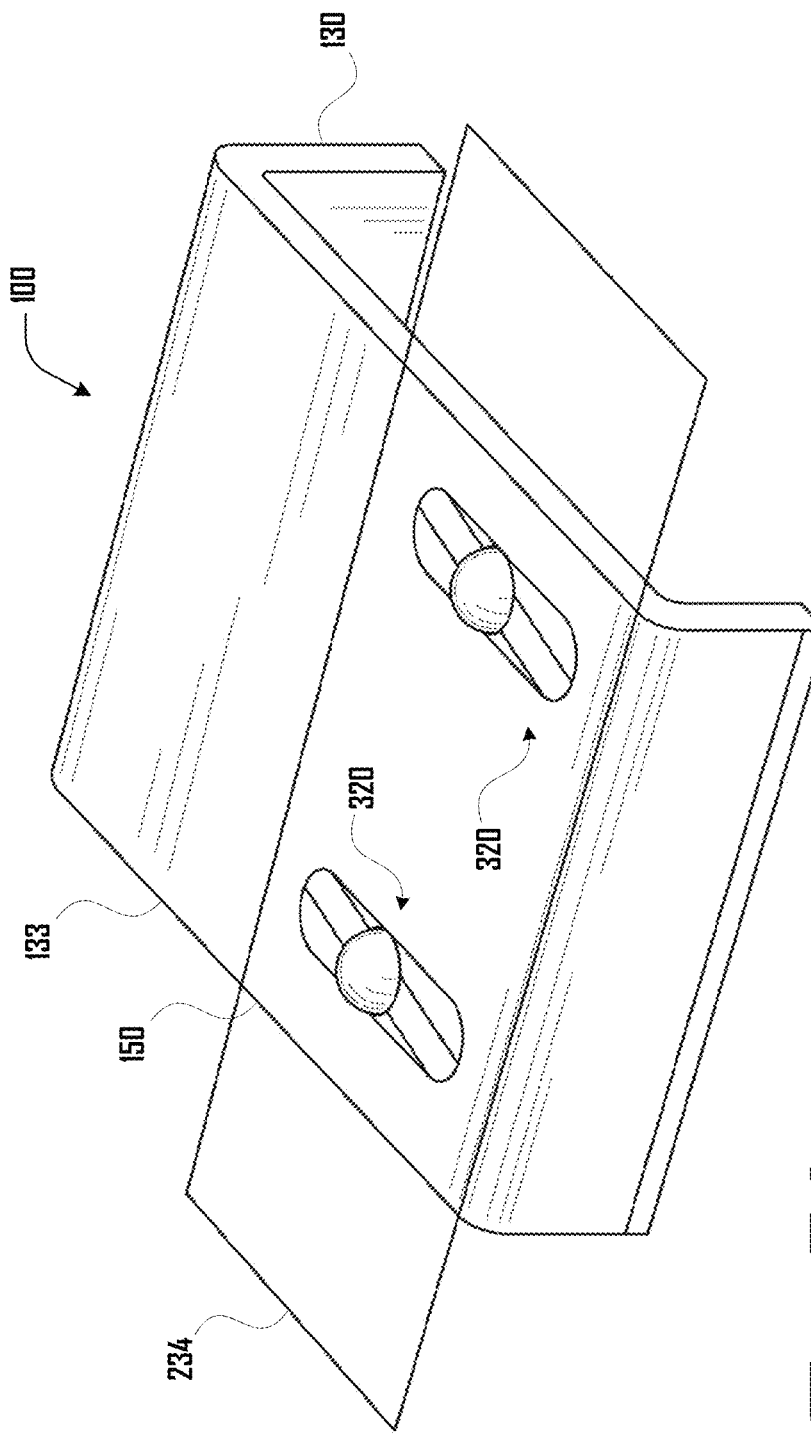

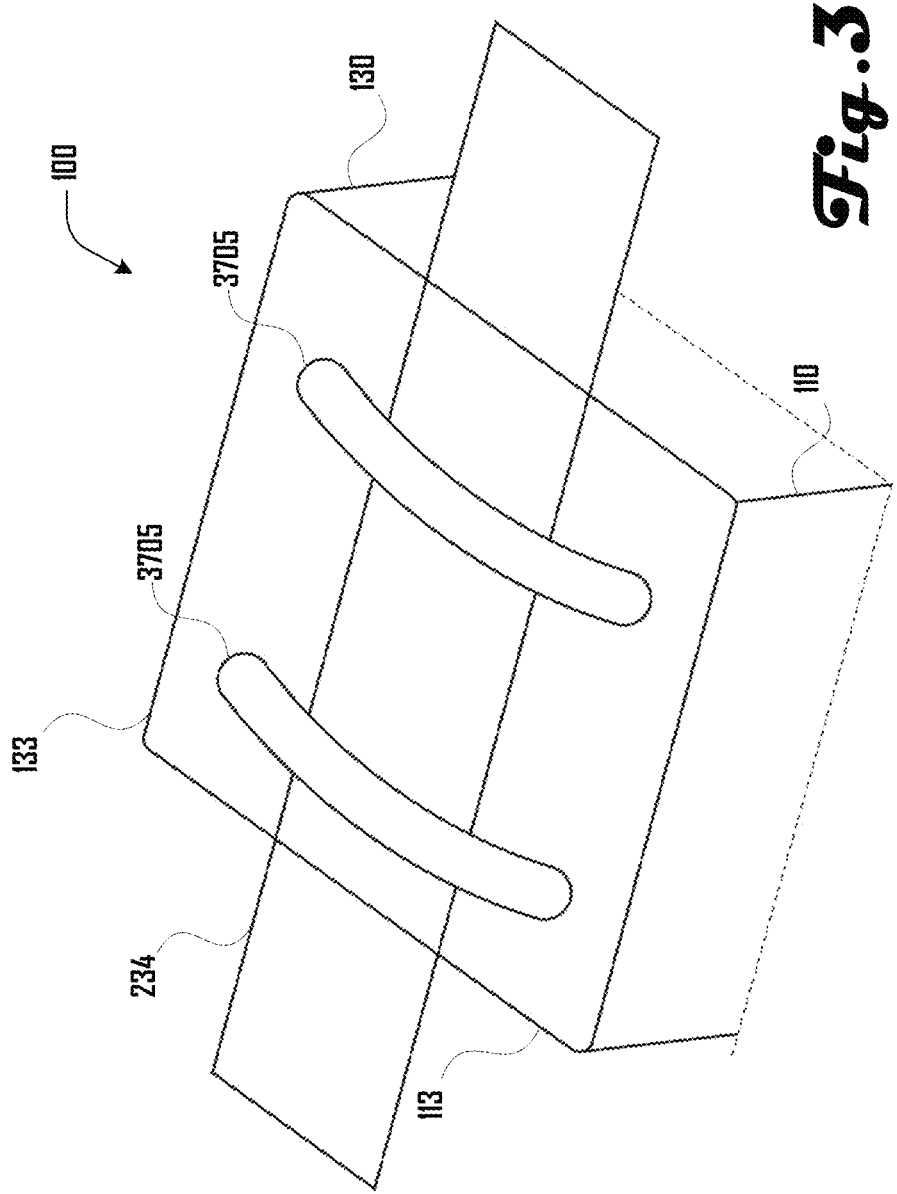

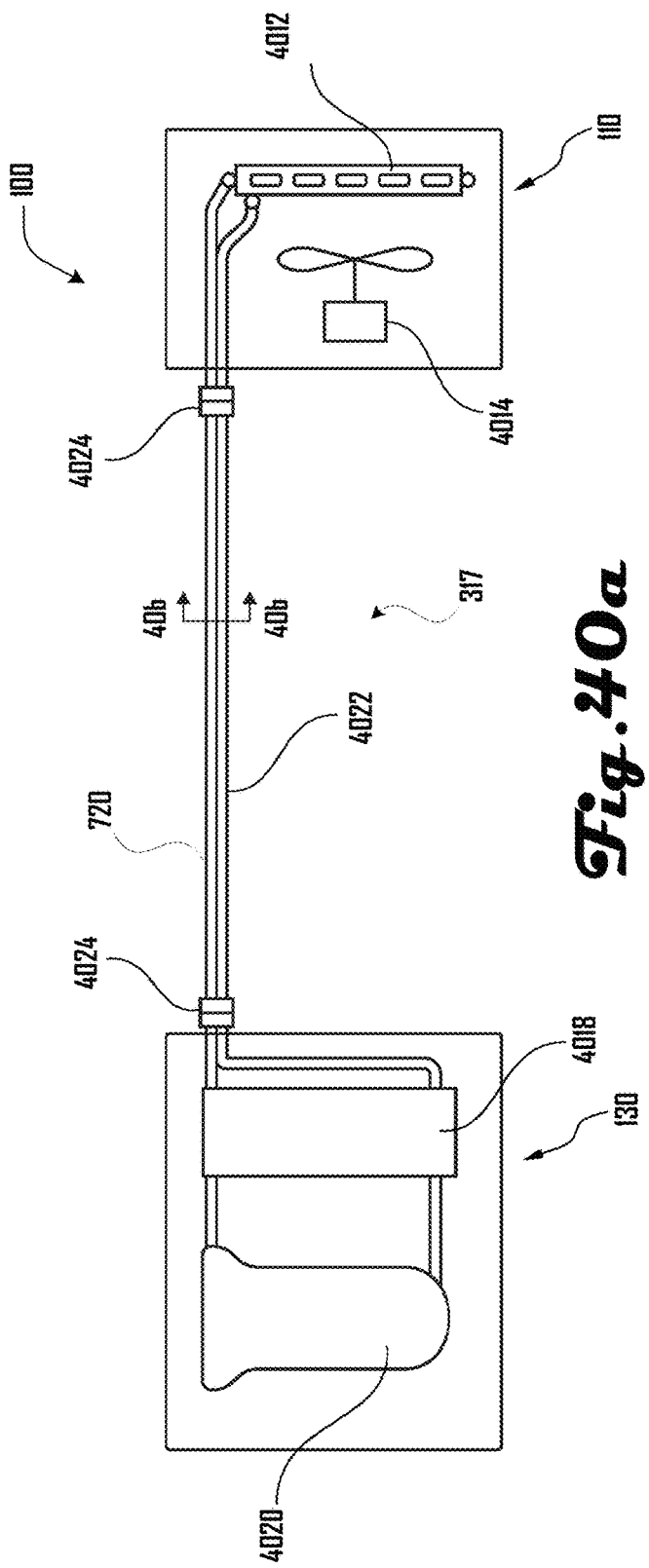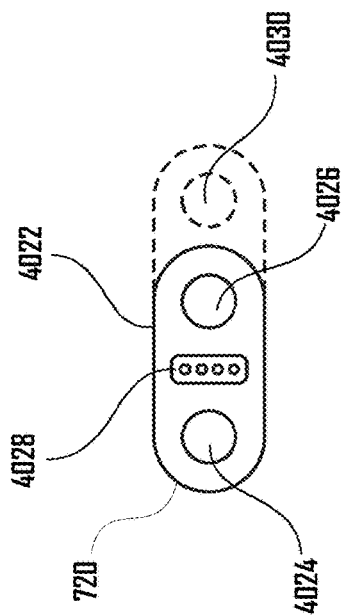

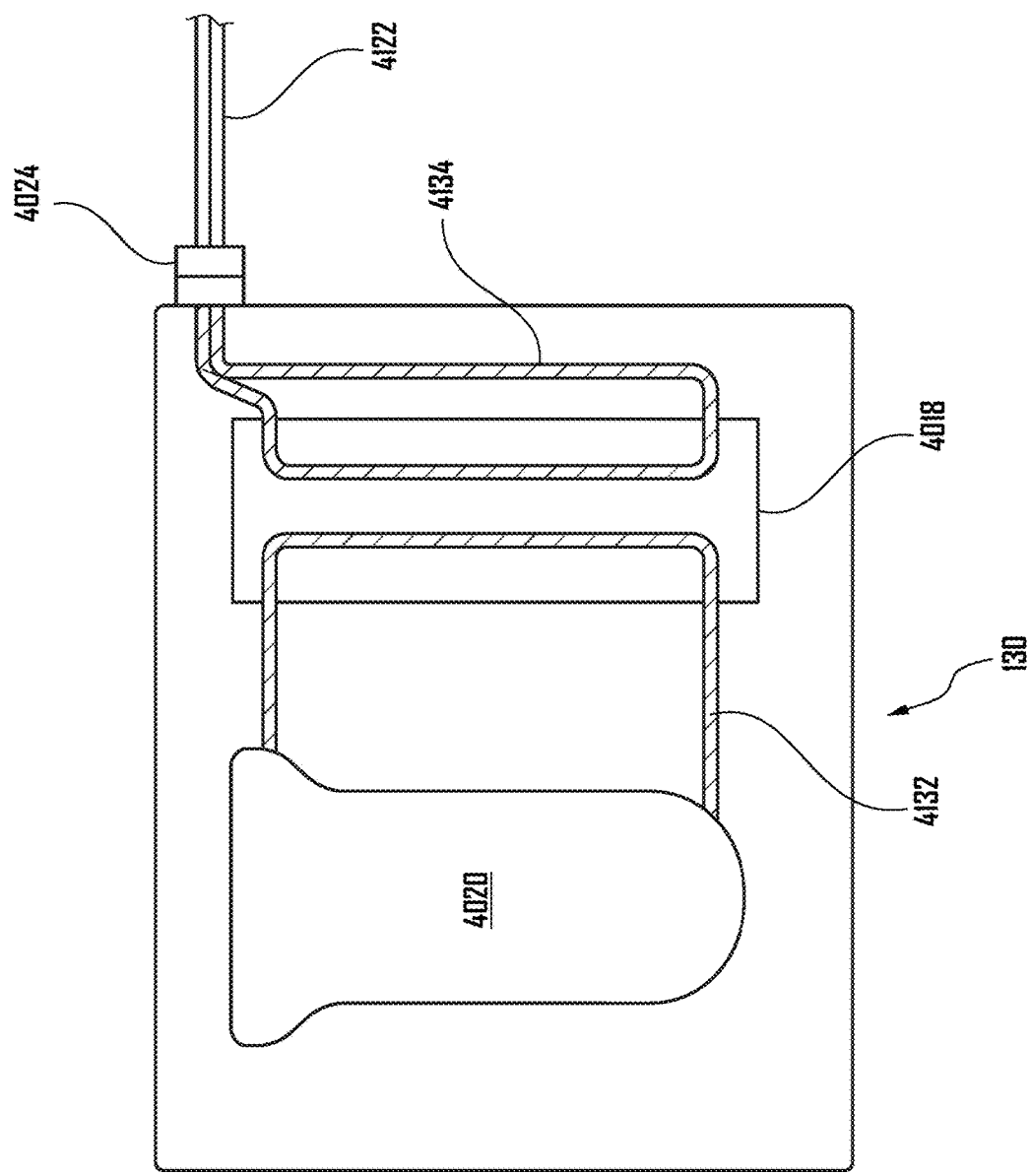

WINDOW INSTALLATION SYSTEM AND METHOD FOR SPLIT-ARCHITECTURE AIR CONDITIONING UNIT

CROSS-REFERENCE TO RELATED APPLICATIONS

This application is a non-provisional of and claims the benefit of U.S. Provisional Application No. 62/900,000, filed Sep. 13, 2019, entitled "WINDOW INSTALLATION SYSTEM AND METHOD FOR SPLIT-ARCHITECTURE HEATING OR COOLING UNITS," with attorney docket number 0111058-003PRO. This application is hereby incorporated herein by reference in its entirety and for all purposes.

This application is also related to U.S. patent application Ser. No. 12/724,036, filed Mar. 15, 2010, entitled "MODULAR AIR CONDITIONING SYSTEM," with attorney docket number 0111058-004US0. This application is hereby incorporated herein by reference in its entirety and for all purposes.

BACKGROUND

In 1931, H. H. Schultz and J. Q. Sherman invented the first room air conditioner. The unit sat on the ledge of a window, just as many modern air conditioners do. They were not widely purchased, however, due to their high cost at the time. It was not until the 1970s that window AC units made it into most homes in the United States, with over one million units sold in just 1953. Residential air conditioning has progressed a long way in the past several decades in terms of noise, efficiency, and cost. However, some features have remained unchanged, namely the installation process. Traditional room air conditioning units still sit on window ledges and are mounted in the sash of double-hung windows. The units usually require the user to screw in the unit, accordion panels, and/or an additional external bracket for support. During the installation process, users often have to precariously balance the air conditioning unit between the window sill and the windowpane while securing the system, which leads to units falling outside if the user accidentally loses his or her grip.

An alternative to window air conditioning units are ductless systems comprised of at least two units, one outdoor unit and one indoor unit. These systems either contain a singular indoor unit coupled with a singular outdoor unit and are referred to as mini-splits, or several indoor units coupled with a singular outdoor unit and are referred to as multi-splits. Ductless systems do not need a duct to carry cooled or warmed air as central or packaged systems do, but they still use ducts to contain the coolant fluid carrying heat in and out of the room. These systems must be installed through a wall by a professional HVAC technician. The professional installation process is typically expensive and time-consuming. The installed cost of a high-performance mini-split air conditioner for a single room can be more than 10 times that of a window unit capable of cooling the same space. However, the advantage of ductless systems is that they allow for much higher efficiency than window air conditioning units and are often much quieter.

With demand for air conditioners continuing to grow, decreasing the cost and increasing the convenience of installing high-efficiency HVAC systems would help to remove barriers to adoption. In addition, a safer and more user-friendly installation process would remove the dangers associated with configuring current air conditioning units.

BRIEF DESCRIPTION OF THE DRAWINGS

FIGS. 7 and 8 illustrate an external unit on top of a bracket with guiding wings of the external unit disposed within a guide slot in accordance with one example embodiment.

FIG. 10 illustrates an external unit resting on a fully extended pivot arm in accordance with one example embodiment.

FIG. 11 illustrates a pivot arm and external unit rotated approximately 90° in an external environment in accordance with one example embodiment.

FIG. 12 illustrates a mounting hook affixed to the internal unit that can be coupled with a mounting slot defined by the bracket in accordance with one example embodiment.

FIG. 20 illustrates a bracket comprising a single internal and external arm with a single guide and a top bar connecting the arms in accordance with one example embodiment.

FIG. 21 illustrates a bracket comprising a pair of internal and external arms with respective guides in accordance with one example embodiment.

FIG. 22 illustrates a bracket comprising an arm coupling and a hanging assembly for an internal unit in accordance with one example embodiment.

FIG. 23 illustrates installation of an external unit using a lowering strap in accordance with one example embodiment.

FIGS. 25a and 25b illustrate a top cover comprising a first and second portion, which can be configured to fit different sizes of sills in accordance with one example embodiment.

FIG. 26a illustrates a top cover that can be reduced in size in accordance with one example embodiment.

FIG. 26b illustrates a top cover that is wider than the width of the internal and external units in accordance with one example embodiment.

FIG. 27 illustrates small, medium and large top covers coupled over the tops of the internal and external units in accordance with one example embodiment.

FIGS. 28a and 28b illustrate a top cover comprising a hinge in accordance with one example embodiment.

FIG. 28c illustrates an external unit movably coupled to a bottom face of a top cover in accordance with one example embodiment.

FIG. 29 illustrates a top cover comprising first and second pieces that are movably coupled at an interface in accordance with one example embodiment.

FIG. 30 illustrates a top cover comprising first and second pieces that are movably coupled and sidewalls on edges of the first piece in accordance with one example embodiment.

FIG. 32 illustrates a bracket comprising a sill section and first and second coupling flanges in accordance with one example embodiment.

FIG. 35 illustrates a bracket comprising a first and second bracket plate, which are respectively coupled to the tops of the internal and external units in accordance with one example embodiment.

FIG. 36 illustrates a bracket comprising a plurality of latch assemblies in accordance with one example embodiment.

FIG. 37 illustrates an air conditioning unit coupled to a sill via a pair of lines that extend between and are coupled to the internal and external units in accordance with one example embodiment.

FIG. 40a illustrates a modular climate control unit in accordance with one example embodiment.

FIG. 40b illustrates a circulation hose in accordance with one example embodiment.

FIG. 41 illustrates an external unit comprising a heat pump/air conditioning cycle in accordance with one example embodiment.

Figure 1:
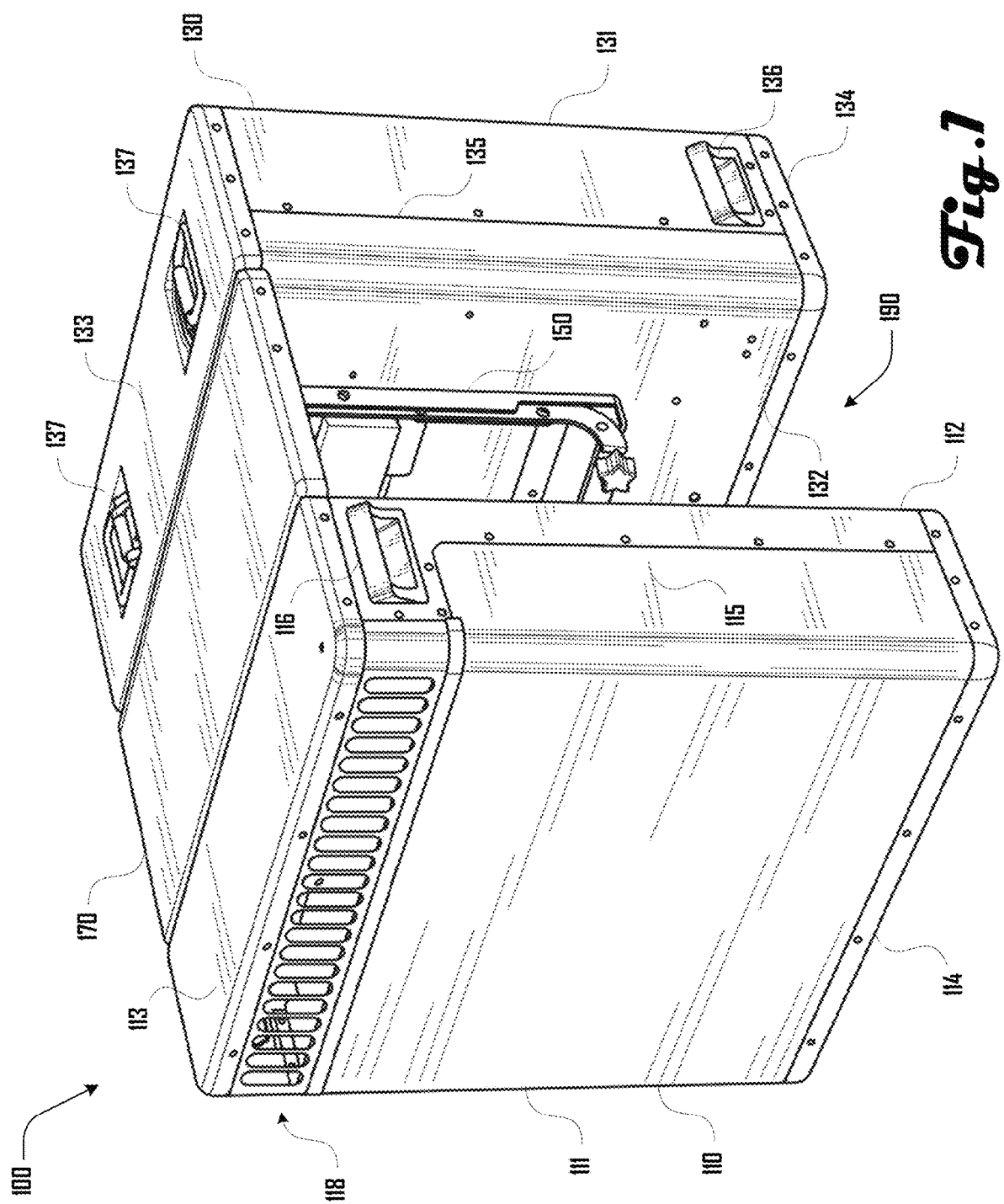
FIG. 1 illustrates a split-architecture air conditioning unit in accordance with one example embodiment.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

The description below discloses various embodiments of a novel installation system and method for installing a split-architecture air conditioning unit through a window. As discussed herein, the term air conditioning unit can apply to a unit configured to condition air in various suitable ways including one or more of heating, cooling, moving air with a fan, de-humidifying, humidifying, filtering, and the like.

The systems and methods described herein, in some examples, allow for the installation of an air conditioner/heat pump with split-architecture through a standard window opening with no specialized tools (removing the need of a professional HVAC technician), no modification of the building envelope, and preventing the possibility of the unit accidentally falling out of the window during installation.

Various embodiments can include an air conditioning unit installation that can comprise, consist of, or consist essentially of an outdoor unit, an indoor unit, a bracket assembly configured to facilitate installation and holding of the outdoor and indoor units on opposing sides of the sill of a window, and an operable coupling between the outdoor unit and indoor unit that provides for operation of the air conditioning unit (e.g., one or more fluid lines, power lines, communication lines, and the like). As discussed herein, one or more of such elements can be modular.

Various embodiments can minimize the number of steps required for installation of elements of the air conditioning unit, can reduce user error during installation of the air conditioning unit, and the like. For example, some embodiments include a weight offset mechanism that is directly incorporated into the bracket.

Various embodiments can provide for a smooth transition of the outdoor unit to a final position outside of the window including preventing the outdoor unit from falling out the window and providing for easy manipulation of the outdoor unit when initially engaging the outdoor unit with the bracket, and moving the outdoor unit through the window and rotating the outdoor unit from a horizontal installation orientation to a vertical installed orientation. For example, as discussed in more detail herein, some embodiments can include flanges on the sides of the bracket that help guide the user in safely pushing the unit out of the window. Additionally, various embodiments can be configured to be adapted to a variety of windows or openings.

Additionally, various embodiments can be configured to be adapted to a variety of windows in terms of size and shape, including width of the window, thickness of the window sill, distance between an internal wall face and an external wall face, height of the window sill from the floor of an indoor area, and the like.

Turning to FIG. 1, an example embodiment of an air conditioning unit 100 is illustrated, which can comprise an indoor unit 110, an outdoor unit 130, a bracket assembly 150 and top cover 170, which can define an air conditioning unit cavity 190 between the indoor and outdoor units 110, 130 and below the top cover 170. The air conditioning unit 100 can further comprise an operable coupling (not shown) between the outdoor unit 130 and indoor unit 110, such as below or within the top cover 170, that provides for operation of the air conditioning unit 100, which can include one or more fluid lines, power lines, communication lines, and the like.

As discussed more detail herein (see e.g., FIG. 2), in various embodiments, the bracket assembly 150 can be configured to couple with the sill of a window with the wall below the window sill being disposed within the cavity 190 such that the indoor unit 110 is disposed within an indoor space proximate to the window; the outdoor unit 130 is disposed in an outdoor space proximate to the window; and with the top cover 170 and operable coupling extending through the window and over the sill of the window.

As shown in the example of FIG. 1, the internal unit 110 can be generally cuboid and define a front face 111, internal face 112, top face 113, bottom face 114 and side faces 115. A pair of internal unit handles 116 can be disposed on the opposing side faces 115 proximate to the top face 113 of the internal unit 110. The internal unit handles 116 can be used for lifting the internal unit during installation of the internal unit 110 as discussed in more detail herein. A grille 118 can be defined by a portion of the front face 111, which can provide a passage from inside the internal unit 110 through which conditioned air can be expelled into an internal environment and/or air can be taken in from the internal environment as discussed in more detail herein.

The external unit 130 can be generally cuboid and define a front face 131, internal face 132, top face 133, bottom face 134 and side faces 135. A pair of external unit side-handles 136 can be disposed on the opposing side faces 135 proximate to the bottom face 134 of the external unit 130. The external unit side-handles 136 can be used for lifting the external unit 130. During installation of the external unit 130 as discussed in more detail herein. One or more external unit top-handles 137 can be disposed on the top face 133 of the external unit 130 and can be used for lifting and manipulating the external unit 130 during installation of the external unit 130 as discussed in more detail herein. The external unit 130 can further include one or more grill, port or other suitable structure(s) (not shown), which can provide a passage from inside the external unit 130 through which conditioned air can be expelled into an external environment and/or air can be taken in from an external environment as discussed in more detail herein.

Figure 2:
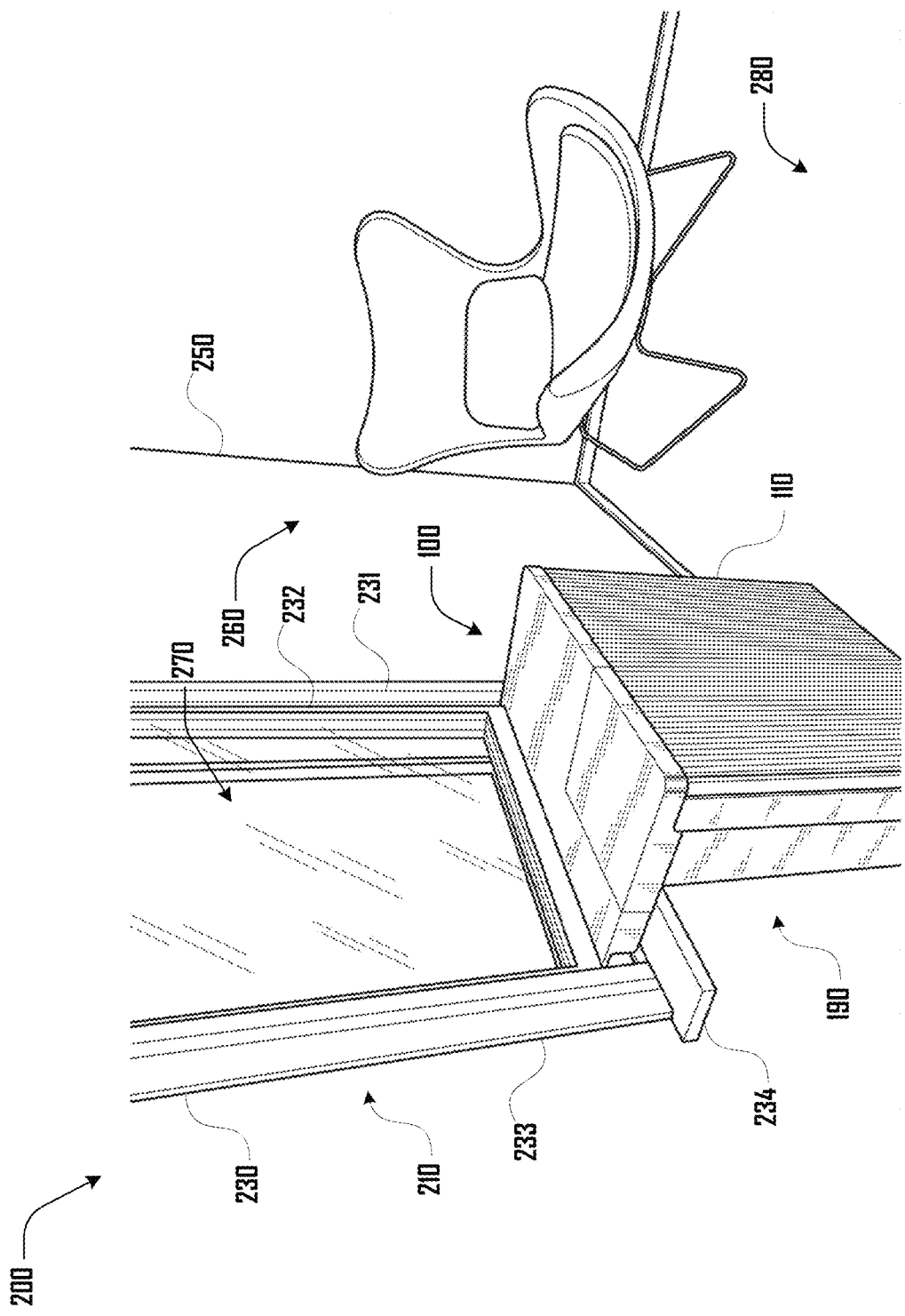
FIG. 2 illustrates a split-architecture air conditioning unit disposed within a window in accordance with one example embodiment.

Turning to FIG. 2, an example building 200 is shown that includes a wall assembly 210 with a window 230 disposed within a wall 250, which separates an internal environment 260 within the building 200 (e.g., a room) from an external environment 270 that is external to the building 200 (e.g., an outdoor area). The example window 230 comprises a sash 231 and pane 232 that moveably reside within a frame 233 that includes a sill 234. The sash 231 can be configured raise and lower within the frame 231, and when open, define an opening between the indoor and external environments 260, 270.

An example air conditioning unit 100 is shown disposed extending through the window 230 with the internal unit 110 disposed within the internal environment 260 and the external unit 130 disposed in the external environment 270. The internal and external units 110, 130 extend below the sill 234 toward a floor 280 of the building 200 with a portion of the wall 250 below the sill 234 disposed within the cavity 190 of the air conditioning unit 190. As discussed herein, the air conditioning unit 100 can be used to condition air in the internal and/or external environments 260, 270. For example, in various embodiments, the air conditioning unit 100 can be configured to cool the internal environment 260. In various embodiments, the air conditioning unit 100 can be configured to heat the indoor environment 260.

While some embodiments are configured for residential use of an air conditioning unit within windows 230 of a home, it should be clear that an air conditioning unit 100 of further embodiments can be used in various other suitable ways, including in commercial settings such as in an office, factory, laboratory, school, vehicle, or the like. Also, the terms internal and external should not be construed to be limiting and are merely intended to represent separate environments, which can be partially or completely separated in various suitable ways, including by structures such as walls, windows, doors, screens, shades, partitions, sheets, and the like. Additionally, while various examples, can relate to air conditioners disposed within a window 230, it should be clear that further examples can be disposed in any suitable opening between internal and external environments, such as a door, slot, flue, vent, skylight, drain, or the like. Accordingly, the specific examples discussed herein should not be construed to be limiting on the wide variety of air conditioning units that are within the scope and spirit of the present disclosure.

In various embodiments, an air conditioning unit 100 can be modular with the internal and external units 110, 130 configured to be separated from the bracket assembly 150. Such embodiments can be desirable in some examples because having such elements separate can make installation of the air conditioner unit 100 easier compared to an air conditioning unit 100 that is a unitary structure.

Figure 3:
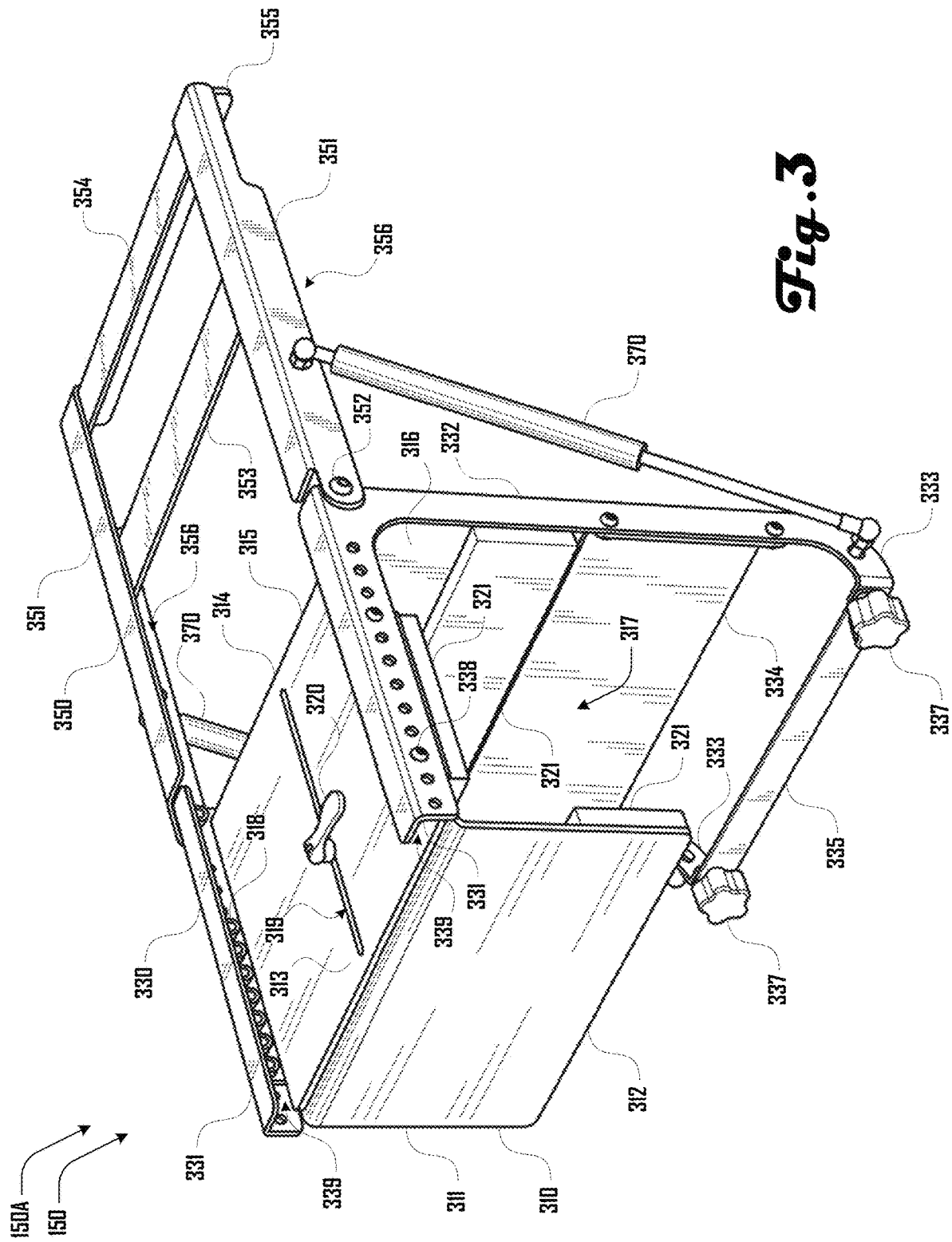
FIG. 3 illustrates a bracket assembly configured to facilitate installation of the internal and external units in an external environment in accordance with one example embodiment.

In various embodiments, the bracket assembly 150 can be configured to facilitate installation of the internal and external units 110, 130, including facilitating moving the external unit 130 through an opening (e.g., a window 230) and positioning the external unit in an external environment 270 proximate to the opening. FIG. 3 illustrates one example embodiment 150A of a bracket 150 that can be configured in such a way. Specifically, the example embodiment 150A of the bracket assembly 150 includes a sill coupling component 310, an external coupling component 330 and a pivot arm 350 that is biased with a pair of gas springs 370.

The sill coupling component 310 includes a first sill unit 311 that includes an internal plate 312 and a first top plate 313. The sill coupling component 310 further includes a second sill unit 314 that includes an external plate 315 and a second top plate 316. The first and second sill units 311, 314 can be coupled to define a sill cavity 317. The second sill unit 314 can comprise a pair of coupling tabs 318 that extend perpendicular to the face of the second top plate 316 from respective opposing sides of the second top plate 316. The second top plate 316 can define a coupling slot 319 through which a coupling latch assembly 320 can extend, with the coupling latch assembly 320 being configured to releasable couple the first and second top plates 313, 316 such that the size of the sill cavity 317 can be configured for various sizes of window sills as discussed herein. A plurality of coupling pads 321 can be disposed on internal faces of the sill coupling component 310 extending into the sill cavity 317, which can be configured to engage with portions of a window assembly including a sill, internal portion of a wall, external portion of a wall, and the like.

The external coupling component 330 can define a pair of opposing sill arms 331 that extend to respective external arms 332. The external arms 332 can extend generally perpendicular to the sill arms 331 and curl inward to define coupling feet 333. A pair of support bars 334, 335 can extend between the external arms 332 and coupling feet 333 with support knobs 337 disposed on the support bar 335 proximate to the coupling feet 333.

The sill arms 331 can be coupled to the coupling tabs 318 of the sill coupling component 310 via a plurality of bolts 338, with the sill arms 331 and sill coupling component 310 defining a sill arm guide slot 339, which as discussed in more detail herein, can be configured to guide and secure an external unit 130 during positioning and installation of the external unit 130 in an external environment 270 of a building 200 proximate to a window 210. While bolts 338 can be used in some examples, further embodiments can include various other suitable structures such as an integrated locking and release mechanism, such as a quick-release clamp or a CAM lock.

The pivot arm 350 comprises a pair of pivot rails 351 that are rotatably coupled to the coupling component 130 via respective rotatable couplings 352. The pivot rails 351 are disposed in parallel and with support bars 353, 354 extending between the pivot rails 351, with the second support bar 354 defining a support foot 355.

In the configuration shown in FIG. 3, the pivot rails 351 can be disposed extending along an axis that is coincident with a respective axis of the sill arms 331 of the coupling component 330 and can define pivot arm guide slots 356 that have a coincident axis with the sill arm guide slots 339. As discussed in more detail herein, the pivot arm guide slots 356 and sill arm guide slots 339 can be configured to guide and secure an external unit 130 during positioning and installation of the external unit 130 in an external environment 270 of a building 200 proximate to a window 210.

The pivot arm 350 can be configured to rotate toward the external arms 332 of the coupling component 330 can assume a configuration where the pivot rails 351 of the pivot arm 350 are parallel to and/or engaging the external arms 332 of the coupling component 330. Accordingly, in various embodiments, the pivot arm 350 can be configured to pivot 90°. The pivot arm 350 can be biased by a pair of gas springs 370 that extend between the pivot arm 350 and coupling component 330. A biasing force of the gas springs 370 can correspond to the weight of the external unit 130.

For example, as discussed in more detail herein, during installation, an external unit 130 can be moved on to the pivot arm 350 and the biasing force of the gas springs 370 in some embodiments can be sufficient to hold the pivot arm 350 and external unit 130 in place, but with only a small amount of force being required (e.g., applied by a user) to overcome the holding force of the gas springs 370 so that the pivot arm 350 and external unit 130 rotate downward. In further embodiments, the biasing force of the gas springs 370 can be slightly overcome by the weight of the pivot arm 350 and external unit 130 such that the pivot arm 350 and external unit 130 rotate downward smoothly and in a controlled manner.

Figure 4:
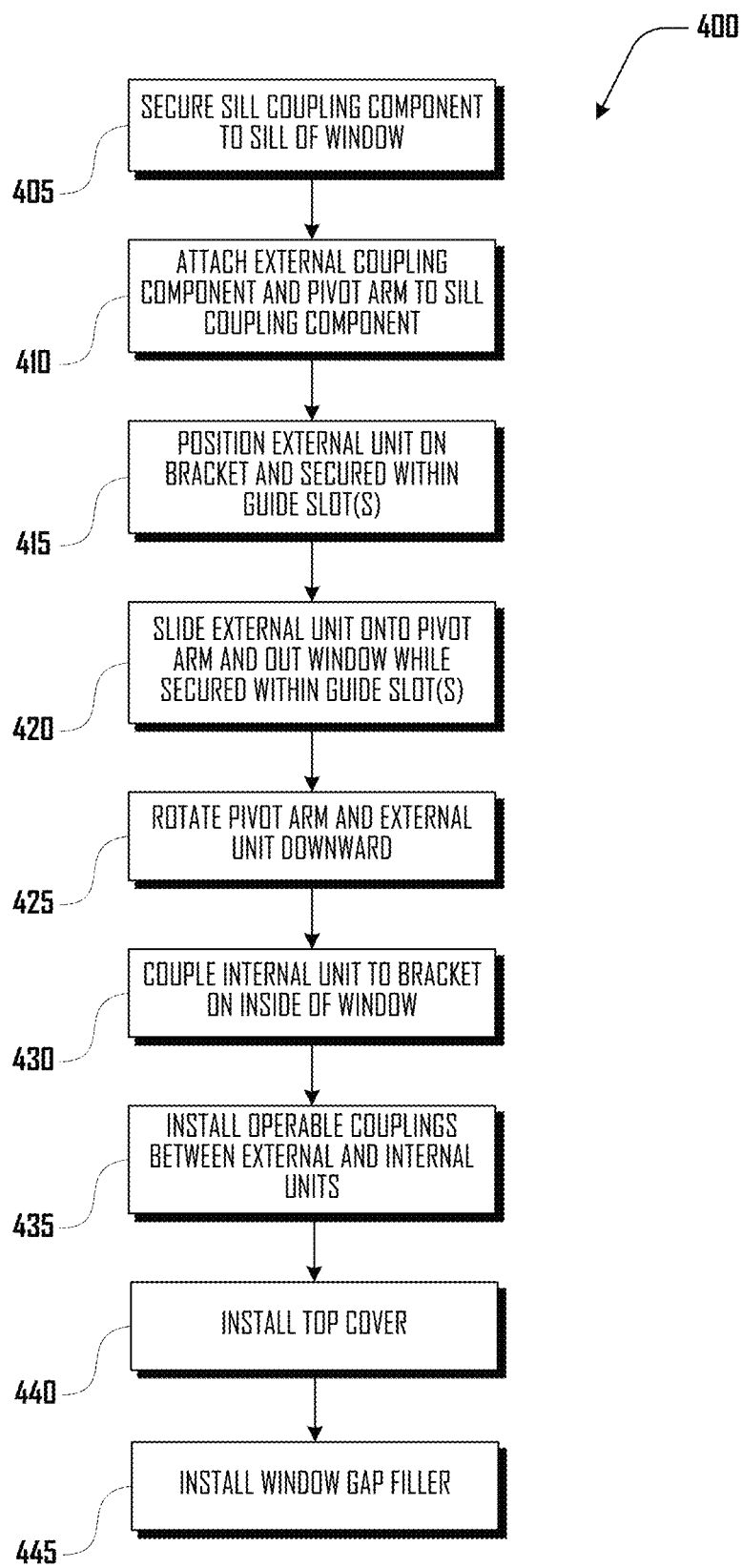
FIG. 4 is a high-level block diagram illustrating an example method of installing an air conditioning unit in a window in accordance with one example embodiment.

Turning to FIG. 4, an example method 400 of installing an air conditioning unit 100 in a window is presented with example embodiments of portions of the method 400 illustrated in FIGS. 5a-15.

Figure 5A:
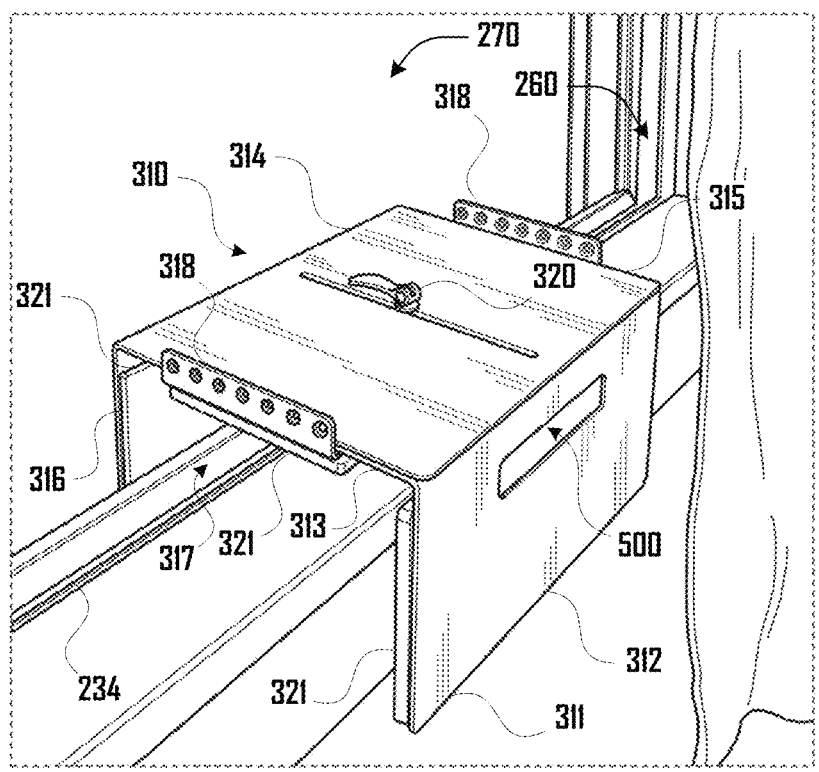
FIGS. 5a and 5b illustrate a coupling component positioned over the sill of a window and adjusted to fit the width of the sill in accordance with one example embodiment.

The method 400 begins at 405 where a sill coupling component 310 is secured to a sill 234 of a window 230. For example, as shown in FIG. 5a, the coupling component 310 can be positioned over the sill 234 of the window 230 with the first and second top plates 313, 316 of the coupling component 310 disposed over the sill 234 with the internal and external plates 312, 315 extending downward from the sill within the internal and exterior environments 260, 270 respectively.

Figure 5B:
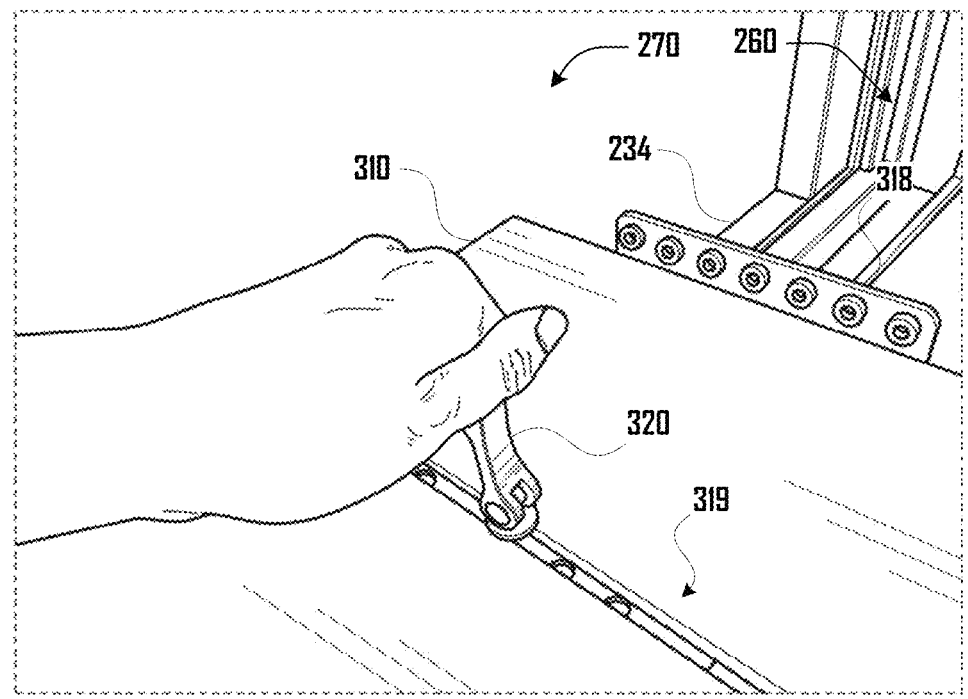

The coupling latch assembly 320 being configured to releasable couple the first and second top plates 313, 316 such that the size of the sill cavity 317 can be configured for the specific size of the sill 234. For example, as shown in FIG. 5b, the latch assembly 320 can be rotated upward to loosen the coupling between the first and second top plates 313, 316 such that the sill cavity 317 can be widened and/or narrowed for the size of the sill 234 and then rotated downward to as shown in FIG. 5a to tighten the coupling between the first and second top plates 313, 316 such that the size of the sill cavity 317 is fixed. Various suitable latch assemblies or other suitable mechanisms can be used in further embodiments, and in some examples, such mechanisms can be present in any suitable plurality (see, e.g., FIG. 36 illustrating a bracket 150 comprising a plurality of latch assemblies 320).

In various embodiments, the coupling pads 321 within the sill cavity can comprise an elastic pad that can provide for a secure coupling between the sill coupling component 310 and the sill 234 based on gripping of the coupling pad(s) with the sill 234. Additionally, as shown in FIG. 5a, the internal plate 312 of the first sill unit 311 can comprise a mounting slot 500, which can be configured for mounting the internal unit 110 of an air conditioning unit 100 as discussed herein. As discussed herein, reference to the sill 234 should be construed broadly as potentially covering various suitable elements of a window 230 that define a width between an internal and external environment 260, 270, including framing elements of the window 230, internal and/or external ledges, and other features that may be present in a window assembly 230 that define a width associated with the window 230 between an internal and external environment 260, 270.

Figure 6A:
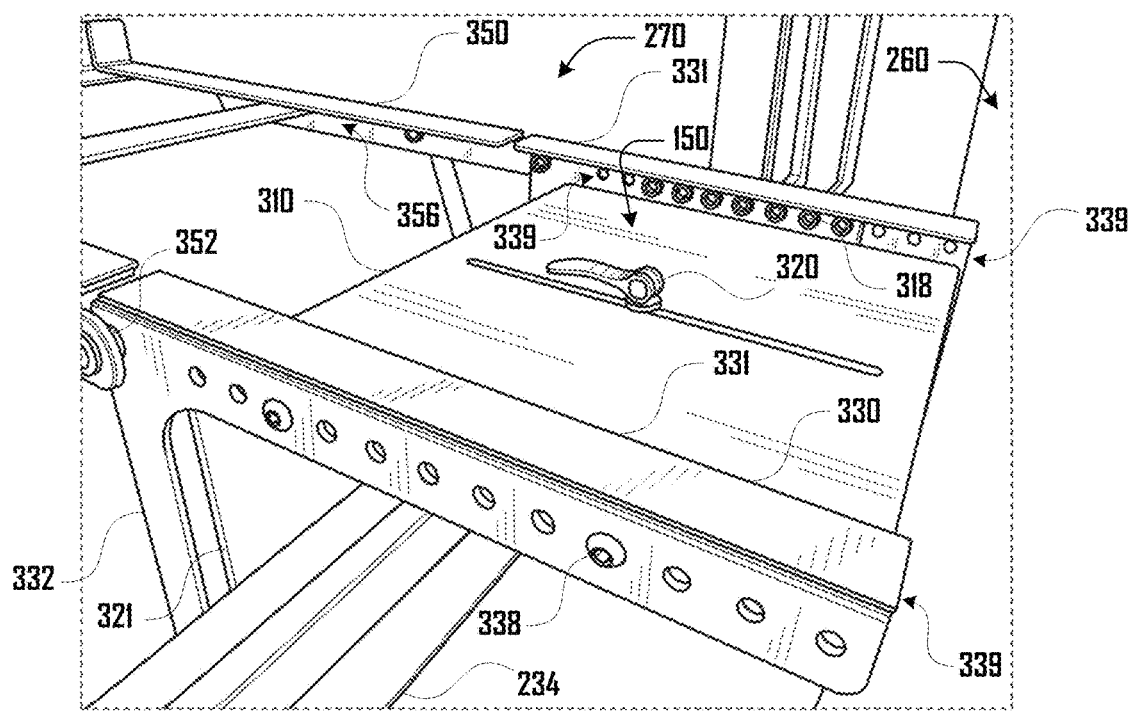
FIGS. 6a and 6b illustrate an external coupling component and pivot arm attached to a sill coupling component in accordance with one example embodiment.
Figure 6B:
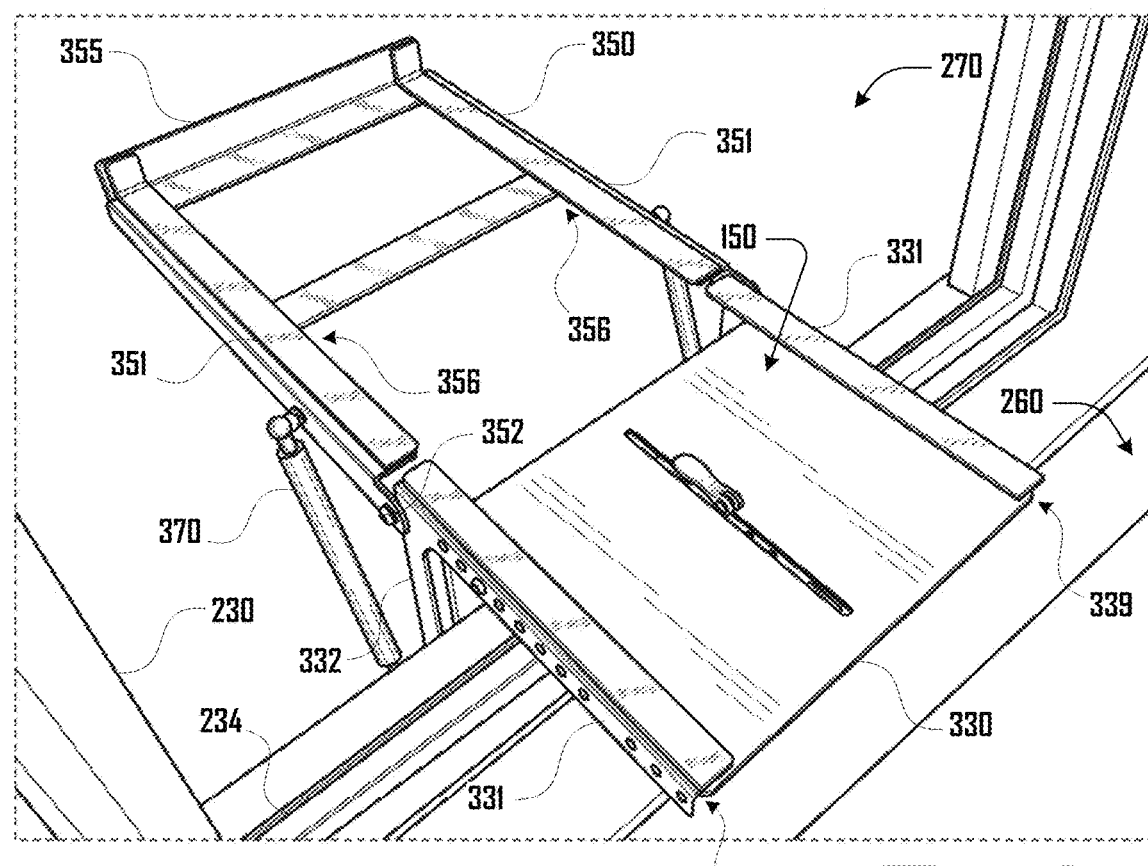

Returning to the method 400 of FIG. 4, at 410, an external coupling component 330 and pivot arm 350 are attached to the sill coupling component 310. For example, as shown in FIGS. 6a and 6b, the sill arms 331 of the external coupling component 330 can be secured to the coupling tabs 318 of the sill coupling component 310 via a plurality of bolts 338. In further embodiments, bolts or other suitable coupling elements can be used to couple the sill coupling component 310 and the external coupling component 330 in various suitable locations. Also, while the sill coupling component 310 and the external coupling component 330 are shown in some examples as being separable elements, in further embodiments, such elements can be a single unitary element or can comprise any suitable plurality of separate parts.

Also, while various examples herein discuss various elements of a bracket 150, in some embodiments, some or all elements can be part of a top cover 170 or other suitable portion of an air conditioning unit 100. Accordingly, elements being discussed in reference to a bracket 150 should not be construed as being limited to being part of a bracket 150. Accordingly, in some embodiments, the terms bracket 150 and top cover 170 can be used interchangeably, or can be used to describe a combined structure. Moreover, in some embodiments, a bracket 150 and/or top cover 170 as discussed herein can be specifically absent.

As shown in FIGS. 6a and 6b, the sill arms 331 of the external coupling component 330 can extend over the sill 234 and out the window 230 generally parallel to the axis or plane of the sill 234. The external arms 332 of the external coupling component 330 can extend downward from the sill 234 in the external environment 270 perpendicular to the sill arms 331. A portion of external coupling component 330 (e.g., the support knobs 337) can engage a portion of the building below the sill 234, which can support the bracket assembly 150 and can support the internal and/or external units 110, 130 when mounted on the bracket assembly 150; can support the external unit 130 on the pivot arm 350 during installation of the external unit 130, and the like.

The pivot arm 350 can extend further into the external environment 270 from the rotatable couplings 352 and the pivot rails 351 can be disposed in parallel and can extend along an axis that is coincident with a respective axis of the sill arms 331 of the coupling component 330. A second support bar 354 can define a support foot 355, which can support the external unit 130 and act as a stop during installation of the external unit 130 as discussed herein.

Returning to the method 400 of FIG. 4, at 415 the external unit 130 is positioned on the bracket 150 and secured within one or more guide slots 339, 356 of the bracket 150. For example, FIG. 7 illustrates an example embodiment of an external unit 130 that has been placed on top of a bracket 150 with guiding wings 720 of the external unit 130 disposed within the guide slot 339 of the bracket 150. FIG. 8 illustrates a close-up example embodiment of an external unit 130 that has been placed on top of a bracket 150 with guiding wings 720 of the external unit 130 disposed within the guide slot 339 of the bracket 150.

As shown in FIGS. 7 and 8, the guiding wings 720 can comprise elements that extend from the internal face 132 of the external unit 130, which are configured to reside and translate within the guide slots 339, 356 of the bracket 150 such that the external unit 130 is able to slide over the top of the bracket 150, and pivot with the pivot arm 350, while preventing the external unit 130 from falling off the sides or front of the bracket 150.

For example, the external unit 130 can be placed on the bracket 150 disposed on the sill 234 of a window 230 with the guiding wings 720 initially in the guide slot 339 and the external unit 130 can be pushed out the window 130 on the bracket 150. The guide slots 339, 356 can prevent the external unit 130 from accidentally falling out the window 130 off the bracket 150. Especially for windows 150 in higher stories of a building, preventing such an accidental fall of the external unit 130 off the bracket 150 can be desirable for preventing damage to the external unit 130; damage to property that the external unit 130 may fall on; injury to persons that the external unit 130 may fall on, and the like.

Figure 9A:
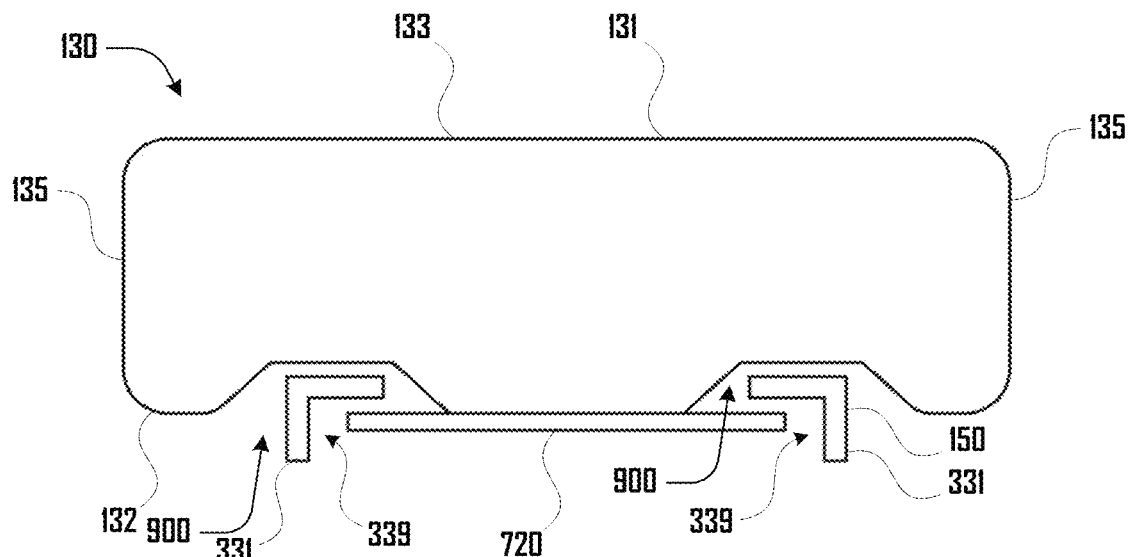
FIGS. 9a and 9b illustrate the internal face of an external unit disposed on a bracket in accordance with one example embodiment.
Figure 9B:
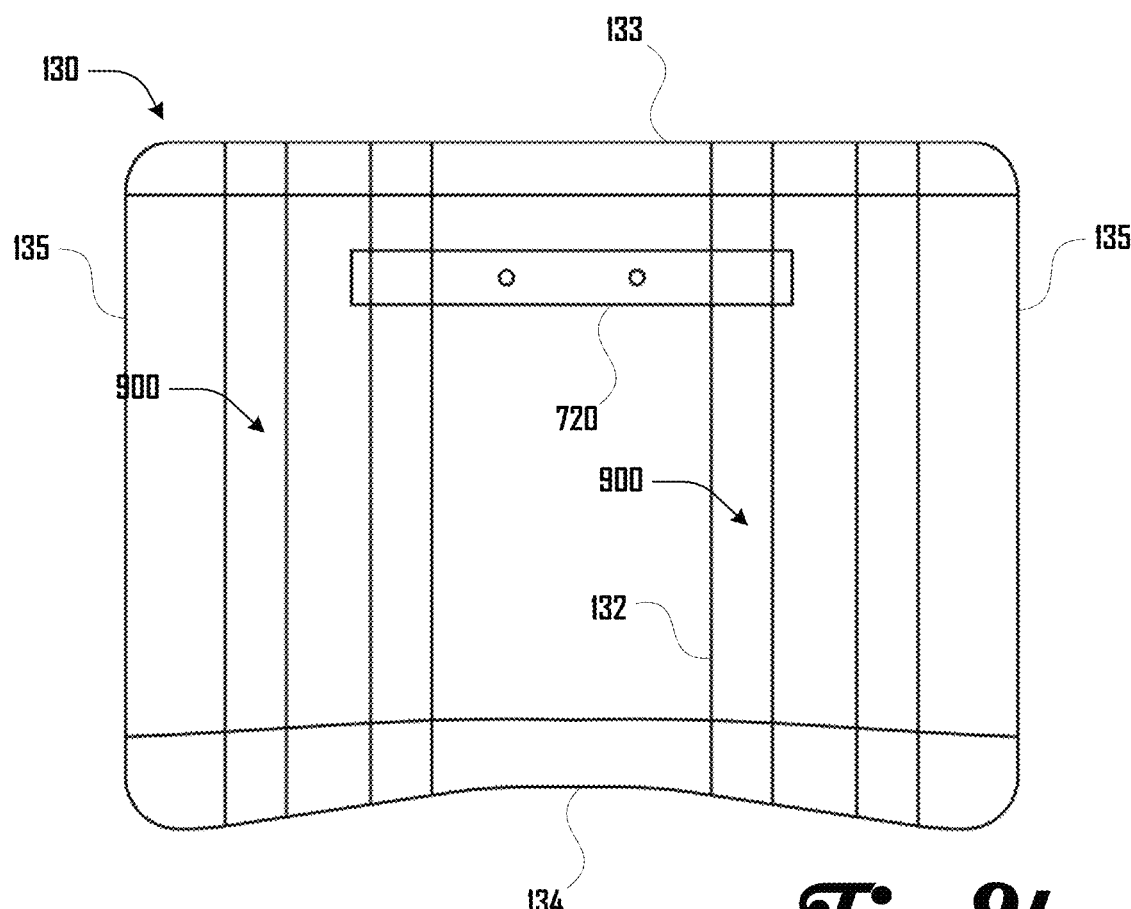

Further embodiments can be configured with structures that provide for seating of one or more guiding wings 720 within the guide slot 339. For example, FIG. 9a illustrates a side view of the top face 133 of the external unit 130 where the internal face 132 of the external unit 130 is disposed on the bracket 150. The external unit 130 can comprise a pair of guide grooves 900 that are elongated concave portions on the internal face 132 of the external unit 130 that extend in parallel from the top face 133 to the bottom face 134 of the external unit 130 as shown in FIG. 9b. As illustrated in FIG. 9a, the guide grooves 900 can correspond to the sill arms 331 such that when the internal face 132 of the external unit 130 is placed on the bracket 150, the external unit 130 naturally aligns on the bracket 150 as the guide groves 900 engage with the sill arms 331 and/or pivot rails 351. The guide grooves 900 can further allow for such alignment to be maintained as the external unit 130 is slid over the sill arms 331 and/or pivot rails 351 so the external unit 130 can then pivot downward via the pivot arm 350 as discussed herein.

In some embodiments, the guide wing(s) 720 can comprise a unitary bar as shown in the example of FIGS. 9a and 9b or can comprise separate bars as shown in FIGS. 7 and 8. Such one or more bars of one or more guide wings 720 can be sized such that when the guide wing(s) 720 is/are within at least one of the guide slots 339, 356, the one or more guide wings 720 are not able to come out of the sides of guide slots 339, 356 regardless of movement of the external unit 130 over the bracket 150. However, in various embodiments, such one or more guide wings 720 may be able to come out of a front opening of the guide slots 339 through which the one or more guide wings 720 originally entered.

In some embodiments, one or more guide wings 720 can be configured with features to prevent or hinder movement of the external unit 130 over the bracket 150. For example, where one or both of a pair of guide wings 720 are not seated properly within the guide slots 339, 356 and are instead disposed on top of the sill arms 331 and/or pivot rails 351, such improperly seated guide wings 720 can comprise a texture or feature (e.g., rough texture, bumpy features, pointy features, or the like), on a surface that engages the sill arms 331 and/or pivot rails 351 to prevent or hinder sliding of such guide wings 720 over the sill arms 331 and/or pivot rails 351. In some embodiments, the sill arms 331 and/or pivot rails 351 can comprise corresponding structures that further providing for preventing or hindering sliding of such guide wings 720 over the sill arms 331 and/or pivot rails 351 (e.g., corresponding opposing ridges that prevent or hinder movement when together, but allow for movement against a flat surface).

Some embodiments can include audio and/or visual feedback to the user that the outdoor unit 130 has properly engaged with the bracket 150. For example, in one embodiment, the outdoor unit 130 can be configured to make a physical clicking noise when properly engaged within one or both of the slots 339, 356, reached a stop at the end of the pivot arm 350, or the like.

Returning to the method 400 of FIG. 4, at 420, the external unit 130 is slid onto the pivot arm 150 and out the window 230 while the external unit 130 is secured within one or both of the guide slots 339, 356 as discussed herein. For example, FIG. 10 illustrates a configuration of an external unit 130 that has been slid on the bracket 150 over the sill arms 331 so that the external unit 130 is primarily held on the pivot rails 531 of the pivot arm 350. Specifically, in various embodiments, the external unit 130 can be placed on the bracket 150 as shown in FIG. 7 and then slid toward the pivot arm 350 to a configuration as shown in FIG. 10.

In some embodiments, a support foot 355 can provide a stop for the external unit 130 as the external unit 130 is pushed onto the pivot arm 350 (see e.g., FIG. 6b), whereas in other embodiments the external unit 130 can be pushed onto the pivot arm 350 such that the bottom 134 of the external unit 130 extends past the end of the pivot arm 350 (e.g., where the support foot 355 extends away from a sliding surface of the bracket 150 and does not provide an obstruction at the end of the pivot arm 350 as shown in FIG. 3). In further embodiments, the external unit 130 may not extend to or past an end of the pivot arm 350. In some embodiments, structures such as one or more guide wings 720 can facilitate a stop for the external unit 130. However, various suitable structures of the external unit 130, bracket 150 or the like, can provide for such a stop.

Additionally, while FIG. 10 illustrates an example where the external unit 130 is resting entirely or nearly entirely on the pivot arm 350, and the plane of the top end 133 proximate to a space between the sill arms 331 and pivot rails 351 in some examples, the external unit 130 can be pushed on the bracket 150 to a stop such that the plane of the top end 133 is over the sill arms 331 or pushed to a stop such that the plane of the top end 133 is over the pivot rails 351.

Returning to the method 400 of FIG. 4, the pivot arm 350 and external unit 130 are rotated downward 425. For example, in various embodiments, the pivot arm 350 and external unit 130 can be rotated from a configuration as shown in FIG. 10 to a configuration as shown in FIG. 11 where the pivot arm 350 and external unit 130 have been rotated approximately 90° in the external environment 270.

In various embodiments, such a change in configuration can be supported by the gas springs 370 or other suitable element. For example, in some embodiments biasing force of the gas springs 370 can correspond to the weight of the external unit 130. In one example, when the external unit 130 is moved on to the pivot arm 350, the biasing force of the gas springs 370 in can be sufficient to hold the pivot arm 350 and external unit 130 in place, but with only a small amount of force being required (e.g., applied by a user) to overcome the holding force of the gas springs 370 so that the pivot arm 350 and external unit 130 rotate downward to the configuration in FIG. 11. In further embodiments, the biasing force of the gas springs 370 can be slightly overcome by the weight of the pivot arm 350 and external unit 130 such that the pivot arm 350 and external unit 130 rotate downward smoothly and in a controlled manner when the external unit 130 is moved onto the pivot arm 350.

Such embodiments can be desirable for providing a smooth and controlled transition from the configuration of FIG. 10 to the configuration of FIG. 11, which can prevent a potentially undesirable user experience based on loud or seemingly uncontrolled movement of the external unit 130, and can prevent damage to the external unit 130, building 200, window assembly 230, or the like. While gas springs 370 can be used to control such a rotation of the pivot arm 350 and external unit 130, further embodiments can include various other suitable elements that can control such a rotation of the pivot arm 350 and external unit 130 such as springs, a lowering strap (see e.g., FIG. 23), or the like. For example, one embodiment can include an installation tool such as a threaded rod that rotatably controls the lowering and/or raising of the pivot arm 350, and a user can rotate the rod via a hand crank, hand-drill, or the like, to control rotation of the external unit 130 via the pivot arm 350.

While some embodiments allow the external unit 130 to rotate downward via the pivot arm 350 once sufficient weight is applied to one or more mechanism that holds the pivot arm 350, in further embodiments, the pivot arm 350 can be associated with one or more locking mechanism that must be disengaged for the external unit 130 to rotate downward via the pivot arm 350. For example, in some embodiments, one or more lock actuators can be present on the bracket 150 or a location where the user can easily access the one or more lock actuators such as within the internal environment 260 or proximate to the sill 234 of the window 230. When the user has positioned the external unit 130 on the pivot arm 350, the user can actuate the one or more lock actuators associated with one or more locking mechanism, which can allow the external unit 130 to pivot downward based on the weight of external unit 130; with a bit of assistance from the user; or the like as discussed herein.

In some embodiments, the pivot arm 350 or other suitable element can comprise one or more locking mechanisms that become unlocked when the external unit 130 is correctly positioned on the pivot arm 350 in preparation for rotating down to the configuration shown in FIG. 11, or the like. For example, as discussed herein, the external unit 130 can comprise guiding wings 720 that are configured to reside and translate within the guide slots 339, 356 of the bracket 150 such that the external unit 130 is able to slide over the top of the bracket 150 while preventing the external unit 130 from falling off the sides or front of the bracket 150. In some embodiments, one or more locking mechanisms within the guide slots 356 or other suitable location can be actuated to become unlocked by guiding wings 720 within the guide slots 356 of the pivot arm 350, which can correspond to the external unit 130 being secured within the guide slots 356 and in a suitable position for rotating down (e.g., substantially over the pivot arm 350, pushed to or close to a terminal stop of the pivot arm 350, and the like).

Such an embodiment can be present in addition to or as an alternative to a locking mechanism that is actuated by a user. Embodiments comprising such one or more locking mechanisms can be desirable by preventing premature movement of the pivot arm 350; preventing movement of the pivot arm 350 if the external unit 130 is not safely or correctly secured to the bracket 150; and the like.

Figure 13:
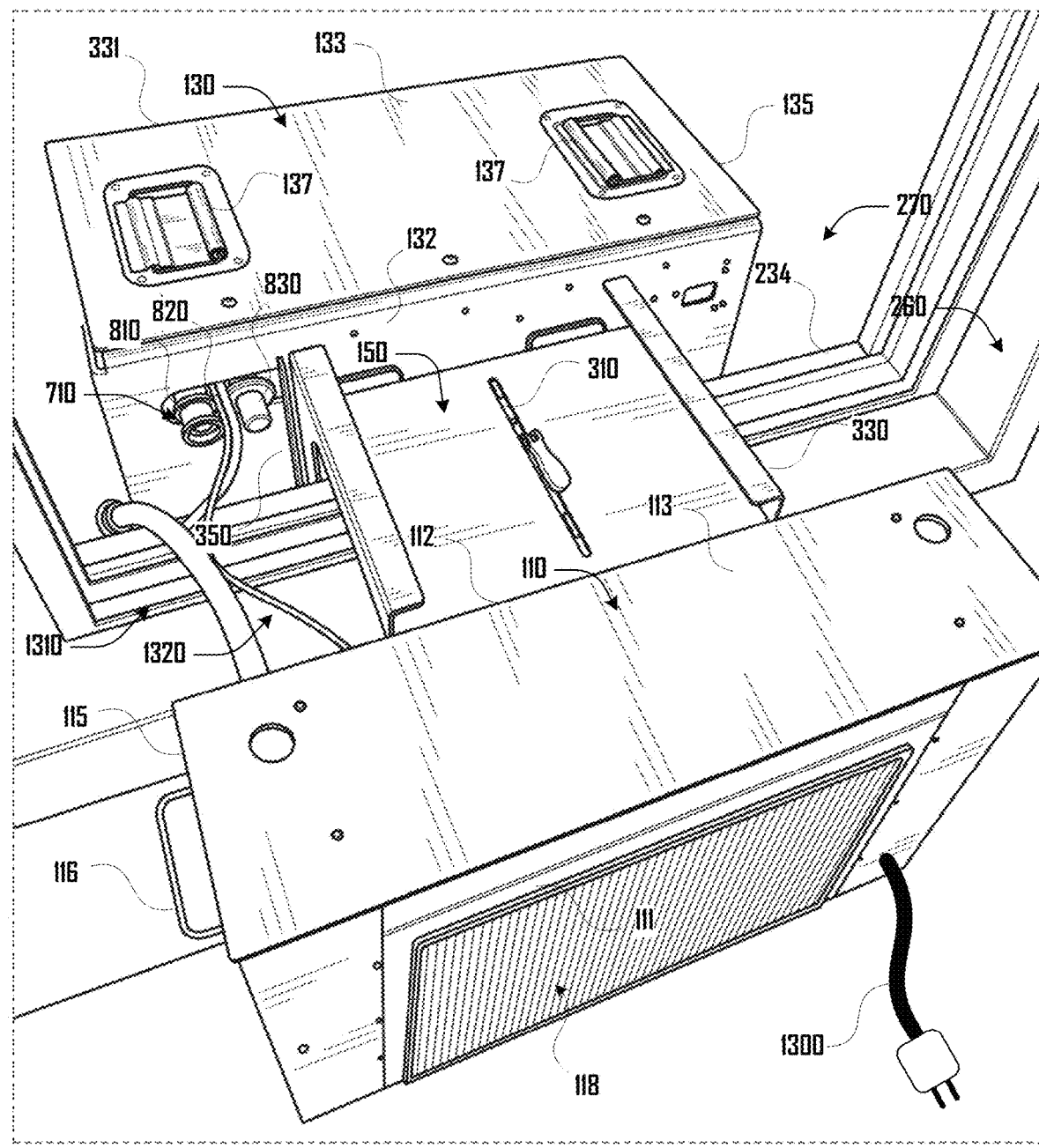
FIG. 13 illustrates internal unit fluid and power couplers in accordance with one example embodiment.

Returning to the method of FIG. 4, at 430, the internal unit 110 is coupled to the bracket 150 on the inside 260 of the window 230, and at 435, operable couplings 710 between the interior and exterior units 110, 130 are installed. For example, FIG. 12 illustrates an example embodiment where the internal unit 110 comprises a mounting hook 1200 that can be coupled with a mounting slot 500 defined by the bracket 150, which can allow the internal unit 110 to be coupled to and hang from the bracket 150 on the inside 260 of the window 230 as shown in the example of FIG. 13. The mounting slot 500 can be disposed in various suitable locations on the bracket 150 (see e.g., FIGS. 5 and 11 vs. FIG. 12). Additionally, in further embodiments, the internal unit 110 can be coupled with the bracket 150 in various other suitable ways, so the example of a mounting hook 1200 and mounting slot 500 should not be construed as being limiting.

In various embodiments the internal unit handles 116 can be used to pick up the internal unit 110 to mount the internal unit 110 on the bracket 150. Accordingly, the internal unit handles 116 can be disposed on the sides 115 near the top 111 of the internal unit 110 to provide for desirable handling of the internal unit 110 for moving and mounting the internal unit 110 on the bracket 150.

To provide for operation of the internal and external units 110, 130 as an air conditioning unit 100, one or more operable coupling can be made between the internal and external units 110, 130. For example, FIGS. 7, 8, 11, 12 and 13 illustrate a set of external unit couplers 710, including external unit fluid, power and condensate couplers 810, 820, 830. FIG. 13 illustrates an example of internal unit fluid and power couplers 1310, 1320 (internal unit condensate coupler not shown). Such couplers 810, 820, 830, 1310, 1320 can be connected to provide for operable couplings between the internal and external units 110, 130 such as a fluid loop, electrical power, condensate coupling, and the like. Examples of such elements and associated operation as an air conditioning unit 100 is discussed in more detail herein (see e.g., FIGS. 40a, 40b, 41 and 42).

The example couplers and operable couplings discussed herein should not be construed to be limiting on the wide variety of couplers and operable couplings that are within the scope and spirit of the present disclosure. For example, in further embodiments, additional or fewer couplers and operable couplings can be made between the internal and external units 110, 130. Also, in some embodiments, one or more couplers and/or operable couplings can be combined into a unitary line.

Additionally, in various embodiments, the operable connections between the internal and external units 110, 130 can consist of or consist essentially of one or more of the operable connections discussed herein. Accordingly, in various embodiments, various types of operable couplings can be specifically absent, such as air ducts, communication lines or the like.

Additionally, as shown in FIG. 13, the internal unit 110 can comprise a power line 1300, which can be plugged into a power receptacle (e.g., standard United States building power receptacles such as 120V, 240V or the like). In various embodiments, the power line 1300 can provide power to internal unit 110, which can in turn provide power to the external unit 130 via a power coupling (e.g., couplings 820, 1320). Accordingly, in some embodiments, the external unit 130 can only receive power via the internal unit 110 with other power sources being absent. Additionally, in various embodiments, a method of installing an air conditioning unit 100 can include plugging in the power line 1300 once the air conditioning unit is assembled and installed in a window 230. Accordingly, in various embodiments, operating power is not present or available to components of an air conditioning unit 100 during installation.

Figure 14:
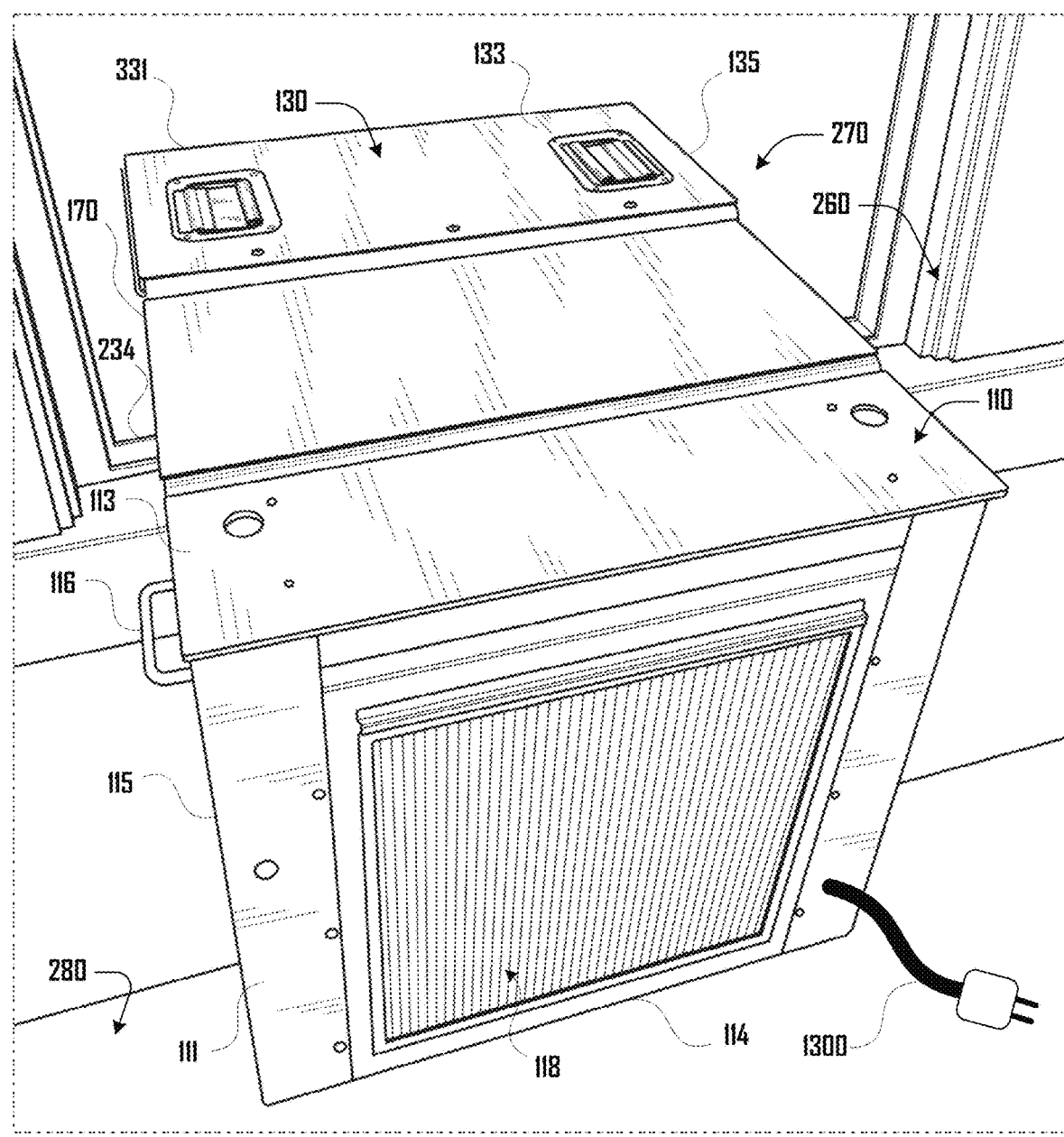
FIG. 14 illustrates a top cover extending over the sill between internal and external environments in accordance with one example embodiment.

Returning to the method of FIG. 4, at 440, a top cover 170 is installed. For example, FIG. 14 illustrates an example embodiment where a top cover 170 has been installed between the internal and external units 110, 130. The top cover 170 can be configured to extend over the sill 234 between internal and external environments 260, 270 and covering elements such as the bracket 150, operable couplings 710, and the like.

Figure 15:
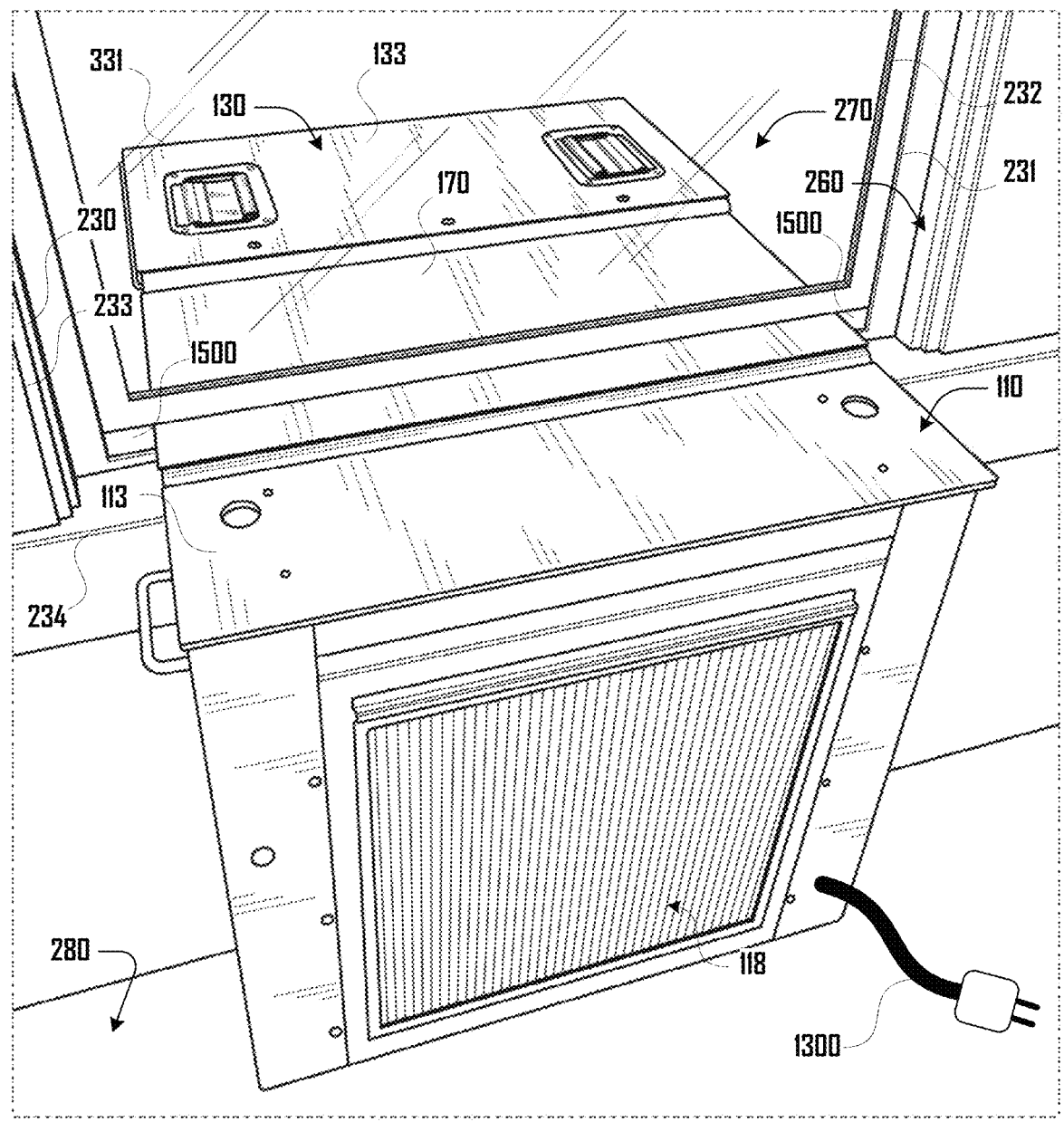
FIG. 15 illustrates a foam gap filler in accordance with one example embodiment.

In some embodiments, the top cover 170 can be configured to extend between the internal faces 112, 132 of the internal and external units 110, 130 and have a top face that is substantially coincident with planes of the tops 113, 133 of the internal and external units 110, 130 (e.g., as shown in FIGS. 1, 14 and 15). However, in further embodiments, the top cover 170 can extend over at least a portion of the tops 113, 133 of the internal and external units 110, 130, and in some embodiments, one or both sides of the top cover 170 can extend up to or past the external faces 111, 131 of the internal and external units 110, 130.

In some embodiments, the top cover 170 can have a static size and shape (e.g., as shown in FIG. 29); however, in further embodiments the top cover 170 can be configured to change size based on different distances between the internal and external units 110, 130 (e.g., based on the sized configuration of a bracket 150). For example, FIGS. 26a-c, 27a and 27b illustrate an example of a top cover that is configured to change size.

Returning to the method 400 of FIG. 4, at 445, a window gap filler can be installed. For example, an air conditioning unit 100 can extend through a window 230, and while the movable sash 231 of the window 230 can be lowered to contact a top of the air conditioning unit 100 (e.g., a top of top cover 170) and minimize the size of the opening of the window 230, gaps between the sash 231 and sill 234 can still be present on one or both sides of the air conditioning unit 100, which may be undesirable because such gaps can allow air to pass between the internal and external environments 260, 270. Accordingly, various gap-filling structures can be installed in such gaps. For example, FIG. 15 illustrates an example where a foam gap filler 1500 is installed within such gaps. In some embodiments, such a gap filler 1500 can be present exclusively in gaps or can be present on top of the air conditioning unit 100 extending between gap filler 1500 in gaps on sides of the air conditioning unit 100.

Figure 38B:
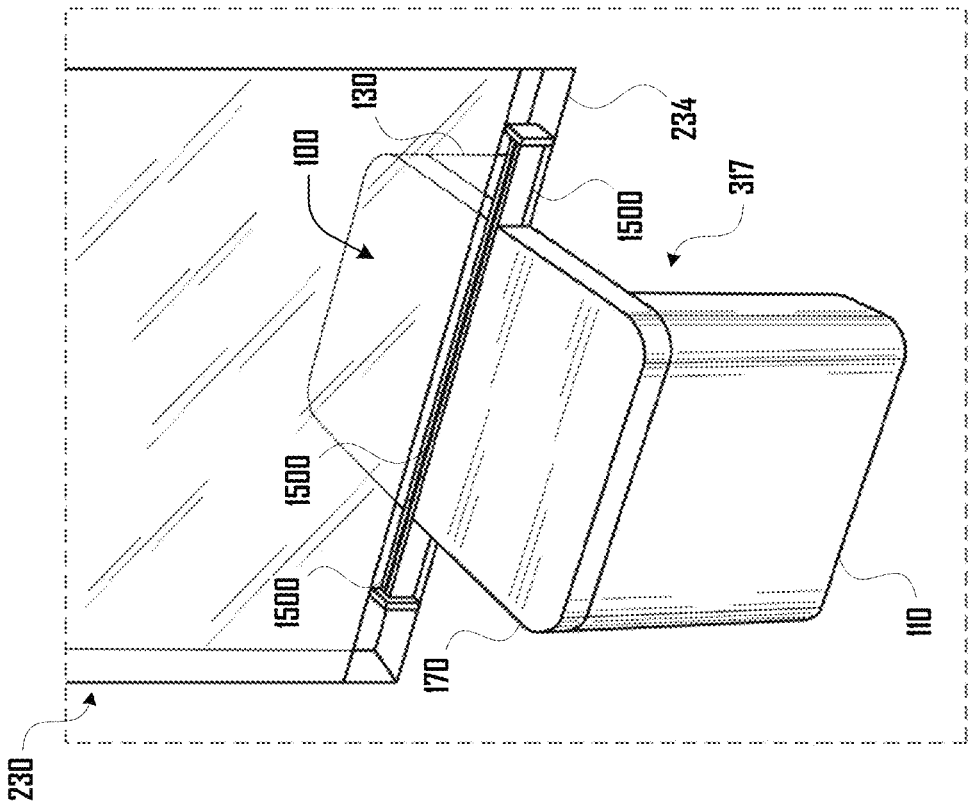
FIG. 38b illustrates a gap filler comprising wings that extend outward from a top cover and a linear seal in accordance with one example embodiment.
Figure 38A:
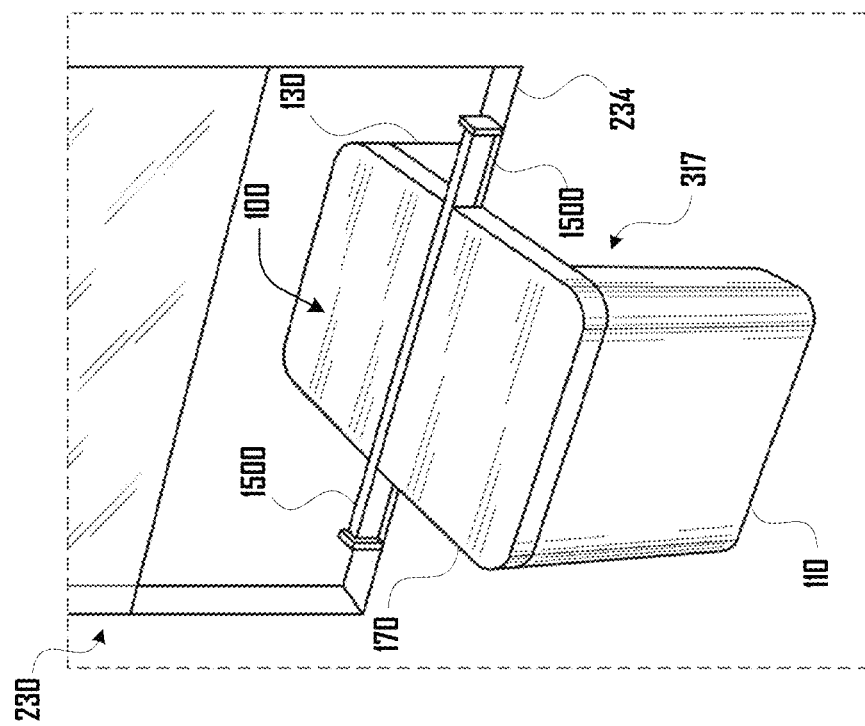
FIG. 38a illustrates a gap filler comprising wings that extend outward from a top cover in accordance with one example embodiment.

For example FIG. 38a illustrates an example where a gap filler 1500 is integrated on sides of a top cover 170 including wings that extend outward to fill a gap in the window 230. FIG. 38b illustrates a gap filler 1500 is integrated on sides of a top cover 170 including wings that extend outward to fill a gap in the window 230 and a linear seal that runs over the wings and top cover 170.

Figure 39B:
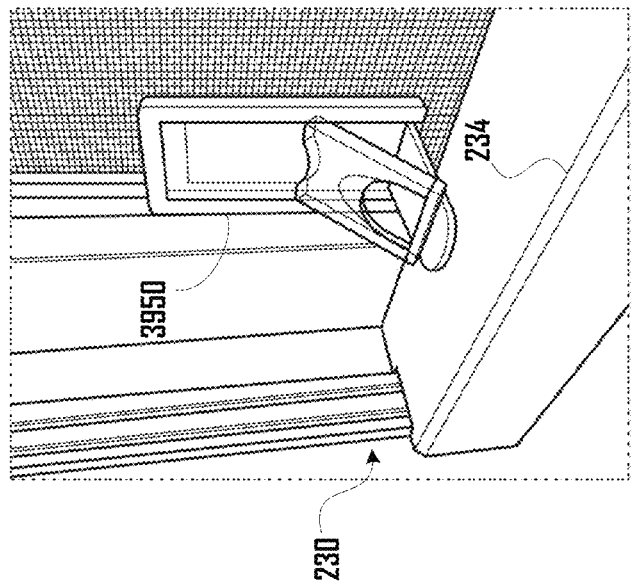
FIG. 39b illustrates a folding window lock that is coupled to a window pane in accordance with one example embodiment.
Figure 39A:
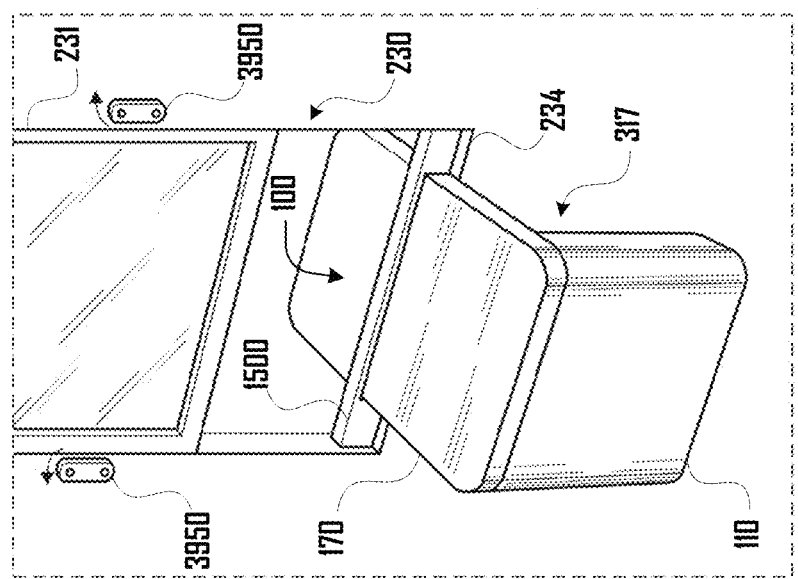
FIG. 39a illustrates a pair of window locks rotatably disposed on sides of a window in accordance with one example embodiment.

Since the air conditioning unit 100 present on the sill 234 of a window 230 may defeat, inhibit or otherwise make locks of the window 230 inoperable because the sash 231 may be unable to completely close by extending fully to the sill 234, some embodiments may include one or more window locks that allow the sash 231 to be secured. For example, FIG. 39a illustrates an example embodiment where a pair of window locks 3950 are rotatably disposed on sides of a window 230 that can be rotated into a locking position to secure the sash 231. FIG. 39b illustrates an example of a folding window lock 3940 that is coupled to the pane 232 of the window 230, which can be deployed to secure the sash 231. Such window locks 3950 can be coupled to the window 230 in various suitable locations in various suitable ways (e.g., an adhesive, screws, Velcro, or the like) and such window locks 3950 can be various suitable mechanisms.

In various embodiments, an instruction manual, video, or visual cues on various elements of air conditioning unit 100 can instruct a user on how to install elements of the air conditioning unit 100 in a window 230 as discussed herein. For example, in some embodiments, the internal and external unit 110, 130, or portions of the bracket 150, can include an embossing or printed label indicating "indoor", "outdoor.", "up", "down", "top", "bottom", "face out", "face in", or the like. Such indicators can be present in locations so that such indicators are visible and relevant to a user during a given installation step.

Similarly, handles 136, 137, 116 can be located on the internal and external units 110, 130 to specifically assist users with steps of the installation process. For example, a first set of handles 136 of the external unit 130 can be disposed on the sides 135 and proximate to the bottom 134 of the external unit 130 to assist the user with lifting the external unit 130 and placing the external unit 130 on the bracket 150 as discussed herein. A second set of brackets 137 can be disposed on the top 133 of the external unit 130, which can assist the user with moving the external unit 133 over the bracket 150 including pushing the external unit 130 out a window 230 and over a pivot arm 350. The second set of brackets 137 can further be used to rotate the external unit 130 and pivot arm 350 from a horizontal to vertical position as discussed herein. Additionally, a set of handles 116 can be present on the internal unit 110 on the sides 115 and proximate to the top 113 of the internal unit 110, which can assist a user with lifting the internal unit 110 to be hung on the bracket 150.

Accordingly, positioning of handles 136, 137, 116 on the internal and external units 110, 130 can be novel base on the novel installation and configuration of elements of an air conditioning unit 100 as discussed herein. For example, various embodiments include a different number and/or location of handles on the internal and external units 110, 130 based on the different installation steps and for the internal and external units 110, 130. However, in some embodiments, one or more of the example handles 136, 137, 116 can be absent, present in singular, or the like.

While various embodiments herein discuss the internal and external units 110, 130 being coupled to a bracket 150 on the inside and outside 260, 270 of a window 230, in further embodiments, one or both of the internal and external units 110, 130 need not be coupled to a bracket 150. For example, some windows 230 can have obstructions that prevent installation of one or both of the internal and external units 110, 130 on the bracket 150 such as a fire-escape, planter, or roof on the outside 260 of the window that does not provide sufficient clearance for the external unit 130 to hang below the sill 234 of the window 230. In further examples, a window sill 234 may be close to the floor, have a radiator in front of the window 230, or the like, which provide sufficient space or clearance for the external unit 130 to hang below the sill 234. In such embodiments, one or both of the internal and external units 110, 130 can rest on a surface on the inside and/or outside 260, 270 of the window 230, including in front of the window 230, to the side of the window 230, or the like.

Also, while certain example embodiments of a bracket 150 and associated example embodiments of installing components of an air conditioning unit 100 in a window 230 with such a bracket 150 has been described above, these illustrative examples should not be construed to be limiting on the wide variety of additional brackets 150 and installation methods that are within the scope and spirit of the present disclosure.

Accordingly, an installation bracket 150 can take several different forms that can allow it to transfer loads to a windowsill 234, and/or the wall surfaces below the window 230 or window apron. A preferred embodiment of the installation bracket 150 is an inverted U shape to enable the user to place the bracket 150 over the windowsill 234 and achieve support on the windowsill 234*l*, as well as the indoor and outdoor adjacent surfaces. The bracket 150 can be symmetric across the plane of the window 230, or it can be asymmetric with different features on the indoor side 260 versus the outdoor side 270 to accommodate different structural loads and attachment requirements for the indoor components versus the outdoor components. For example, ends of elevated outer tubes of a bracket can face inward towards the user to guide the placement of the outdoor unit 130 on the bracket 150. The bracket 150 can also include a component that fits into the channel along the windowsill 234. Once this component is securely located in the channel, the bracket 150 can then be adjusted to securely clamp onto the wall in various embodiments.

The bracket can include various adjustment features to accommodate a wide variety of window dimensions and wall thicknesses. A preferred embodiment of these features is a user-adjustable mechanism at the top of the bracket 150 which can increase the distance between the indoor and outdoor sides of the bracket to accommodate a deeper windowsill 234, or can decrease the distance between the indoor and outdoor sides of the bracket 150 to accommodate a shallower windowsill 234. These features may also include mechanisms to position and secure the bracket 150 with regards to the windowsill channel. Another adjustment feature that can be included is adjustable feet that can change the spacing between the lower segments of the bracket relative to the indoor or outdoor wall surfaces.

In some examples, once the bracket 150 is securely positioned, the user is ready to attach the outdoor and indoor units 110, 130 onto the bracket 130. In one embodiment, the user first attaches the indoor unit 110 onto the bracket. (The user can attach the outdoor unit 130 first as well, but it can be a good safety check on the bracket 150 to initially attach the indoor unit 110.) In one embodiment, the indoor unit 110 hooks onto cross-tubing on the bracket 150. There are a variety of other potential mechanisms to secure the indoor unit 110 onto the bracket 150.

After the indoor unit 110 is attached, in various examples, the user is ready to attach the outdoor unit 130 onto the bracket 150. In one embodiment, the user attaches a safety clip onto the outdoor unit 130 that connects it to the bracket 150. The user then lifts the outdoor unit 130 onto the bracket 150. Clips on the outdoor unit 130 can engage with the tubing of the bracket 150, and the outdoor unit 130 can be guided by the tubing to its final position. The bracket 150 can contain a spring-loaded assist to ease the drop of the outdoor unit 130 into its final position. In another embodiment, the outdoor unit 130 is always attached to the indoor unit 110 through a flexible harness. The lowering process can also be eased by a belt system instead of a spring-loaded assist in some examples. The movement of the belt(s) can bring both the outdoor and indoor units 110, 130 into their final positions on the bracket 150.

A window sealing component can be integrated into the bracket, or those sealing components can be installed separately as discussed herein. In a preferred embodiment, after the outdoor and indoor units 110, 130 are both installed onto the bracket 150, window sealing components can be inserted on each side of the bracket 150. The sealing components in some examples may only take up a small percentage of the window opening (less than 2 inches), unlike accordion panels, and in various embodiments, do not compromise the window's functionality. When the user wants the window fully closed, in some examples, the user can simply use off-the-shelf or custom window locks.

Another component can then be inserted between inner tubes of the bracket 150. This component can have spacings for wires and tubes between the outdoor and indoor units 110, 130. There can exist either quick disconnects for the user to attach between the two units 110, 130, or the two units 110, 130 are already connected during the installation process. A top piece 170 can then be attached above the bracket 150 and outdoor and indoor units 110, 130.

While a mounting bracket 150 for the installation process is one example of a preferred embodiment, the installation system does not necessarily need to include a separate bracket 150. In some examples, an installation mechanism can be incorporated into the top piece 170 of the split-architecture heating or cooling unit 100. For instance, the top piece 170 of unit 100 can include a hinge or flexible material. In this design, the two units 110, 130 can resemble saddlebags over the windowsill 234. The top piece 170 can also comprise rigid and telescoping, sliding to account for variability in wall and windowsill thicknesses.

Figure 16:
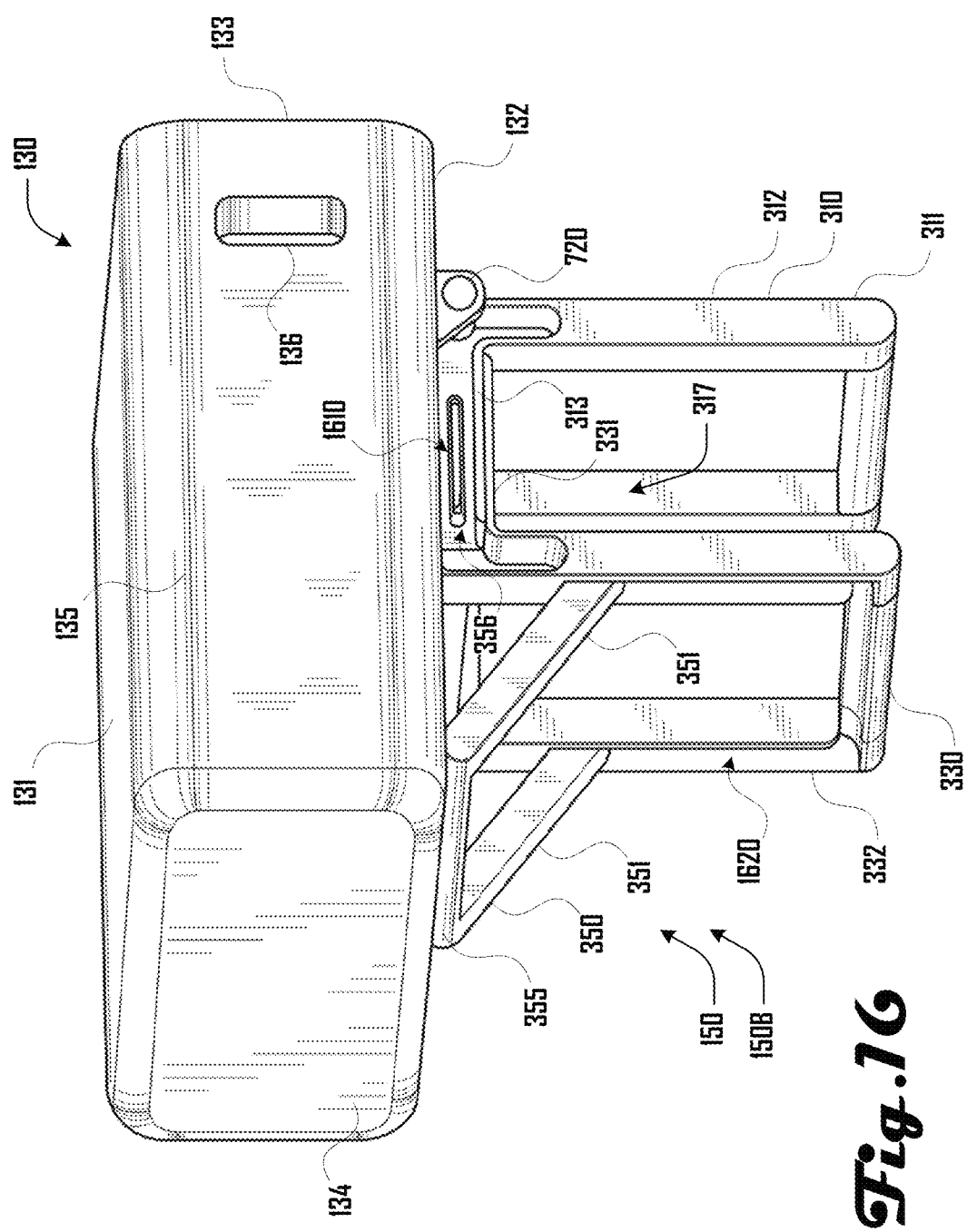
FIG. 16 illustrates an external unit positioned on a bracket with a portion of the internal face of the external unit engaging a foot at the end of the pivot arm in accordance with one example embodiment.
Figure 17:
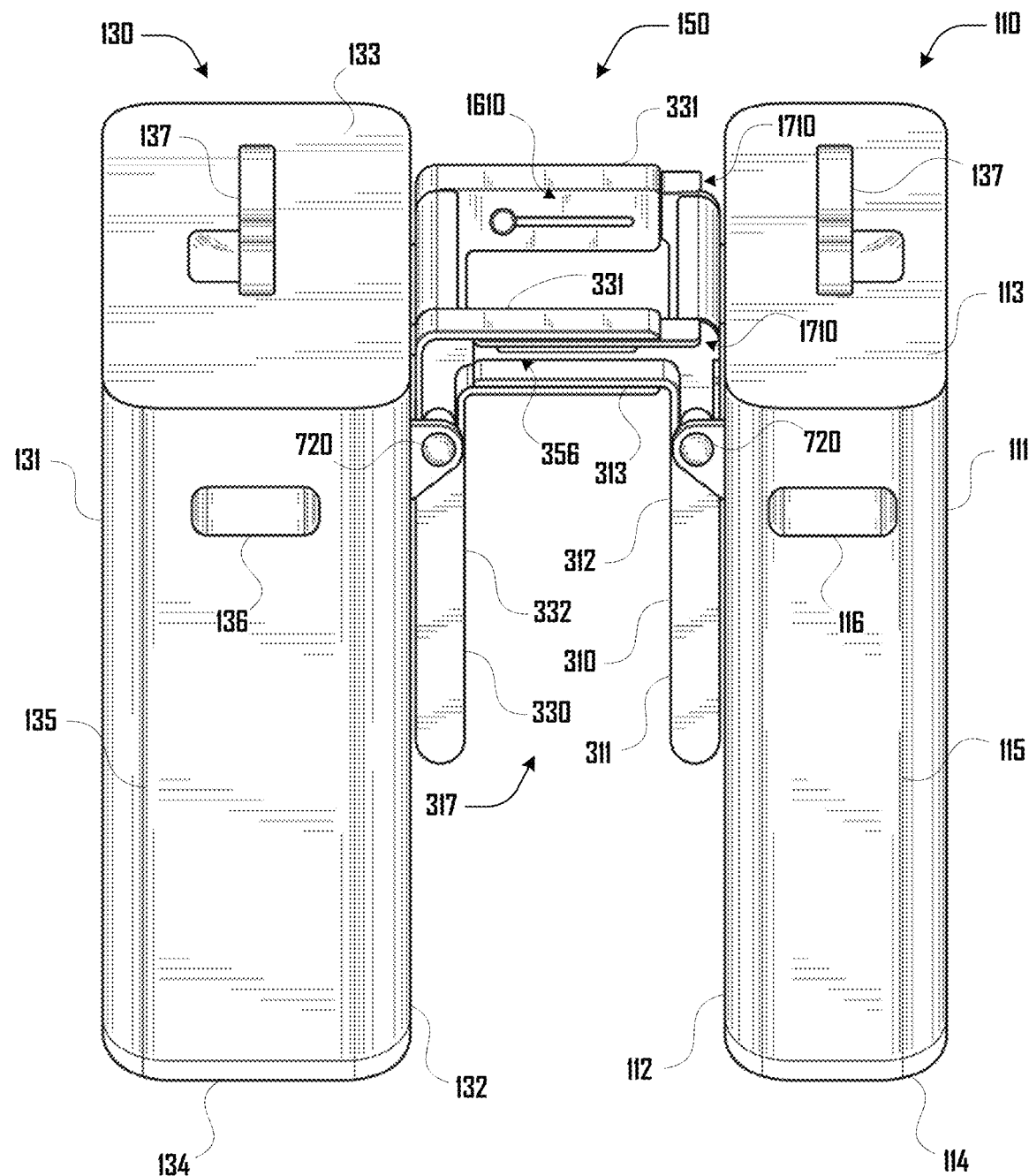
FIG. 17 illustrates openings in guide slots where guide wings of an external unit can enter and be guided in accordance with one example embodiment.

FIGS. 16 and 17 illustrate another example embodiment 150B of a bracket 150 that can be used for installation of an air conditioning unit 100 in a window 230 (see FIG. 2). The bracket 150 of FIGS. 16 and 17 is shown having a sill unit 311 with a first portion 312 configured to engage an internal portion of a wall below a sill 234 (see FIG. 2) and a second portion 313 that extends perpendicular to the first portion 312 over the sill 234. The bracket 150 further includes an external coupling component 330 with external arms 332 and are configured to engage an internal portion of a wall below a sill 234 and sill arms 331 that extend perpendicular to the external arms 332 and over the sill 234. In this example embodiment 150B, the sill arms 331 can be slidably coupled to respective second portions 313 of the sill unit 311 via a slidable coupling 1610 which can be used to widen or narrow a sill cavity 317 to correspond to the size of a given sill 234 a discussed herein.

Additionally, the sill unit 311 and coupling component 330 can define guide slots 356 in which guide wings 720 of the external unit 130 can enter and guide the external unit during installation, prevent the external unit 130 from falling off the bracket 150 and provide for securing the external unit 130 on the bracket 150 in a final installation position as shown in FIG. 17. For example, as FIG. 17 illustrates openings 1710 in the guide slots 356 where guide wings 720 of the external unit 130 can enter and be guided to the final hanging installation position as shown in FIG. 17. Similarly, guide wings 720 of the internal unit 110 can enter the opening 1710 to provide for the internal unit 110 to be guided to a final hanging installation position as shown in FIG. 17.

Additionally, as shown in FIG. 16, a pivot arm 350 can extend from the coupling component 330 from a portion of the external arms 332. In contrast to other example embodiments of brackets 150 (see e.g., FIG. 3), the pivot arm 350 can extend upward from a middle portion of the external arms 332 instead of parallel to an axis of the sill arms 331 or perpendicular to a main axis of the external arms 332 of the external coupling component 330.

As shown in FIG. 16, during installation, the external unit 130 can be positioned on the bracket 150 with the guide wings 720 within the guide slot 356 with a portion of the internal face 132 of the external unit engaging a foot 355 at the end of the pivot arm 350. The external unit 130 can be slid over the top of the bracket 150 and guided by the guide wings 720 within the guide slot 356.

At some point the pivot arm 350 can rotate downward toward the external arms 332 to allow the external unit to pivot over the front of the bracket from a horizontal configuration as shown in FIG. 16 to a vertical configuration as shown in FIG. 17 where the pivot arm 350 can reside within a pivot arm slot 1620 defined by the external arms 332 of the external coupling component 330. For example, in some embodiments, the pivot arm 350 can be biased (e.g., with springs or the like) such that such a biasing force can correspond to the weight of the external unit 130.

In one example, when the external unit 130 is moved on to the pivot arm 350, the biasing force can be sufficient to hold the pivot arm 350 and external unit 130 in place, but with only a small amount of force being required (e.g., applied by a user) to overcome the holding force so that the pivot arm 350 and external unit 130 rotate downward to the configuration in FIG. 17. In further embodiments, the biasing force can be slightly overcome by the weight of the pivot arm 350 and external unit 130 such that the pivot arm 350 and external unit 130 rotate downward smoothly and in a controlled manner when the external unit 130 is moved onto the pivot arm 350 a sufficient amount.

Figure 18:
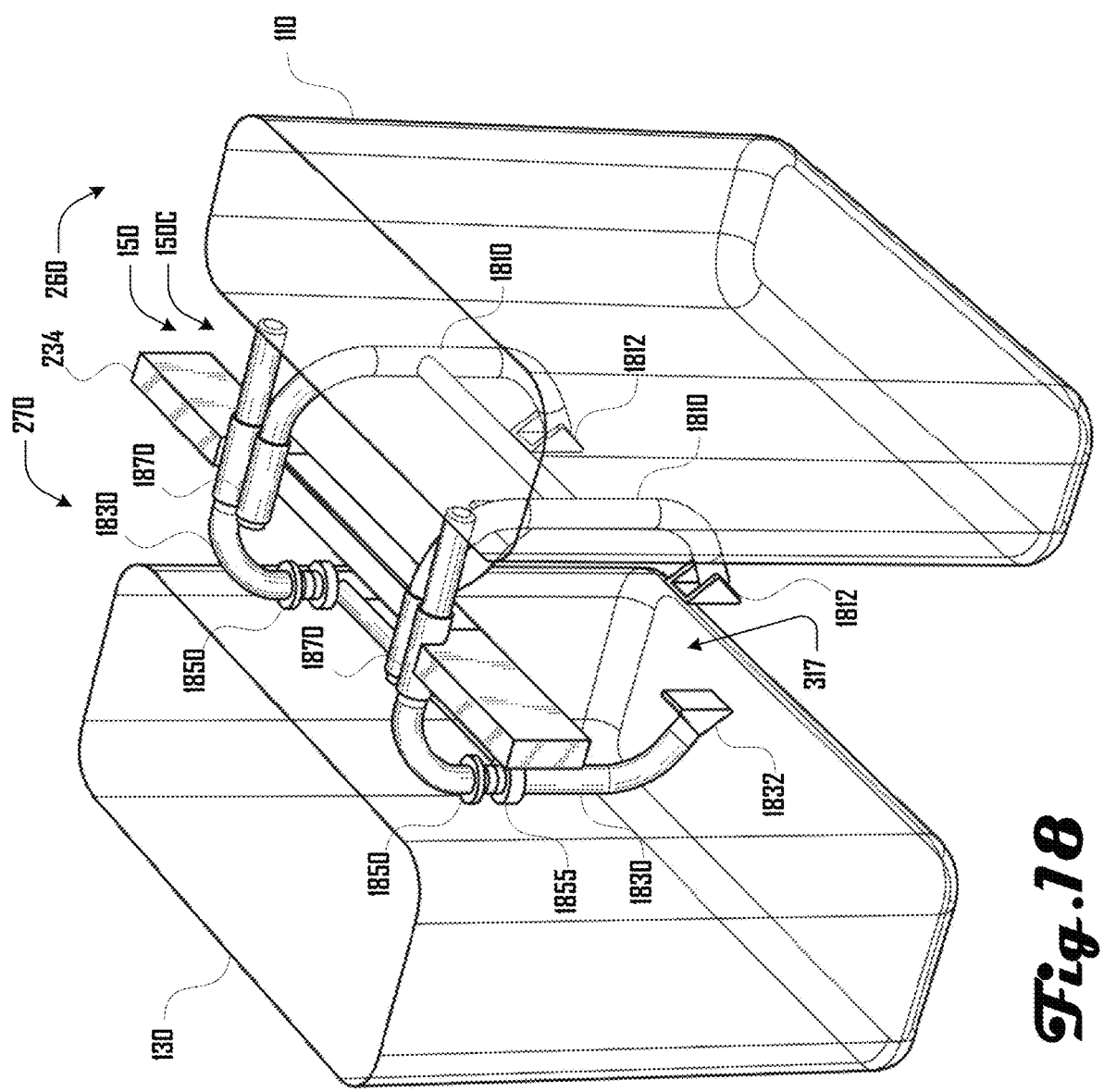
FIG. 18 illustrates a bracket comprising a pair of internal and external arms that can engage a wall below the sill in accordance with one example embodiment.

FIGS. 18-22 illustrate further example embodiments of a bracket 150. For example, FIG. 18 illustrates one embodiment 150C of a bracket 150 that includes a pair of internal arms 1810 and a pair of external arms 1830 that extend respectively into internal and external environments 260, 270, from over a sill 234, to respective feet 1812, 1832 that can engage a wall (not shown) below the sill 234. The external unit 130 can be mounted on the bracket 150 as described herein by putting the external unit 130 on top of the bracket 150 and then rotating the external unit to a vertical configuration as shown in FIG. 18. Such rotation and final mounting position can be facilitated by a pair of respective guides 1850 coupled to the external unit 130 that can travel along a length of the external arms 1850 to a pair of stops 1855, which in some embodiments can comprise a spring to cushion the engagement between the guides 1850 and stops 1855. The size of a sill cavity 317 can be configured based on moving one or both of the arms 1810, 1830 in an arm coupling 1870 where the arms 1810, 1830 are disposed side-by-side.

Figure 19:
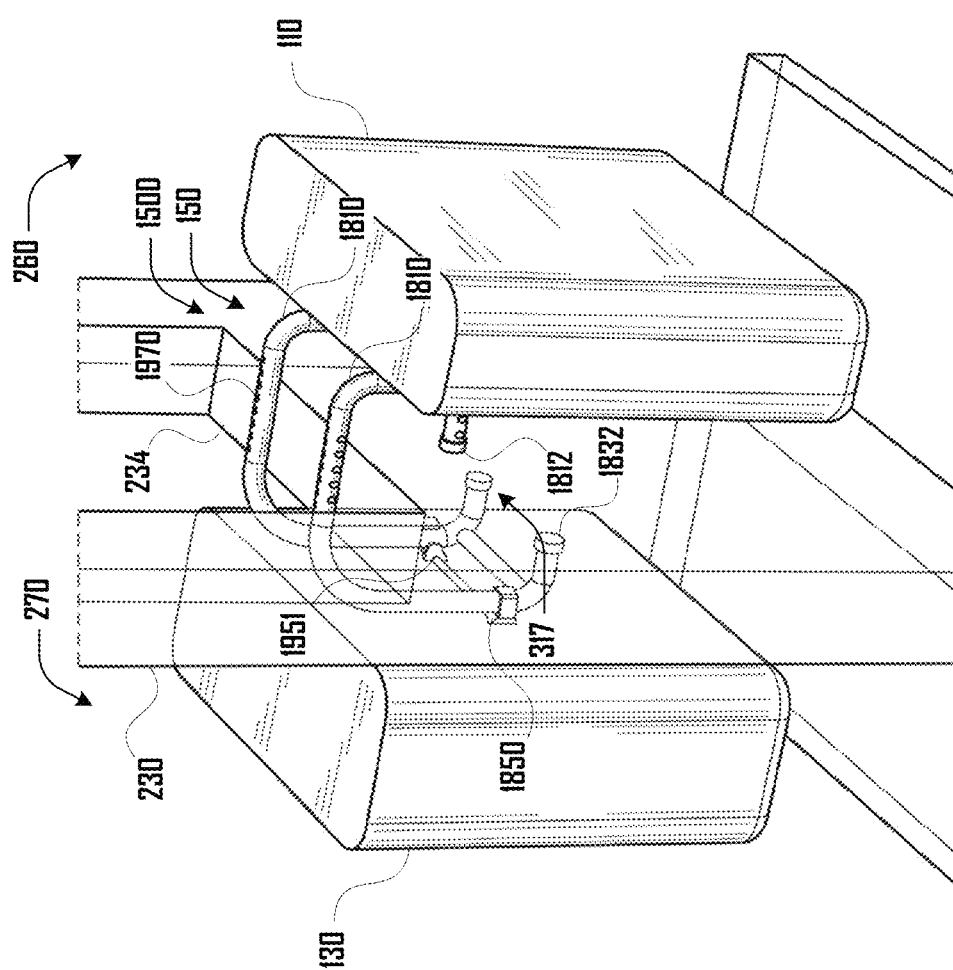
FIG. 19 illustrates a bracket comprising adjustable sill cavity and variably sized internal and external arms in accordance with one example embodiment.

FIG. 19 illustrates a similar embodiment 150D of a bracket 150 where the size of a sill cavity 317 can be configured based on moving one or both of the arms 1810, 1830 in an arm coupling 1870 where the arms 1810, 1830 are disposed inline along the same axis. Additionally, the guides 1850 are shown being coupled via a guide bar 1951 and the external arms 1850 are shown being longer than the internal arms 1810.

FIG. 20 illustrates another example embodiment 150E of a bracket 150 that includes a single internal and external arm 1810, 1830 with a single guide 1850. A top bar 2010 is shown connecting the arms 1810, 1830 and extending over the sill 234 with a portion of the top bar 2010 extending over a top face of the internal unit 110.

FIG. 21 illustrates a similar example embodiment 150F of a bracket 150 that includes a pair of internal and external arm 1810, 1830 with respective guides 1850. Top bars 2010 are shown connecting the respective arms 1810, 1830 and extending over the sill 234 with a portion of the top bars 2010 extending over a top face of the internal unit 110. A sill plate 2110 is shown coupling the top bars 2010.

FIG. 22 illustrates another example embodiment 150G of a bracket 150 that includes an arm coupling 1870 where the arms 1810, 1830 are disposed side-by-side and the external arms 1830 are longer than the internal arms 1810. A hanging assembly 2214 is also shown that allows the internal unit 110 to be hung and coupled to the bracket 150.

The example embodiments of a bracket 150 shown and described herein should not be construed to be limiting or the elements thereof limited to any given specific embodiment. Further embodiments can include various suitable combinations elements of any of the example embodiments of a bracket 150. For example, various embodiments can include outwardly facing guide slots as shown in the example of FIGS. 16 and 17 while various embodiments can include inwardly facing guide slots as shown in FIG. 3 and the like. Additionally, in some embodiments, such example elements can be specifically absent, can be present in any suitable plurality, or can be present in singular where examples include a plurality of elements.

As discussed herein, a top cover 170 can have various suitable configurations. For example, FIGS. 24*a-c*, 25*a* and 25*b* illustrate an example embodiment of a top cover 170 that allows for widening or narrowing of a distance between the internal and external units 110, 130 to allow for coupling of an air conditioning unit 100 on sills 234 of different widths.

Figure 24A:
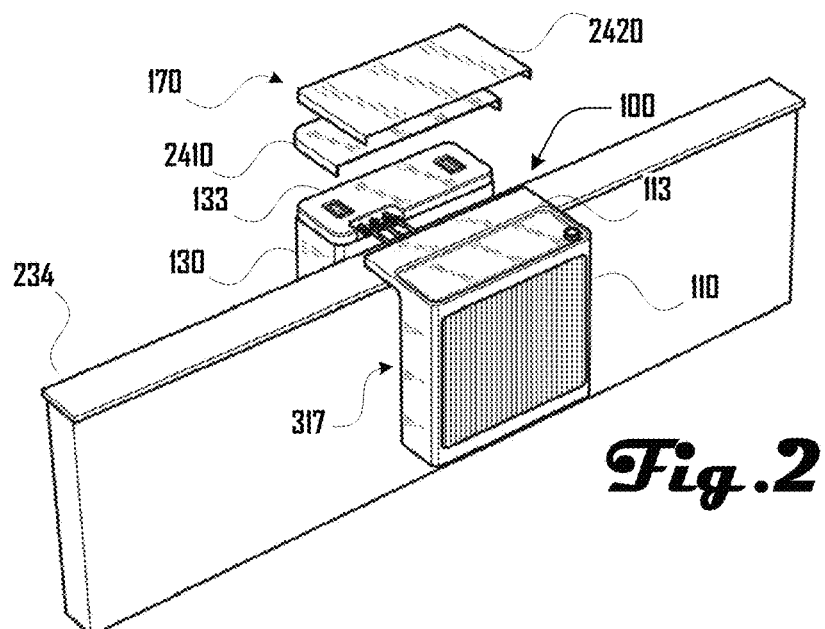
FIGS. 24a, 24b and 24c illustrate a top cover comprising a first and second portion in accordance with one example embodiment.
Figure 24B:
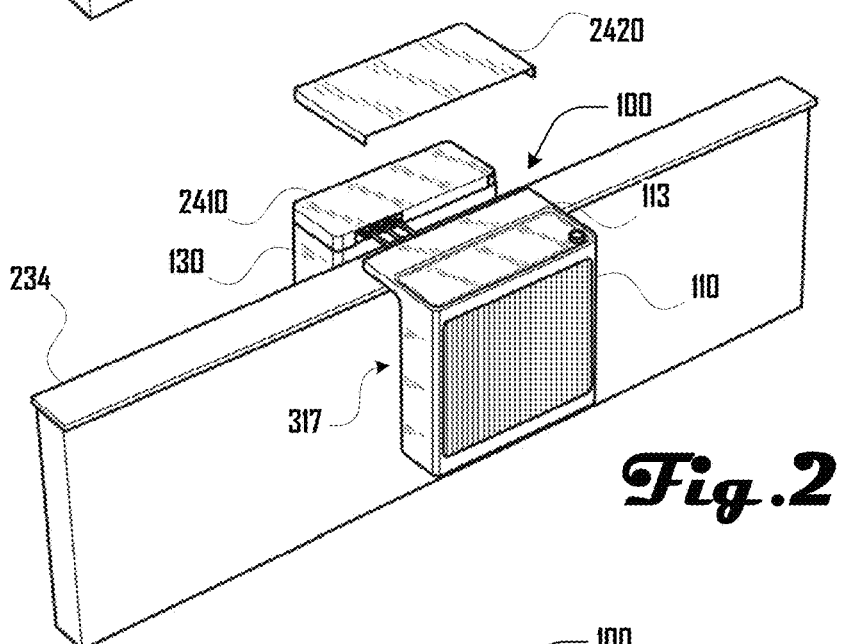
Figure 24C:
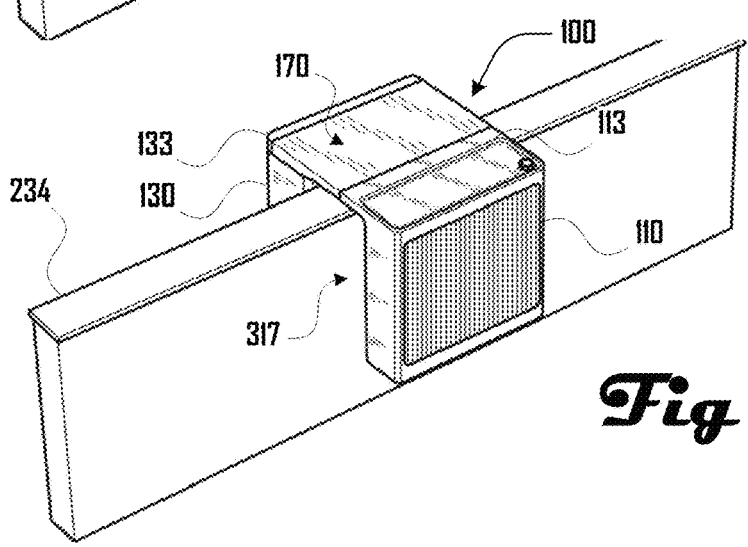

For example, FIG. 24*a* illustrates an embodiment of a top cover 170 that includes a first and second portion 2410, 2420. As shown in FIG. 24*b*, the first portion 2410 of the top cover 170 can be coupled over the top 133 of the external unit 130, and as shown in FIG. 24*c*, the second portion 2420 can be coupled over part of the first portion 2410 on the top of the external unit 130 and on part of the top 113 of the internal unit 110 such that the second portion 2420 extends between the internal and external units 110, 130 over the sill 234.

As shown in FIGS. 25a and 25b, a top cover 170 having a first and second portion 2410, 2420 can provide for adapting a cavity 317 between the internal and external units 110, 130 for different sized of sills 234. Specifically, FIG. 25a illustrates an air conditioning unit 100 coupled over a sill 234 that is smaller than the sill 234 shown in FIG. 25b. The size of the cavity 317 between the internal and external units 110, 130 is wider in FIG. 25b compared to FIG. 25a to accommodate for the wider sill 234 of FIG. 25b. Such an example of a multi-piece top cover 170 can be desirable because it can allow for a generally contiguous profile on top of the air conditioning unit 100 while also allowing for adapting the air conditioning unit 100 for different sizes of sills 234.

A top cover 170 can be configured in various other suitable ways, including a top cover with a single piece or any suitable plurality of pieces. A top cover 170 can be configured to be a static size or can be configured to change size. For example, FIG. 26a illustrates a top cover 170 that can be reduced in size so it can fit between internal and external units 110, 130. While top cover 170 of various examples can have a width that is about the width of the internal and/or external units 110, 130, some embodiments can be configured to have a larger or smaller width compared to the internal and/or external units 110, 130. For example, FIG. 26b illustrates an example of a top cover 170 that is wider than the width of the internal and external units 110, 130. FIG. 27 illustrates an example embodiment where small, medium and large top cover 170 can be configured to be coupled over the tops 113, 133 of the internal and external units 110, 130 with the size of the small, medium or large top cover 170 defining the size of the cavity 317 between the internal and external units 110, 130.

In some embodiments, the top cover 170 can be foldable in one or more locations. For example, FIGS. 28a and 28b illustrate an example where the top cover 170 includes a hinge 2810 that allows the top cover 170 to fold or assume a flat configuration. Such a configuration can be desirable for installation of the air conditioning unit 100 in a window.

Additionally, in some examples, one or both of the internal and external units 110, 130 can be movably coupled to a bottom face of the top cover 170. For example, FIG. 28c illustrates an example where the internal unit 110 can be configured translate along the bottom face of the top cover 170, which can provide for widening or narrowing of the cavity 317 between the internal and external units 110, 130. Such a configuration can be desirable by providing a way to change the size of the cavity 317 between the internal and external units 110, 130 so that the air conditioning unit 100 can be sized for different widths of sills.

FIG. 29 illustrates another example embodiment of a top cover 170 that includes a first and second piece 2910, 2920 coupled to respective tops 113, 133 of the internal and external units 110, 130. The first and second pieces 2910, 2920 can be movably coupled at an interface 2930 that allows the cavity 317 between the internal and external units 110, 130 to be widened and narrowed. Such a configuration can be desirable by providing a way to change the size of the cavity 317 between the internal and external units 110, 130 so that the air conditioning unit 100 can be sized for different widths of sills. The example air conditioning unit 100 of FIG. 29 further illustrates a foot 2940 that extends within the cavity 317 from the internal face 112 of the internal unit 110, which can be configured to engage a portion of a wall below the sill 234. While various embodiments of an air conditioning unit 100 can be configured such that the top faces 113, 133 of the internal and external units 110, 130 are disposed in a common plane. However, in some examples, the top faces 113, 133 can be disposed in different planes, as shown in the example of FIG. 29, which in some examples can include parallel planes.

FIG. 30 illustrates a similar example embodiment of a top cover 170 that includes a first and second piece 2910, 2920 coupled to respective tops 113, 133 of the internal and external units 110, 130. The first and second pieces 2910, 2920 can be movably coupled to allow the cavity 317 between the internal and external units 110, 130 to be widened and narrowed. For example, the embodiment of FIG. 30 can be similar to the example top cover 170 of FIG. 29 but with sidewalls on edges of the first piece 2910 that extend downward over portions of the second piece 2920 and/or external unit 130.

Figure 31:
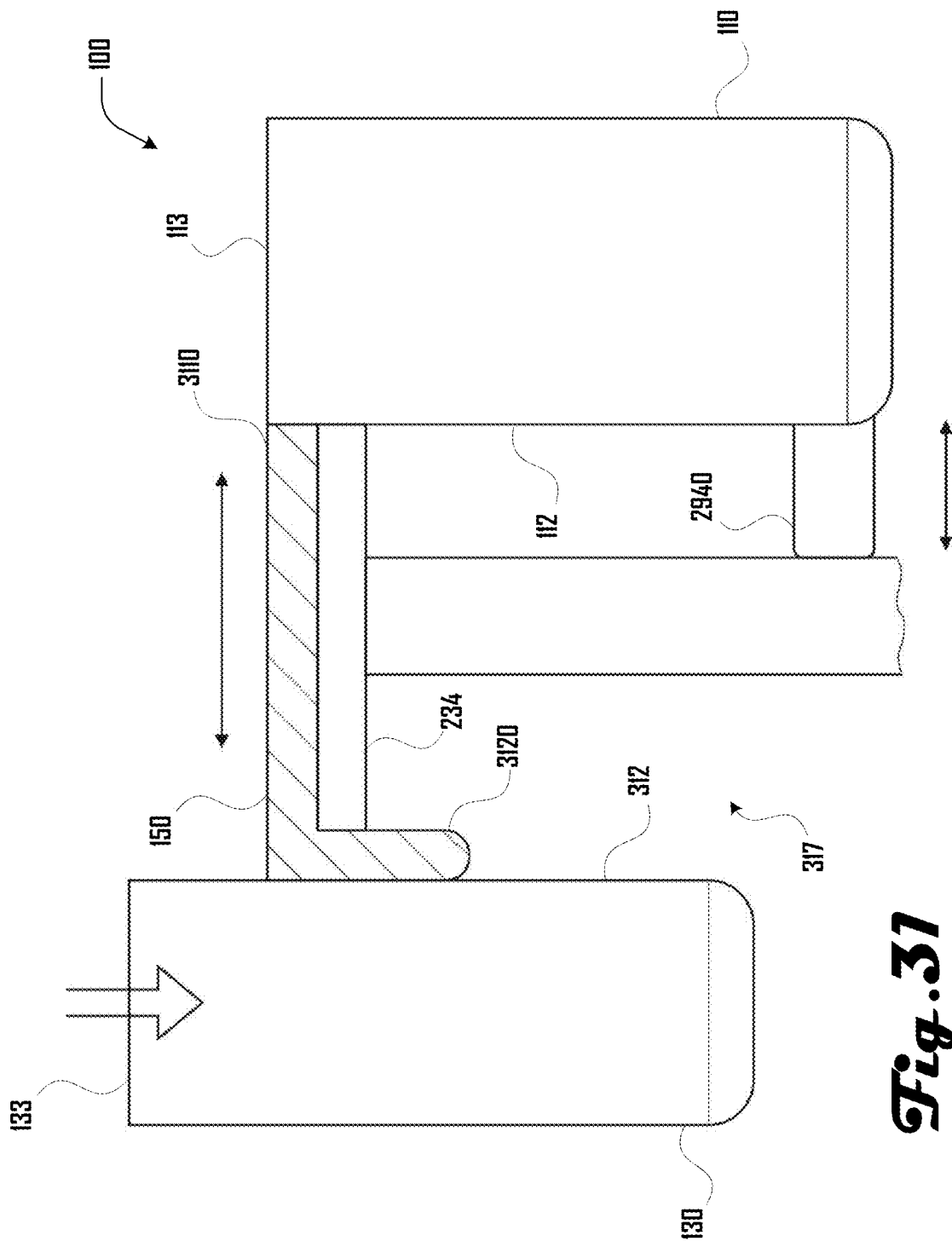
FIG. 31 illustrates a bracket comprising a sill section with an internal unit coupled at one end and a coupling flange at an opposing end in accordance with one example embodiment.

Turning to FIG. 31, another example of an air conditioning unit 100 is illustrated, which includes a bracket 150 that has a sill section 3110 that extends over a sill 234 with the internal unit 110 being coupled at one end of the sill section 3110 proximate to the top 113 of the external unit 110. A coupling flange 3120 can extend downward perpendicular to and from an opposing end of the sill section 3110. The external unit 130 can be coupled to an external face of the coupling flange 3120 along the internal face of the external unit 130. For example, in some embodiments, the external unit 130 can be lowered along the external face of the coupling flange 3120 until the top face 133 of the external unit 130 is in line with the top face 113 of the internal unit 110 and a top face of the sill section 3110 of the bracket 150. In some embodiments, one or both of the sill section 3110 and foot 2940 can be configured to change length to conform to different sizes of sills 234.

FIG. 32 illustrates a similar embodiment comprising a bracket 150 that has a sill section 3210 that extends over a sill 234 with first and second coupling flanges 3220, 3230 extending downward over the sides of the sill 234 and curling inward toward a portion of a wall below the sill 234. The external unit 130 can be coupled the first flange 3210 at one end of the sill section 3110 proximate to the top 133 of the external unit 130. The internal unit 110 can be coupled the second flange 3230 at an opposing end of the sill section 3110 proximate to the top 113 of the external unit 110.

The internal and external units 110, 130 can be coupled to an external face of the first and second coupling flanges 3220, 3230 along the respective internal faces 132, 112 of the internal and external units 110, 130. For example, in some embodiments, the internal and/or external unit 110, 130 can be lowered along the external face of the coupling flange 3220 until the top face 133 of the external unit 130 is in line with the top face 113 of the internal unit 110 and a top face of the sill section 3210 of the bracket 150. In some embodiments, one or more of the sill section 3110, flanges 3220, 3230, and foot 2940 can be configured to change length to conform to different sizes of sills 234.

Figure 33A:
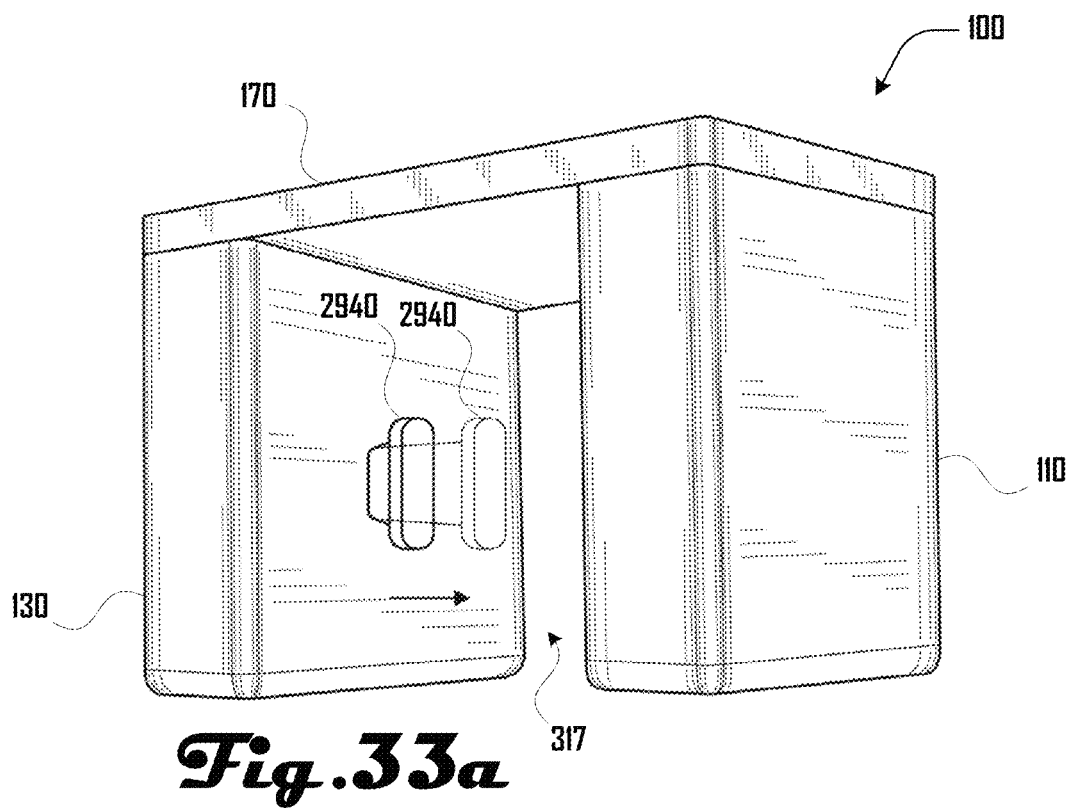
FIGS. 33a and 33b illustrate air conditioning units that comprise one or more feet, which can be disposed in various suitable locations in accordance with one example embodiment.
Figure 33B:
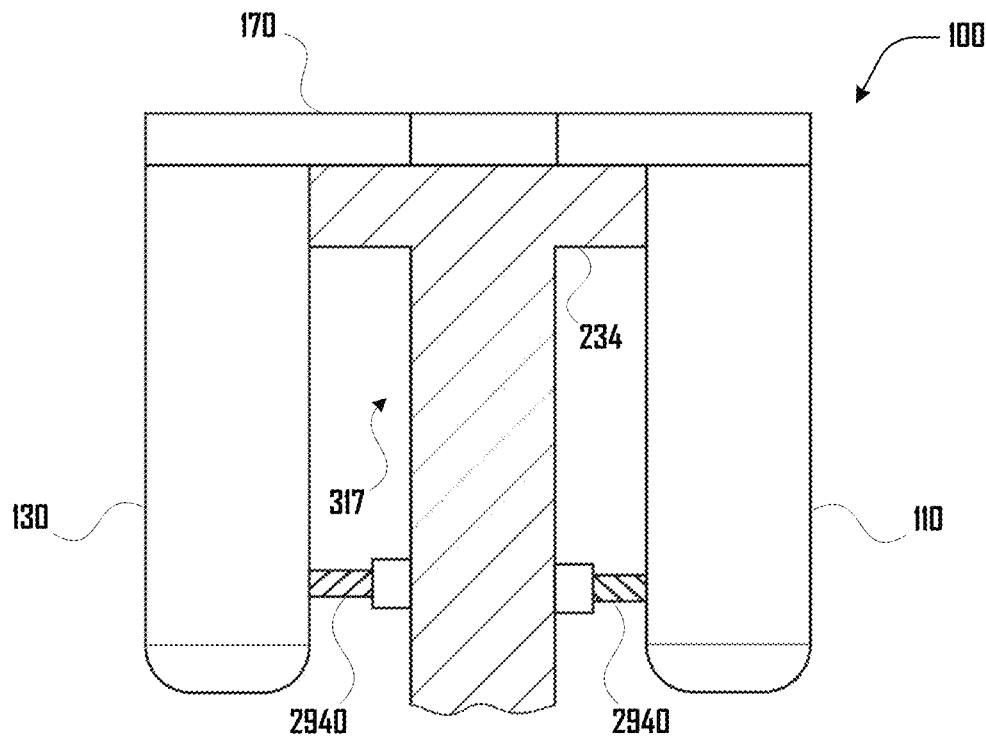

FIGS. 29-32 illustrate examples of air conditioning units 100 that comprise a foot 2940, and in further examples, an air conditioning unit 100 can comprise a plurality of feet 2940, which can be disposed in various suitable locations including one or both of the internal and external units 110, 130 (see e.g., FIGS. 33a and 33b). In various embodiments, one or more foot 2940 can be configured to change length to conform to different sizes of sills 234, walls, and the like.

Figure 34A:
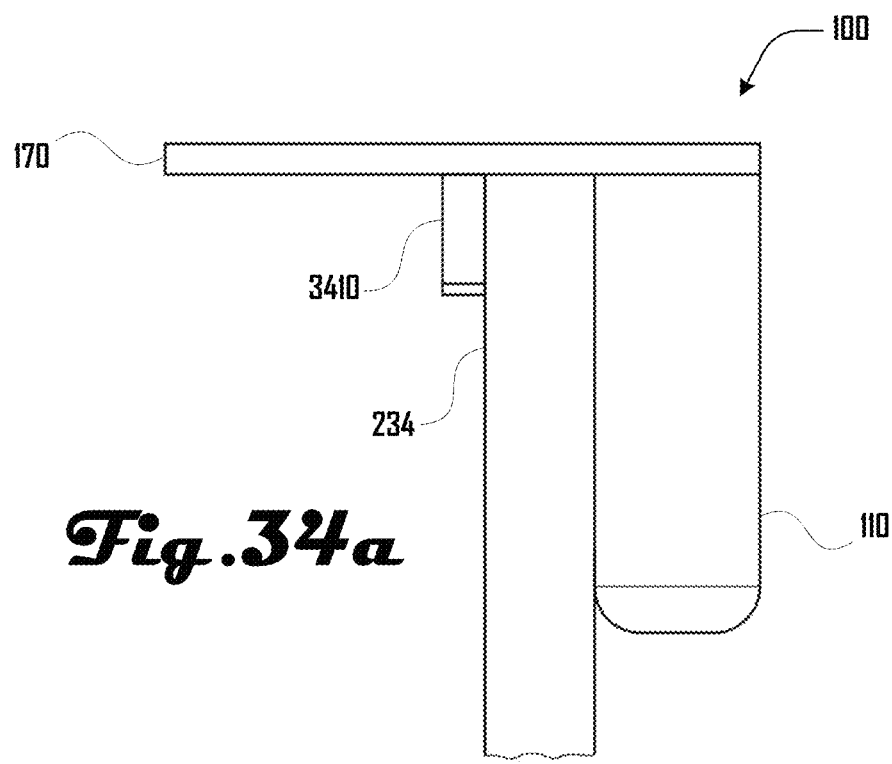
FIGS. 34a and 34b illustrate a top cover comprising a tab that extends within a cavity between the internal and external units in accordance with one example embodiment.
Figure 34B:
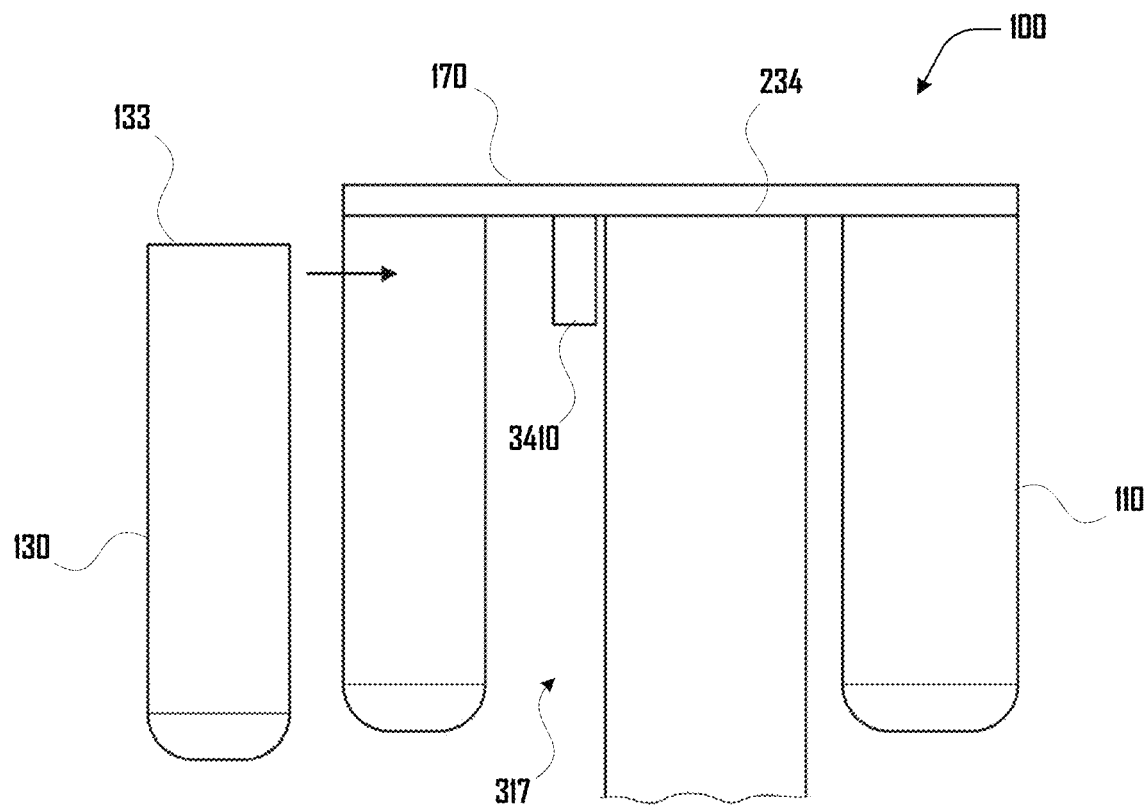

Turning to FIGS. 34a and 34b, an example embodiment of an air conditioning unit 100 is illustrated where the top cover 170 comprises a tab 3410 that extends within the cavity 317 between the internal and external units 110, 130 and can be configured to engage with an external face of a sill 234 as shown in this embodiment and/or an internal face of the sill 234 in further examples. In some embodiments, the position of the tab 3410 can be movable to adapt for different sizes of sills 234 (e.g., translate along the bottom of the top cover 170, be positioned in different slots or holes along the bottom of the top cover 170, and the like). Additionally, while the examples of FIGS. 34a and 34b show a tab 3410 extending from a top cover 170, in further examples, a tab 3410 can extend from a bracket 170 or other suitable element.

Turning to FIG. 35, another example embodiment of a bracket 150 is illustrated, where the bracket 150 comprises a first and second bracket plates 3510, 3530, which are respectively coupled to the tops 113, 133 of the internal and external units 110, 130. The first bracket plate 3510 comprises a first and second arm 3513 that define a coupling slot 3512. Flanges 3513 extend from ends of the arms 3513, which can couple with an internal portion of a sill or window in some examples.

The second bracket plate 3530 can be slidably coupled within the coupling slot 3512 of the first bracket plate 3510, which can allow the cavity 317 between the internal and external units 110, 130 to be widened and narrowed to conform to different sizes of window sills. The example of FIG. 35 illustrates the first and second bracket plates 3510, 3530 being planar and defining a top face that is coincident with a plane of the top face 113 of the internal unit 110. However, in further embodiments, the first and second bracket plates 3510, 3530 can be configured in various suitable ways. Additionally, in further examples, one or both of the first and second bracket plates 3510, 3530 can define one or more coupling slots. The first and second bracket plates 3510, 3530 can be coupled to the internal and external units 110, 130 in various suitable ways such as bolts as shown in the example of FIG. 35.

Internal and external units 110, 130 can be coupled to a sill 234 in other suitable ways. For example, FIG. 37 illustrates an example embodiment of an air conditioning unit 100 coupled to a sill 234 via a pair of lines 3705 (e.g., tubes, cables, or the like) that extend between and are coupled to the internal and external units 110, 130 with the lines extending over the sill 234 such that the internal and external units 110, 130 hang on opposing sides of the sill 234. In some embodiments, operable connections between the internal and external units 110, 130 can extend within or about one or both of the line 3705. In further embodiments, there can be any suitable plurality of lines 3705 or other suitable structures can couple the internal and external units 110, 130 (e.g., one or more straps, or the like).

Various embodiments provide for a modular air conditioner unit 100 that operates on the basic principle of a split system yet allows user serviceability and modular components such that the system is flexible. In accordance with some examples a modular air conditioning unit 100 is provided that is optimized for efficiently cooling the occupants of a room. The system 100 can include an outdoor unit 130, at least one indoor unit 110 and one or more operable connection 720 extends between the outdoor and indoor units 110, 130. The outdoor unit 130 can comprise a compressor, an air-cooled condenser, a coolant to fluid heat exchanger, a fan and various other components such as controls. The indoor unit 110 can comprise a fan, a fluid pump, a cold fluid storage tank and a fluid-to-air heat exchanger. The one or more operable couplings 720 can comprise a detachable hose that includes three lumens therein that act as a cold fluid supply, a fluid return and wiring for power and control signals.

In various embodiments, the outdoor unit 130 operates using a heat pump/air conditioning cycle to reduce the temperature of a coolant or working fluid, which in turn extracts heat from a circulating fluid via the coolant to fluid heat exchanger. The cooled circulating fluid can then be circulated, via an operable coupling (e.g., a hose), between the outdoor and indoor units 110, 130 wherein the cooled fluid reduces the overall temperature of the cold fluid storage tank. When cooling is needed in an indoor space 260, cold fluid from the cold fluid storage tank can be circulated through the fluid to air heat exchanger where the fan circulates room air across the heat exchanger producing a cooling effect. This arrangement can allow the room cooling function and the fluid cooling function to be decoupled from one another in a temporal sense in some embodiments in that the control system only operates the outdoor unit 130 when the temperature of the circulating fluid rises above a certain set point.

The indoor and/or outdoor units 110, 130 can be arranged such that they include multiple hose connection points so that multiple indoor units 110 can be connected to a single outdoor unit 130. Such connections may be made directly from each of the indoor units 110 to the outdoor units 130 or in a daisy chain arrangement. Additionally, the indoor unit 110 may include such functionality as heat sensors and servo-directed louvers to direct cooling airflow to hotspots in a room (e.g., room occupants). Further, the indoor unit 110 may be configured to collect condensate and deposit it back into the cold fluid loop. The outdoor unit 130 can then be configured to eject some fluid from the loop should the fluid capacity of the loop be exceeded by the addition of condensate.

Accordingly, various embodiments can provide a modular air conditioner unit 100 operates on the principle of a split system yet allows user serviceability and modular components such that the system is flexible. Various examples include a modular air conditioning system 100 that includes at least one indoor cooling unit 110 that has a detachable cold storage therein such that the temperature of the cold store is maintained by a circulating coolant fluid through hose connections with an outdoor heat dissipation unit 130. Some embodiments include a modular air conditioning unit 100 that includes at least one indoor cooling unit 110 that has a detachable cold storage unit therein such that the cooling operation conducted by the indoor and outdoor units 110, 130 are temporally separated thereby allowing operation of the system at its highest efficiency.

Figure 42:
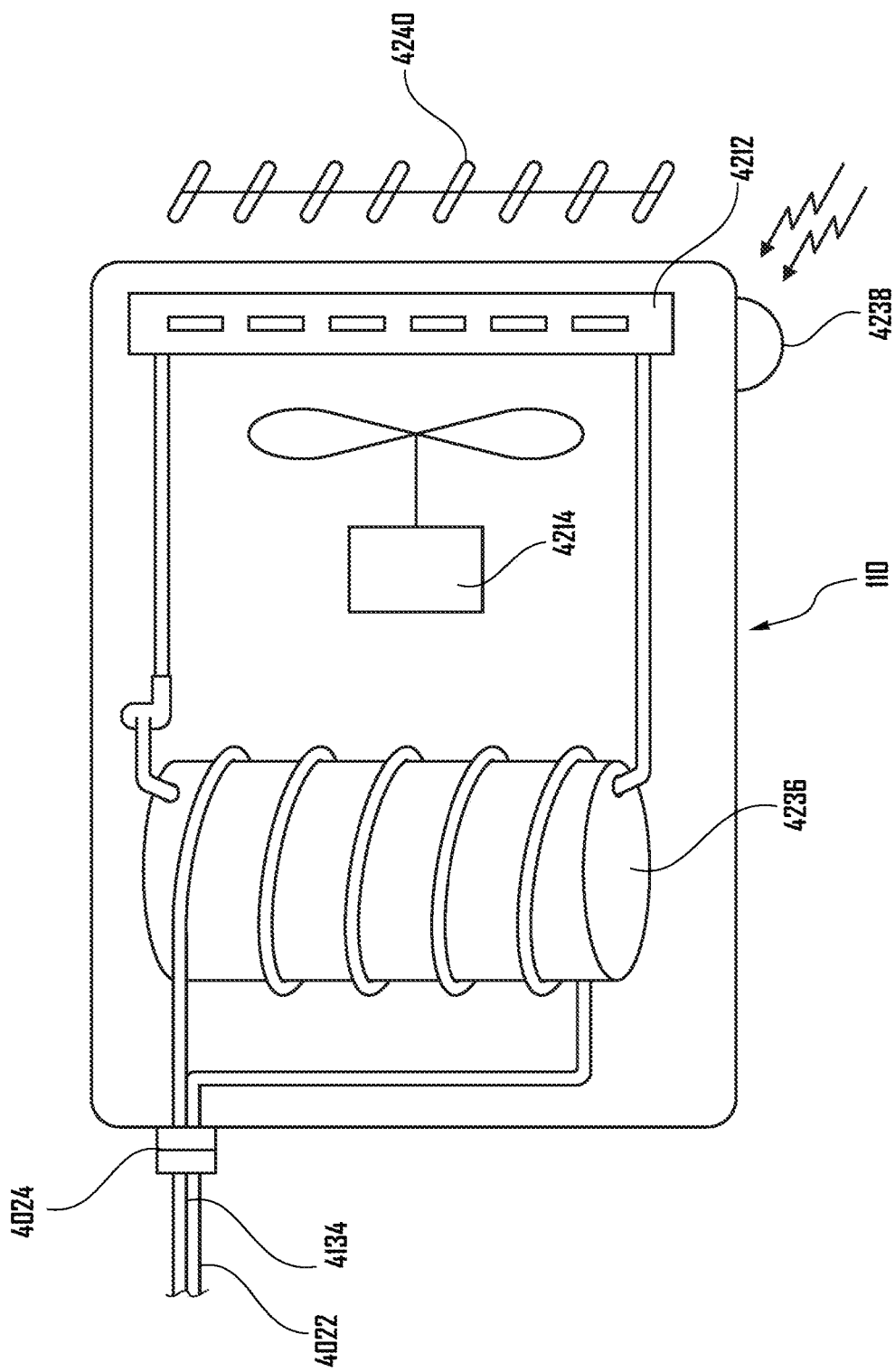
FIG. 42 illustrates circulating fluid directed to reduce the overall temperature of a fluid storage tank within the interior unit in accordance with one example embodiment.

Turning to FIGS. 40a, 40b, 42 and 42, an example embodiment of a modular climate control unit 100 is illustrated. As shown in FIG. 42, the modular climate control unit 100 can include at least one user-positionable interior unit 110 wherein the interior unit 110 includes a fluid to air heat exchanger 4012 and a fan 4014 to circulate air across the fluid to air heat exchanger 4012, an exterior unit 130 including a fluid to fluid heat exchanger 4018 and a system 4020 for supplying a working fluid having a controlled temperature to a first side of the fluid to fluid heat exchanger 4018 and a circulation hose 4022 defining one or more operable connections 710 between a fluid side of the fluid to air heat exchanger 4012 and a second side of the fluid to fluid heat exchanger 4018, wherein the circulation hose 4022 allows a circulating fluid to transport heat between the at least one interior unit 110 and the exterior unit 130. As will be discussed in more detail below, the circulating fluid can be a non-toxic, user serviceable fluid and the circulation hose 4022 can be coupled to at least one interior unit 110 and the exterior unit 130 in a releasable manner.

Turning to the example exterior unit 130 in more detail, the exterior unit 130 can comprise a system 4020 for controlling the temperature of a working fluid. The system 4020 for controlling the temperature may be a heat pump, compressor or the like. In the case of a heat pump, the system 4020 may provide, add or remove heat to/from the working fluid. In contrast, if only a compressor is provided, the system 4020 may remove heat from the working fluid. Further, the exterior unit 130 can include a fluid to fluid heat exchanger 4018 that can allow the exchange of heat between the working fluid on one side of the heat exchanger 4018 and the circulating fluid on the other side of the heat exchanger 4018. A fan and various other components such as controls may also be included in the exterior unit 130 in some embodiments.

The interior unit 110 can comprise a fan 4014 and a fluid to air heat exchanger 4012. In some examples, the interior unit 110 includes a fluid pump and a circulating fluid storage tank that will operate as described below in more detail.

The circulation hose 4022 can comprise a detachable hose that extends between the interior 110 and exterior units 130. For example, as can be seen at FIG. 40b, the circulation hose 4022 can include three lumens therein that act as a fluid supply 4024, a fluid return 4026 and wiring 4028 for power and/or control signals between the interior 110 and exterior units 130. The circulation hose 4022 may further optionally include a fourth lumen 4030 to serve as a conduit to convey condensate back to the exterior unit 130 from the interior unit 110 preventing the need for a condensate drain therein.

It can be appreciated by one skilled in the art that within the scope of the present disclosure we have described an outdoor unit 130, however, it should be appreciated that the outdoor unit 130 may be positioned indoors as well at a location wherein the user is not concerned about the potential for heat gain. Further, it is anticipated within the scope of the present disclosure that the air-cooled condenser may be a fluid cooled condenser and more particularly a condenser that is cooled using ground source water.

As illustrated in FIG. 41, the outdoor unit 130 can operate using a heat pump/air conditioning cycle to reduce the temperature of working fluid 4132 or coolant, which in turn extracts heat from a circulating fluid 4134 via the fluid to fluid heat exchanger 4018. The cooled circulating fluid 4134 is then circulated, via the circulation hose 4022, between the exterior and interior units 130, 110. As was illustrated in FIG. 40a, the circulating fluid 4134 may be directed through the fluid to air heat exchanger 4012 in the interior unit 130 to cool the air directly.

Further, as can be seen in FIG. 42, the circulating fluid 4134 may be directed to reduce the overall temperature of a fluid storage tank 4236 within the interior unit 110. In this embodiment, when cooling is needed in the indoor space, cold fluid from the cold fluid storage tank 4236 is circulated through the fluid to air heat exchanger 4012 where the fan 4014 circulates room air across the heat exchanger 4012 producing a cooling effect. One skilled in the art should appreciate that while the fluid storage tank 4236 is shown in the interior unit 110 it could also be positioned within the exterior unit 130 or independently at an intermediate position along the circulation hose 4022.

The example arrangement of FIG. 42 can allow a room cooling function and a fluid cooling function to be decoupled from one another in a temporal sense in that the control system may only operate the outdoor unit 130 when the temperature of the circulating fluid rises above a certain set point. Similarly, the indoor unit 110 can independently increase or decrease fan speed and fluid circulation rate in order to provide a great deal of control over the cooling effect as compared to the prior art on or off cooling systems. This decoupling of the indoor cooling loop and the outdoor cooling loop can further allow the outdoor unit 130 to cool the fluid when it is most efficient to do so. For example, the outdoor unit 130 may cool the fluid stored in the interior insulated cold fluid storage tank at night for cooling use during the day when the outdoor ambient temperatures increase.

In various embodiments, the circulating fluid can be a non-toxic, low freezing point coolant such as salt brine of water mixed with polyethylene glycol. This can be contrasted with some systems that circulate a refrigerant such as Freon or R-10 between the indoor and outdoor units 110, 130. The arrangement of various embodiments allows a user to selectively connect an indoor unit 110 with an outdoor unit 130 using a modular hose arrangement thereby eliminating a great deal of complexity and cost. Further, this arrangement can allow for freedom in placing the indoor unit 110 as needed for maximum cooling effect and occupant comfort. The circulation hose(s) 22 can be attached to the indoor and outdoor units 110, 130 using a quick release style coupler 4042. Such quick release couplers 4042 can include valving therein that prevents leakage of circulating fluid 4134 when the circulation hose(s) 4022 are disconnected.

To further enhance the modularity of the air conditioning unit 100, the indoor and/or outdoor units 110, 130 can be arranged such that they include multiple hose connection points so that multiple indoor units 110 can be connected to a single outdoor unit 110. Such connections may be parallel or made directly from each of the indoor units 110 to the outdoor unit 130. Alternately the indoor units 110 may be connected in series or in a daisy chain arrangement with the outdoor unit 130. Turning back to FIG. 42, the indoor unit 110 may include such functionality as heat sensors 4238 and servo directed louvers 4240 to direct cooling airflow to hotspots in a room (e.g., room occupants). Further, the indoor unit 110 may be configured to collect condensate and deposit the condensate back into the loop of circulating fluid 4134. The outdoor unit 130 can then be configured to eject some fluid from the loop of circulating fluid 4134 should the fluid capacity of the loop of circulating fluid 4134 be exceeded by the addition of condensate.

It should be further appreciated by one skilled in the art that the arrangement of the various examples could operate equally well as a heating system. In operation, change that could be made is that the outdoor unit 130 would be run as a heat pump rather than as an air conditioner. In this manner, rather than cooling the circulating fluid, the outdoor unit 130 would heat the circulating fluid. Optionally, the indoor unit(s) 110 may instead include a supplemental heating arrangement such as an electrical heating coil.

It can therefore be seen that the present disclosure illustrates examples of a modular air conditioner unit 100 that can operate on the basic principle of a split system yet allows user serviceability and modular components such that the system is flexible. Further, various embodiments provide a modular air conditioning unit 100 that includes at least one indoor cooling unit 110 that has an integrated cold storage therein such that the temperature of the cold store is maintained by a circulating coolant fluid through user serviceable hose connections with an outdoor heat dissipation unit.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives. Additionally, elements of a given embodiment should not be construed to be applicable to only that example embodiment and therefore elements of one example embodiment can be applicable to other embodiments. Additionally, in some embodiments, elements that are specifically shown in some embodiments can be explicitly absent from further embodiments. Accordingly, the recitation of an element being present in one example should be construed to support some embodiments where such an element is explicitly absent.

What is claimed is:

1. A method of installing an air conditioning unit in a window of a building, the method comprising:

securing a sill coupling component to a sill of a window by widening or narrowing a cavity defined by the sill coupling component to correspond to a thickness of the sill between an internal environment and external environment and by disposing the sill coupling component over the sill with the sill within the cavity and first and second plates of the sill coupling component extending downward from the sill of the window respectively in the internal environment and external environment;

attaching an external coupling component and pivot arm to the sill coupling component with the pivot arm disposed extending away from the window and parallel to a top face of the sill coupling component that extends over the sill, with the pivot arm and sill coupling component defining respective pivot arm guide slots and sill arm guide slots disposed in parallel and with the pivot arm guide slots having a coincident axis with the sill arm guide slots, the sill coupling component, external coupling component and pivot arm defining a bracket;

positioning an external unit of the air conditioning unit on top of the bracket, the external unit extending over the sill and out the window with an internal face of the external unit engaging the bracket, a bottom of the external unit facing the external environment outside the window and a top face of the external unit facing the internal environment inside the window;

sliding the external unit on top of the bracket onto the pivot arm with static non-rotatable guiding wings of the external unit disposed and secured within the guide slots of the bracket;

rotating the pivot arm and external unit downward such that the bottom of the external unit faces downward and the top of the external unit faces upward, with the external unit disposed in the external environment and extending downward below the sill of the window and with the internal face of the external unit facing the bracket, the rotating the pivot arm and external unit downward causing the pivot arm guide slots to have a perpendicular axis with the sill arm guide slots;

coupling an internal unit of the air conditioning unit to the bracket within the internal environment and extending downward below the sill of the window;

installing two or more operable couplings between the internal and external units including at least a power coupling and fluid coupling;

plugging a power cord of the internal unit into a power receptacle within the internal environment to provide power to the internal unit and to provide power to the external unit via the power coupling; and performing a heat exchange with the air conditioning unit to cool the internal environment.

2. The method of claim 1, further comprising installing a top cover, the top cover extending between the internal unit and external units and over the sill of the window.

3. The method of claim 1, wherein the pivot arm is biased, via a pair of gas springs, toward a configuration where the pivot arm is disposed extending away from the window and parallel to a top face of the sill coupling component, and wherein the rotating the pivot arm and external unit downward comprises overcoming the biasing of the pivot arm, the pair of gas springs comprising a first and second gas spring that each respectively extend between the pivot arm and a bottom end of the sill coupling component on respective opposing sides of the pivot arm and the sill coupling component.

4. The method of claim 1, wherein the sill coupling component includes a first sill unit and a second sill unit, with the first and second sill units slidably coupled via first and second top plates of the sill coupling component that are slidably disposed over and across the sill at a top of the sill coupling component to define the cavity of the sill coupling component, wherein the widening or narrowing the cavity comprises moving the first and second sill units via the slidable coupling of the first and second top plates of the sill coupling component that are slidably disposed over and across the sill, and wherein the securing the sill coupling component to the sill of the window comprises actuating a coupling latch assembly configured to releasably couple the first and second sill units by releasably coupling the slidable coupling of the first and second top plates to releasably fix a size of the cavity corresponding to the thickness of the sill to secure the sill coupling component to the sill of the window, the coupling latch assembly extending from and disposed at the top of the sill coupling component.

5. A method of installing an air conditioning unit in a window, the method comprising:

securing a bracket to a sill of the window by widening or narrowing a cavity defined by the bracket to correspond to a thickness of the sill between an internal environment and external environment and by disposing the bracket over the sill with the sill within the cavity, the bracket comprising a pivot arm disposed extending away from the window and parallel to a top face of the bracket that extends over the sill, with the bracket defining guide slots disposed in parallel;

positioning an external unit of the air conditioning unit on top of the bracket, the external unit extending over the sill and out the window with an internal face of the external unit engaging the bracket, a bottom of the external unit facing the external environment outside the window and a top face of the external unit facing the internal environment inside the window;

sliding the external unit on top of the bracket onto the pivot arm with the external unit secured within the guide slots of the bracket and secured within pivot arm guide slots of the pivot arm, the pivot arm guide slots in a first horizontal configuration;

rotating the pivot arm and external unit downward such that the bottom of the external unit faces downward and the top of the external unit faces upward, with the external unit disposed in the external environment and extending downward below the sill of the window and with the internal face of the external unit facing the bracket, wherein the rotating the pivot arm downward causes the pivot arm guide slots of the pivot arm to rotate from the first horizontal configuration to a second vertical configuration; and coupling an internal unit of the air conditioning unit to the bracket within the internal environment and extending downward below the sill of the window.

6. The method of claim 5, further comprising installing one or more operable couplings between the internal and external units including at least a power coupling and fluid coupling;

plugging a power cord of the internal unit into a power receptacle within the internal environment to provide power to the internal unit and to provide power to the external unit via the power coupling; and performing a heat exchange with the air conditioning unit to cool the internal environment.

7. The method of claim 5, further comprising installing a top cover, the top cover extending between the internal unit and external units and over the sill of the window.

8. The method of claim 5, wherein the pivot arm is biased toward a configuration where the pivot arm is disposed extending away from the window and parallel to a top face of the bracket, and wherein the rotating the pivot arm and external unit downward comprises overcoming the biasing of the pivot arm.

9. A method of installing an air conditioning unit in an opening, the method comprising:

securing a bracket to a sill of the opening between a first and second environment, the bracket comprising a pivot arm disposed and extending within the first environment;

positioning a first unit of the air conditioning unit on top of the bracket;

moving the first unit on top of the bracket onto the pivot arm; and rotating the pivot arm and first unit downward so that the first unit is disposed in the first environment and extending downward below the sill of the opening to cause one or more pivot arm guide slots of the pivot arm to rotate from a first configuration to a second configuration.

10. The method of claim 9, further comprising coupling a second unit of the air conditioning unit to the bracket within the second environment and extending downward below the sill of the opening.

11. The method of claim 10, further comprising installing one or more operable couplings between the first and second units including at least a power coupling and fluid coupling.

12. The method of claim 11, further comprising plugging a power cord of the second unit into a power receptacle within the second environment to provide power to the second unit and to provide power to the first unit via a power coupling between the first and second units; and performing a heat exchange with the air conditioning unit to condition air of the second environment.

13. The method of claim 10, further comprising installing a top cover, the top cover extending between the first and second units and over the sill of the opening.

14. The method of claim 9, wherein securing the bracket to the sill comprises widening or narrowing a cavity defined by the bracket to correspond to a thickness of the sill between the first and second environments and by disposing the bracket over the sill with the sill within the cavity.

15. The method of claim 9, wherein the bracket includes a first sill unit and a second sill unit, with the first and second sill units movably coupled to define a cavity of the bracket, and wherein securing the bracket to the sill of the opening comprises includes widening or narrowing the cavity by moving the first and second sill units via the movable coupling.

16. The method of claim 15, wherein the securing the bracket to the sill of the opening further comprises actuating an assembly configured to releasably couple the first and second sill units to releasably fix a size of the cavity corresponding to a thickness of the sill to secure the sill coupling component to the sill of the opening.

17. The method of claim 9, wherein the bracket defines one or more guide slots, and wherein moving the first unit on top of the bracket onto the pivot arm occurs while the first unit is secured within the one or more guide slots of the bracket.

18. The method of claim 17, wherein the first unit is secured within the one or more guide slots of the bracket via one or more guiding wings of the first unit that are slidably disposed and secured within the one or more guide slots of the bracket.

19. The method of claim 9, wherein positioning the first unit of the air conditioning unit on top of the bracket includes the first unit extending over the sill and out the opening with an internal face of the first unit engaging the bracket, a bottom of the first unit facing the first environment outside the opening and a top face of the first unit facing the second environment inside the opening.

20. The method of claim 9, wherein the pivot arm is biased toward a configuration where the pivot arm is disposed parallel to a top face of the bracket, and wherein the rotating the pivot arm and first unit downward comprises overcoming the biasing of the pivot arm.

* * * * *